(12) United States Patent
Brunner et al.

(10) Patent No.: US 11,835,710 B2
(45) Date of Patent: Dec. 5, 2023

(54) METHOD OF MODE COUPLING DETECTION AND DAMPING AND USAGE FOR ELECTROSTATIC MEMS MIRRORS

(71) Applicant: Infineon Technologies AG, Neubiberg (DE)

(72) Inventors: David Brunner, Dobersberg (AT); Stephan Gerhard Albert, Munich (DE); Franz Michael Darrer, Graz (AT); Georg Schitter, Vienna (AT); Richard Schroedter, Dresden (AT); Han Woong Yoo, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 441 days.

(21) Appl. No.: 17/122,300

(22) Filed: Dec. 15, 2020

(65) Prior Publication Data

US 2022/0187590 A1 Jun. 16, 2022

(51) Int. Cl.
*G02B 26/08* (2006.01)
*G02B 26/10* (2006.01)
*G01D 5/241* (2006.01)

(52) U.S. Cl.
CPC ....... *G02B 26/0841* (2013.01); *G01D 5/2417* (2013.01); *G02B 26/105* (2013.01)

(58) Field of Classification Search
CPC .............. G02B 26/0841; G02B 26/105; G02B 26/085; G02B 26/0858; G02B 26/101;

(Continued)

(56) References Cited

U.S. PATENT DOCUMENTS 6,538,802 B2 * 3/2003 Wang ................. G02B 26/0841
359/298
6,995,737 B2 * 2/2006 LeChevalier ........ G09G 3/3216
345/82

(Continued)

OTHER PUBLICATIONS

Frangi, Attilio, et al., "Mode Coupling and Parametric Resonance in Electrostatically Actuated Micromirrors", IEEE Transactions on Industrial Electronics, vol. 65, No. 7, 2018, pp. 5962-5969, DOI: 10.1109/TIE.2017.2774729.

(Continued)

*Primary Examiner* — Zachary W Wilkes
(74) *Attorney, Agent, or Firm* — Harrity & Harrity, LLP

(57) ABSTRACT

A scanning system includes a microelectromechanical system (MEMS) scanning structure configured with a desired rotational mode of movement based on a driving signal; a plurality of comb-drives configured to drive the MEMS scanning structure according to the desired rotational mode of movement based on the driving signal, each comb-drive including a rotor comb electrode and a stator comb electrode that form a capacitive element that has a capacitance that depends on the deflection angle of the MEMS scanning structure; a driver configured to generate the at least one driving signal; a sensing circuit selectively coupled to at least a subset of the plurality of comb-drives for receiving sensing signals therefrom, wherein each sensing signal is representative of the capacitance of a corresponding comb-drive; and a processing circuit configured to determine a scanning direction of the MEMS scanning structure in the desired rotational mode of movement based on the sensing signals.

25 Claims, 24 Drawing Sheets

(58) Field of Classification Search
CPC ....... G01D 5/2417; G01S 17/42; G01S 17/10; G01S 7/4817; G01S 17/08
USPC ..................................................... 359/199.2
See application file for complete search history.

(56) References Cited

U.S. PATENT DOCUMENTS

| | | | | |
|---|---|---|---|---|
| 7,026,695 | B2* | 4/2006 | Yang | G02B 26/0841 |
| | | | | 257/515 |
| 7,426,859 | B2* | 9/2008 | Greene | G01P 3/26 |
| | | | | 73/504.02 |
| 8,164,588 | B2* | 4/2012 | Lauxtermann | G09G 3/3433 |
| | | | | 359/290 |
| 8,717,300 | B2* | 5/2014 | Kishi | G09G 3/3283 |
| | | | | 345/173 |
| 10,228,555 | B2* | 3/2019 | Sourani | G02B 26/0841 |
| 11,061,201 | B2* | 7/2021 | Zhou | G02B 7/1821 |
| 11,467,394 | B2* | 10/2022 | Schroedter | G02B 7/1821 |
| 2003/0184844 | A1* | 10/2003 | Yazdi | G02B 26/0841 |
| | | | | 359/237 |
| 2006/0237627 | A1* | 10/2006 | Gardner | H10K 71/70 |
| | | | | 250/208.1 |
| 2011/0109951 | A1* | 5/2011 | Goren | G02B 26/0841 |
| | | | | 359/213.1 |
| 2011/0292529 | A1* | 12/2011 | Lindenkreuz | B81B 3/0086 |
| | | | | 359/872 |
| 2012/0320379 | A1* | 12/2012 | Hofmann | G02B 26/0841 |
| | | | | 356/445 |
| 2015/0185051 | A1* | 7/2015 | Tsai | G02B 26/0841 |
| | | | | 324/661 |
| 2018/0067303 | A1* | 3/2018 | Sourani | G09G 3/346 |
| 2019/0064508 | A1* | 2/2019 | Torkkeli | G02B 26/101 |
| 2020/0018948 | A1* | 1/2020 | Steiner | G02B 26/101 |
| 2020/0132981 | A1* | 4/2020 | Van Lierop | G01S 7/4865 |
| 2022/0269069 | A1* | 8/2022 | Park | G02B 27/0172 |
| 2022/0269070 | A1* | 8/2022 | Park | G02B 26/0841 |

OTHER PUBLICATIONS

Hah, Dooyoung, et al., "Design of Electrostatic Actuators for MOEMS Applications", Proceedings of SPIE—The International Society for Optical Engineering, 2002, pp. 1-8, DOI: 10.1117/12.462812.

Maksymova, Ievgenniia et al., "A MEMS mirror driver ASIC for beam-steering in scanning MEMS-based LiDAR", Proc. of SPIE vol. 1110, 2019, pp. 1-8, DOI: 10.1117/12.2528312.

* cited by examiner

METHOD OF MODE COUPLING DETECTION AND DAMPING AND USAGE FOR ELECTROSTATIC MEMS MIRRORS

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

In order to improve the MEMS mirror scanning performance by achieving high scanning frequencies, it is a goal to design the MEMS mirror to be lightweight. The mirror's moment of inertia can be reduced by choosing a low thickness of the mirror plate. However, lighter mirror plates with a low thickness lead to increased dynamic deformation at the mirror for a fixed frequency or trajectory (equals to a set of frequencies). This deformation causes distortion in transmitted and/or received light beams. For this reason, the mirror plate is supported by reinforcement structures, which aid in suppressing dynamic deformation. However, the inclusion of the reinforcement structures leads to a coupling of the desired rotational mode Rx about the mirror's scanning axis to an unwanted in-plane translational mode Ty. The operation point where the Ty resonance occurs varies for each device and therefore is hard to predict or to avoid by design. Another unwanted parasitic mode, a yaw mode Rz, also depends on the ambient temperature. For example, as the Young's modulus is in general temperature dependent, parasitic modes such as the yaw mode Rz may shift in resonance frequency. In addition, such parasitic mode can be excited the high order harmonic components of the actuation signal or main oscillation motion, which coincide other rigid body modes. The detection and avoidance of such operation points exhibiting strong coupling to unwanted parasitic modes can be critical to ensure the proper operation of the MEMS mirror. To ensure high position accuracy and respective image resolution while shooting a laser pulse, a precise position estimation of the mirror is required.

Therefore, an improved control structure for detecting, measuring, and/or counteracting parasitic modes may be desirable.

SUMMARY

One or more embodiments provide a scanning system, including:

microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive includes a rotor comb electrode and a stator comb electrode that form a capacitive element that has a capacitance that depends on the deflection angle of the MEMS scanning structure;

a driver configured to generate the at least one driving signal;

a sensing circuit selectively coupled to at least a subset of the plurality of comb-drives for receiving sensing signals therefrom, wherein each sensing signal is representative of the capacitance of a corresponding comb-drive; and a processing circuit configured to determine a scanning direction of the MEMS scanning structure in the desired rotational mode of movement based on the sensing signals.

One or more embodiments provide a scanning system, including:

microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive includes a rotor comb electrode and a stator comb electrode that form a capacitive element that has a capacitance that depends on the deflection angle of the MEMS scanning structure;

a driver configured to generate the at least one driving signal;

a sensing circuit selectively coupled to at least a subset of the plurality of comb-drives for receiving sensing signals therefrom, wherein each sensing signal is representative of the capacitance of a corresponding comb-drive; and a processing circuit configured to detect and identify a parasitic mode of movement of the MEMS scanning structure based on the sensing signals.

One or more embodiments provide a scanning system, including:

microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive includes a rotor drive-comb electrode and a stator drive-comb electrode;

a driver configured to generate the at least one driving signal;

a plurality of sensing combs, wherein each sensing comb includes a rotor sense-comb electrode and a stator sense-comb electrode that form a capacitive element that has a capacitance that depends on the deflection angle of the MEMS scanning structure;

a sensing circuit selectively coupled to at least a subset of the plurality of sensing combs for receiving sensing signals therefrom, wherein each sensing signal is representative of the capacitance of a corresponding sensing combs; and a processing circuit configured to detect and identify a parasitic mode of movement of the MEMS scanning structure based on the sensing signals.

One or more embodiments provide a scanning system, including:

microelectromechanical system (MEMS) scanning structure configured to rotate about an axis with a desired rotational mode of movement based on at least one driving signal;

a plurality of combs-drives configured to drive the MEMS scanning structure about the axis according to the desired rotational mode of movement based on the at least one driving signal, wherein each comb-drive includes a rotor comb electrode and a stator comb electrode that form a capacitive element that has a capacitance that depends on the deflection angle of the MEMS scanning structure;

a driver configured to generate the at least one driving signal;

a system controller configured to shift a driving frequency of the at least one driving signal to provoke a parasitic mode coupling between the desired rotational mode of movement and a parasitic mode of movement of the MEMS scanning structure;

a sensing circuit selectively coupled to at least a subset of the plurality of comb-drives for receiving sensing signals therefrom, wherein each sensing signal is representative of the capacitance of a corresponding comb-drive; and a processing circuit configured to determine a frequency range of the driving frequency at which the parasitic mode coupling occurs, wherein the system controller controls the at least one driving signal to avoid the parasitic mode.

One or more embodiments provide a scanning system, including:

microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive includes a rotor drive-comb electrode and a stator drive-comb electrode;

a driver configured to generate the at least one driving signal;

a plurality of sensing combs, wherein each sensing comb includes a rotor sense-comb electrode and a stator sense-comb electrode that form a capacitive element that has a capacitance that depends on the deflection angle of the MEMS scanning structure;

a system controller configured to shift a driving frequency of the at least one driving signal to provoke a parasitic mode coupling between the desired rotational mode of movement and a parasitic mode of movement of the MEMS scanning structure;

a sensing circuit selectively coupled to at least a subset of the plurality of sensing combs for receiving sensing signals therefrom, wherein each sensing signal is representative of the capacitance of a corresponding sensing comb; and a processing circuit configured to determine a frequency range of the driving frequency at which the parasitic mode coupling occurs, wherein the system controller controls the at least one driving signal to avoid the parasitic mode.

BRIEF DESCRIPTION OF THE DRAWINGS

Embodiments are described herein making reference to the appended drawings.

DETAILED DESCRIPTION

Figure 1A:
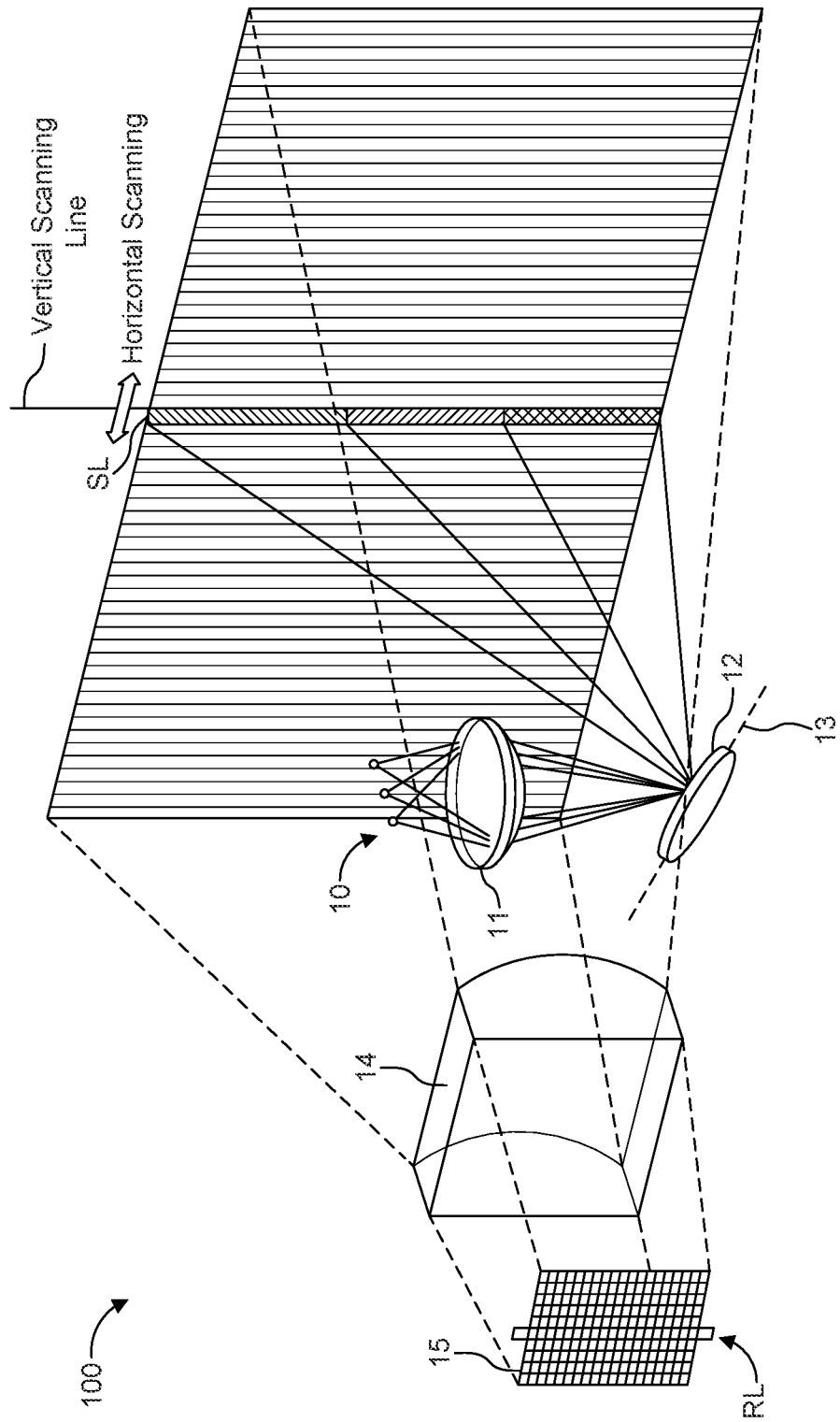
FIG. 1A is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

The term "substantially" may be used herein to account for small manufacturing tolerances (e.g., within 5%) that are deemed acceptable in the industry without departing from the aspects of the embodiments described herein.

Directional terminology, such as "top", "bottom", "left", "right", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (ToF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm. For example, an ADC may be used to detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate a scene in a continuous scan fashion. Each firing of the laser beam by the light sources can result in a scan line in the "field of view."

By emitting successive light pulses in different scanning directions, an area referred to as the field of view can be scanned and objects within the area can be detected and imaged. Thus, the field of view represents a scanning plane having a center of projection. A raster scan could also be used.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical system (MEMS) mirror 12, and a receiver, including a second optical component 14 and a photodetector detector array 15.

The illumination unit 10 includes multiple light sources (e.g., laser diodes or light emitting diodes) that are linearly aligned in single bar formation and are configured to transmit light used for scanning an object. The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources is aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) formed in a semiconductor substrate. The MEMS mirror 12 according to this embodiment is suspended by mechanical springs (e.g., leaf springs, sometimes referred to as cantilever beams) or flexures and is configured to rotate about a single axis and can be said to have only one desired degree of freedom for movement (i.e., a desired rotational mode about the single axis). While other degrees of freedom may exist, e.g., motions associated with other rigid body degrees of freedom, these modes are undesired and are referred to as unwanted parasitic modes. One object of the disclosed embodiments is to suppress the parasitic modes that are associated with these other, unwanted degrees of freedom.

The parasitic/unwanted oscillations are described as the excitation of at least one of the rigid body modes of the MEMS mirror 12 different from the desired operational mode (i.e., the desired rotational mode about the single axis). The parasitic/unwanted oscillations can occur due to a direct excitation of parasitic modes via the actuators (e.g., electrostatic comb-drives, electromagnetic drive, etc.) or high order harmonic motions of the main mode by nonlinear oscillation, or due to an indirect excitation of parasitic modes via mode coupling mechanisms.

Direct excitation of parasitic modes via the actuators may be caused by, in resonant mirrors, higher harmonic content of the periodic drive signal fulfilling a condition for parametric resonance of a parasitic mode, or, in quasi-static mirrors, switching of drive voltage for change of scan angle will excite ringing of the parasitic mode because the comb-drive not only induces the intended rotation, but also creates other forces, e.g., y-force. Thus, switching the angle of a quasi-state MEMS mirror will lead to transients of all modes, including desired and unwanted modes.

Indirect excitation of the parasitic modes via mode coupling mechanisms may be caused by an Euler force that couples the desired Rx mode to parasitic mode Ty. The Euler force may be due to an offset of a center of mass and the rotation axis 13. Indirect excitation of the parasitic modes via mode coupling mechanisms may be caused by a centrifugal force that couples the desired Rx mode to parasitic mode Tz. The centrifugal force may be due to an offset of a center of mass and the rotation axis 13. Indirect excitation of the parasitic modes via mode coupling mechanisms may be caused by a coupling of all rotational modes Rx, Ry, and Rz by Euler's equations. The nonlinearity of the oscillation, e.g. by geometric hardening, can contain specific frequency components of other parasitic modes, cause excitation. Also possible, so-called autoparametric excitation and/or three-wave-mixing-coupling, both of them a consequence of geometric nonlinearities induced by large deflections.

In order to make a MEMS scanning mirror robust against vibrations, the mirror should have a low inertia, i.e., a light mirror body, but stiff enough to keep dynamic deformations acceptable. In addition, the mirror should have a high stiffness of its suspension for all parasitic degrees-of-freedom (DOF) of the mirror body. The stiffness associated with the rotation about the operational axis should be designed to match the desired operation frequency.

In order to achieve a light and stiff mirror body, the mirror body may comprise a relatively thin mirror and a thicker reinforcement structure for the mirror. The mirror body may be rotatably arranged in a mirror frame around a rotation axis (i.e., a scanning axis) extending in a plane defined by the mirror frame (e.g., in an x-y plane). In the following examples, it will be assumed that the rotation axis extends parallel to the x-dimension of the x-y plane. The rotation axis may extend to first and second mutually opposite end-portions of the mirror body. The z-axis location of the rotation axis is mainly defined by the z-axis extension of the springs and flexures. The mirror may have a reflective plane on a first main surface and opposite the first main surface a second main surface provided with the reinforcement structure, which generally have larger thicknesses extending in z-direction than the flexures and springs. Thus, the reinforcement structure is displaced in the z-dimension from both the first main surface of the mirror body and the rotation axis. For this reason, also the center of mass of the entire rotating body is generally displaced in the z-dimension from the rotation axis.

Figure 1B:
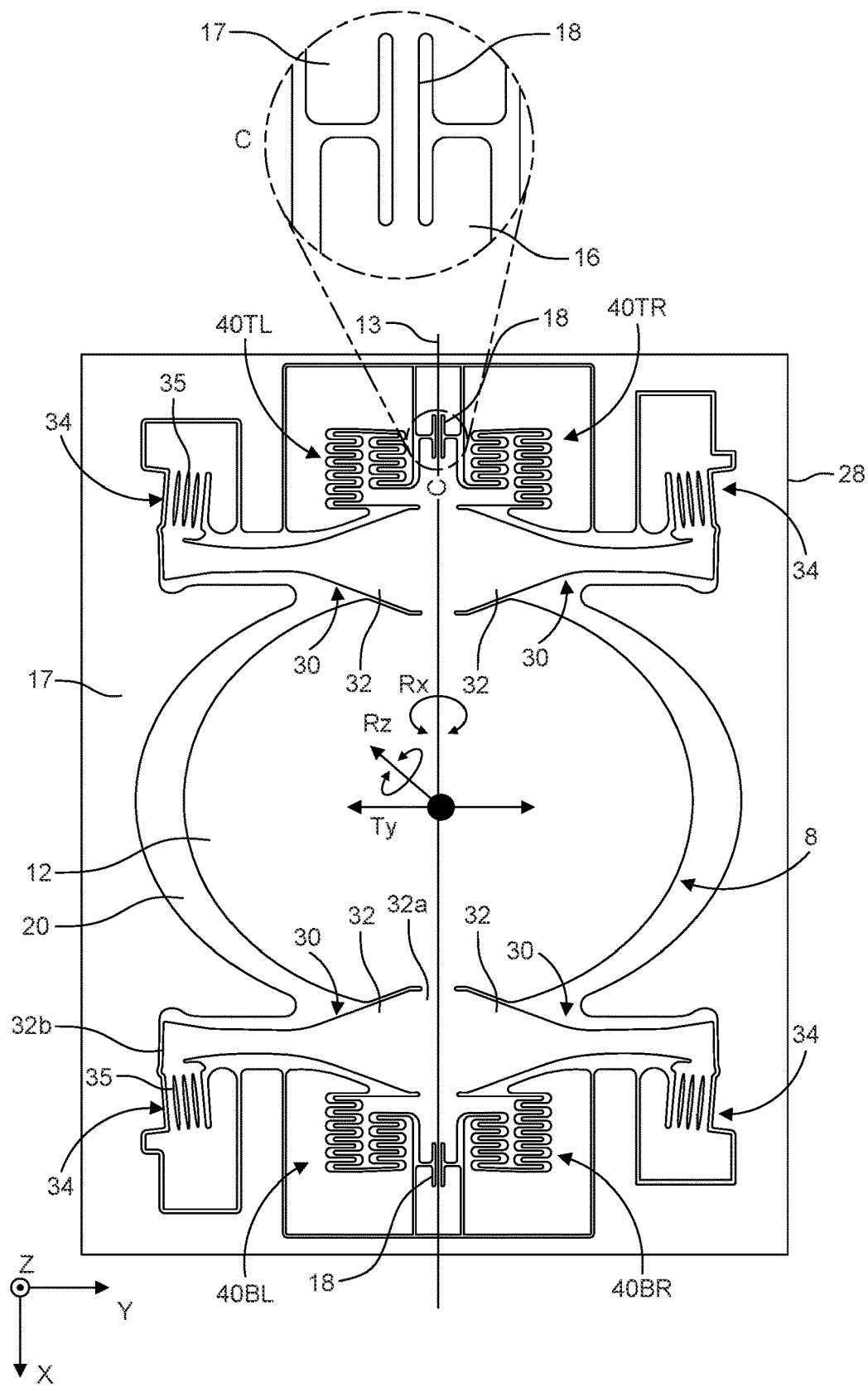
FIG. 1B shows a schematic top view of an example of a mirror device in accordance with one or more embodiments.

In order to achieve a high stiffness suspension, the mirror body may be supported in the mirror frame using support beams extending along the rotation axis and additional cantilever beam or leaf spring assemblies, as illustrated in FIG. 1B. Generally, as defined herein, leaf spring assemblies may be referred to as cantilever beam assemblies, and vice versa. Similarly, leaf springs and cantilever beams may be used interchangeably.

A cantilever beam assembly may have a longitudinal direction and may extend within the plane defined by the frame. The support beams may be connected between the mirror body and the frame at two opposite ends of the mirror body along the rotation axis. The cantilever beam assembly may have a cantilever beam coupled at a first end via a relief structure to the mirror frame and fixed at a second end to the mirror body. The cantilever beam may have a thickness, perpendicular to a plane of the frame, that is smaller than its width in the plane of the frame.

Results of the low inertia and the high suspension stiffness of the mirror body may be high resonance frequencies and a good dynamic performance. These properties may also make the device, which is operated at the resonance frequency around the main axis of rotation, very fast. In normal operation, i.e., at resonance, accelerations at the mirror tips of typically 10000 G may be achieved.

Figure 2:
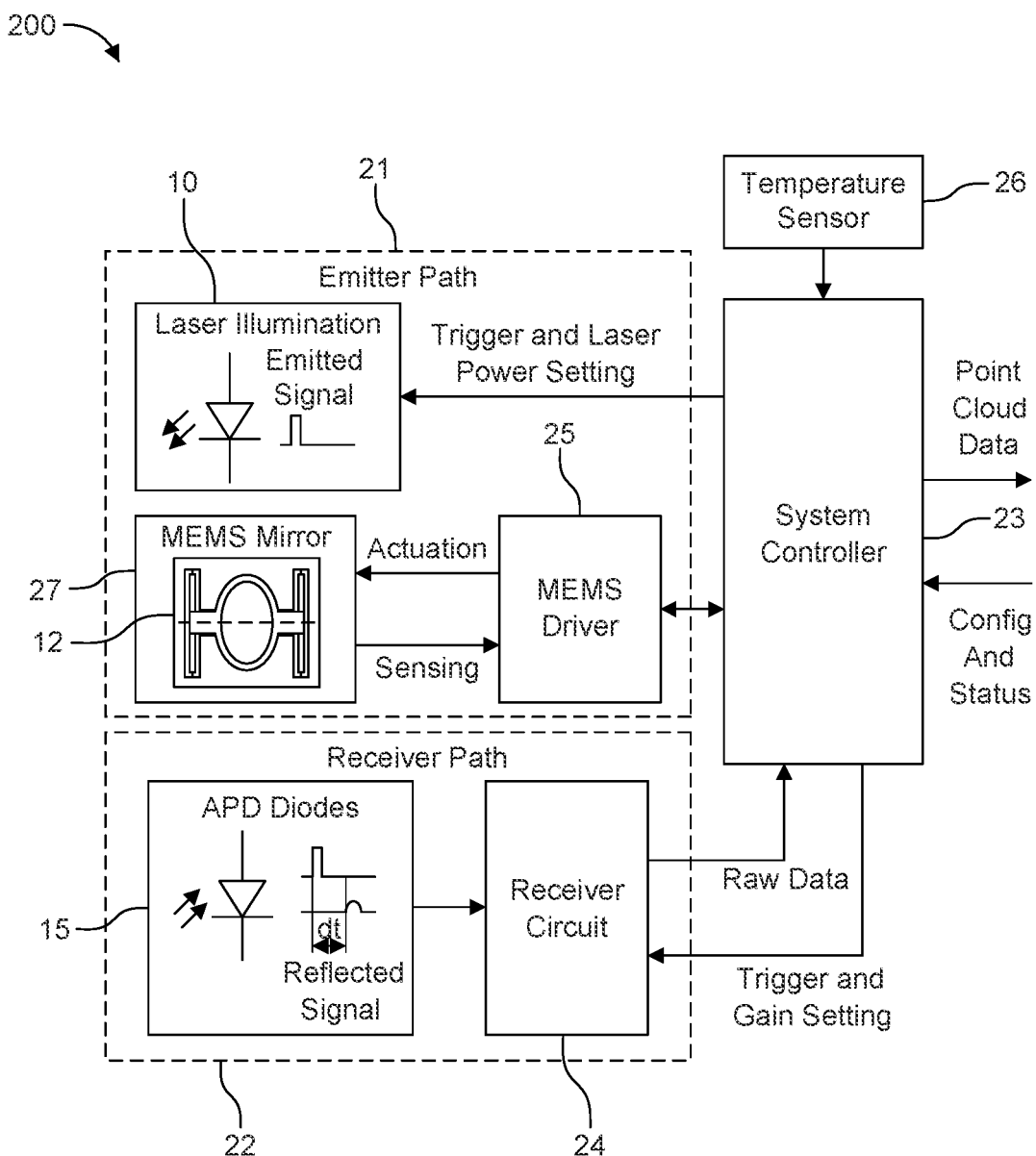
FIG. 2 is a schematic block diagram of the LIDAR scanning system in accordance with one or more embodiments.

The MEMS mirror 12 may be assembled in a chip package 27 shown in FIG. 2 to protect the mirror. For example, the MEMS mirror 12 may be hermetically sealed at a low pressure (i.e., at a pressure lower than atmospheric pressure) in a chip package. This low pressure may provide a low damping environment in which the MEMS mirror 12 operates.

Conceivable packages may include or differ by one or more of the following variants: different substrates (e.g., metal (leadframe), ceramic, organic (similar to printed circuit board (PCB) material)), and different optical lids or covers (e.g., optical material of glass, silicon, sapphire, etc.). Furthermore, the optical lids or covers may be cavity-forming caps, may be integrated into a frame (e.g., a metal frame), or assembled onto a pre-mold cavity or a ceramic cavity.

One or more methods (e.g., adhesive bonding, gluing, soldering, welding, and the like) or one or more different materials (e.g., silicone, glass solder, AuSn, and the like) may be used to bond one or more elements together (e.g., joining cap or lid to substrate). It will be appreciated that bonding methods may be interchangeable across various embodiments disclosed herein.

Alternatively, a wafer-level approach may be used such that a cavity-shaped lid may be directly mounted onto the MEMS chip (or even on wafer-level prior to singulation). Here, if the lid attachment leaves the electrical pads exposed, the sub-mount chip/lid can further be processed into a package using molding or casting processes.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning because other degrees of freedom, e.g. motions associated with other rigid body degrees of freedom, are significantly suppressed compared to the said rotation about the single axis. This is reflected by significantly higher eigenfrequencies of vibration associated with the other degrees of freedom compared to the said rotational motion about the single axis. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Thus, a 1D oscillating MEMS mirror is by design more robust against vibrations and shocks than 2D MEMS mirror solutions. Due to this single scanning axis of rotation, the MEMS mirror 12 is referred to as a 1D MEMS mirror or 1D MEMS scanner. While embodiments described herein use 1D oscillating MEMS mirrors, the methods described herein can be extended to 2D MEMS mirrors as well. In this case, both axes of a single 2D MEMS mirror are controlled by different controller (in case of resonant MEMS with phase-locked loops (PLLs)) such that a first scanning direction of the 2D MEMS mirrors according to a first axis is synchronized according to any of the synchronization techniques described herein, and a second scanning direction of the 2D MEMS mirrors according to a second axis is synchronized according to any of the synchronization techniques described herein. It is further possible that the different controller (e.g. PLLs) are provided in separate MEMS drivers or integrated into a single MEMS driver for both axes of the 2D MEMS mirror.

The MEMS mirror 12 itself can be a statically tiltable mover or oscillator (quasi-static MEMS mirror or resonator) to move or oscillate "side-to-side" about a single scanning axis 13 following a static position, a trajectory, or a resonant oscillation. For example, the MEMS mirror 12 may be either a resonant mirror or a quasi-static (QS) mirror. The MEMS mirror 12 is configured to move or oscillate "side-to-side" about the single scanning axis 13 such that the light reflected from the MEMS mirror 12 (i.e., the vertical scanning line of light) moves in a horizontal scanning direction.

As a resonant mirror, the MEMS mirror 12 can be a non-linear resonator that feature nonlinear properties due to the increasing stiffness of the suspension. In particular, the MEMS mirror 12 may exhibit a non-linear behavior due the torsional stiffness about the scanning axis 13 provided by the leaf spring assemblies 30 which is not constant, but increases with increasing angle. A consequence of this so-called geometric hardening is that an oscillation frequency of the mirror increases with an increase in oscillation amplitude (i.e., deflection angle amplitude θ). Thus, the stiffening of the suspension causes the MEMS mirror 12 to exhibit nonlinear properties.

It is noted that the deflection angle θ of the MEMS mirror 12 about the scanning axis 13 may be referred to as a tilt angle, rotation angle, scanning angle, mirror angle $θ_{mirror}$ or $θ_m$, or the like, and that these terms be used interchangeably throughout the disclosure.

As a QS MEMS mirror, the MEMS mirror 12 can tilt statically, follow trajectories (e.g., step, triangle, and sawtooth shaped trajectories) or resonate at its resonance frequency (i.e., its eigenfrequency). The QS MEMS usually has a weak nonlinear to no nonlinear frequency-amplitude dependence as the torsional stiffness is much more linear.

A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle θ of the MEMS mirror 12 on its scanning axis 13. For example, the MEMS mirror 12 may be configured to oscillate at a resonance frequency of 2 kHz, between +/−15 degrees to steer the light over +/−30 degrees making up the scanning range of the field of view. Thus, the field of view may be scanned, line-by-line, by a rotation of the MEMS mirror 12 about the axis of its degree of motion. One such sequence through the degree of motion (e.g., from −15 degrees to +15 degrees) is referred to as a single scan or scanning cycle. Multiple scans may be used to generate distance and depth maps, as well as 3D images by a processing unit.

While the transmission mirror is described in the context of a MEMS mirror, it will be appreciated that other 1D mirrors can also be used. In addition, the resonance frequency or the degree of rotation is not limited to 2 kHz and +/−15 degrees, respectively, and both the resonance frequency and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector detector array 15 that receives the reflected light as a receiving line RL and is configured to generate electrical measurement signals. The electrical measurement signals may be used for generating a 3D map of the environment and/or other object data based on the reflected light (e.g., via ToF calculations and processing).

The receiving line is shown as a vertical column of light that extends along one of the pixel columns in a lengthwise direction of the pixel column. The receiving line has three regions that correspond to the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The photodetector array 15 can be any of a number of photodetector types; including avalanche photodiodes (APD), silicon photomultipliers (SiPMs) photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. In other embodiments, the photodetector array 15 may be a 1D array that includes a single column of photodiodes. The activation of the photodiodes may be synchronized with light pulses emitted by the illumination unit 10. Alternatively, a single photo detector cell/pixel, as opposed to an array, may be used. For example, a single photo detector cell/pixel may be used in case of a 2×1D scanning transmitter in a coaxial LIDAR architecture.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by an APD of the APD array 15. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

Alternatively, instead of using the TDC approach, ADCs may be used for signal detection and ToF measurement. For example, each ADC may be used to detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

It will be appreciated that the above-described horizontal scanning system 100 may also be used for vertical scanning. In this case, the scanning arrangement is arranged such that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

It will be further appreciated that a LIDAR scanning system may include synchronized MEMS mirrors that are used in a 2×1D system, such as a Lissajous scanning system. In this case, the MEMS mirrors are mounted in the same location in the vehicle and are configured to scan the two dimensions (horizontal and vertical) of a common field of view.

FIG. 1B shows a schematic top view of an example of a mirror device in accordance with one or more embodiments. Referring to FIG. 1B, an example of a mirror device, such as a MEMS scanning micro mirror, is now explained. The mirror device comprises a mirror body 8. The mirror body 8 comprises a mirror 12 and a mirror support 16. The mirror device further includes a frame 17. The mirror body 8 is arranged in the frame 17. The frame 17 defines a plane, i.e., the (x, y) plane in FIG. 1B. The plane defined by the frame 17 may be parallel to planes defined by main surfaces of a layer or a plurality of layers in which the frame 17 is formed.

The mirror body 8 is rotatable around a scanning axis 13 extending in the plane defined by the frame 17. Support beams 18, which may also be referred to as torsion beams, are connected between the mirror body 8 and the frame 17 along the scanning axis 13. To be more specific, a first support beam 18 is connected between a first end of the mirror body 8 and the frame 17 and a second support beam 18 is connected between a second end of the mirror body 8 and the frame 17, where the second end of the mirror body 8 is opposite to the first end in the direction of the scanning axis 13. An enlarged view of one of the support beams 18 is shown in the enlarged portion C in the right hand side of FIG. 1B. As can be seen, support beams 18 connect parts of mirror support 16 to parts of frame 17 and permit the mirror body 8 to be rotated around scanning axis 13. The support beams 18 may be collinear with the scanning axis 13.

Those skilled in the art will appreciate that the shape of the mirror 12 can be any shape desired for a particular application, e.g., a circle, ellipse, square, rectangle or other shape as desired.

The mirror frame 17 defines a mirror recess 20 in which the mirror body 8 is arranged. The mirror recess 20 is defined by a recess periphery 28 of the mirror frame 17. The mirror frame 17 may also be structured to define further recesses in which other components may be arranged, such as actuators, sensors and leaf spring assemblies.

The mirror device can include a leaf spring assembly 30. In the example shown, the mirror device includes two pairs of leaf spring assemblies 30, where the leaf spring assembly in each pair extends from the mirror body 8 in opposite directions. In the example shown, the leaf spring assemblies 30 are arranged symmetrically with respect to the scanning axis 13. However, for QS MEMS mirrors, the leaf-springs are not used. Instead, torsion bars (or equivalent structures with several torsion bars, e.g., V-shape, PI-shape) support the MEMS mirror.

The at least one leaf spring assembly 30 includes a leaf spring 32 and a relief link 34. The relief link 34 may have one or more relief springs 35. The leaf spring 32 includes a first end 32a and a second end 32b. The first end 32a is coupled to the mirror body 8 and the second end is coupled to the frame 17. Each leaf spring 32 has a longitudinal direction or extension between the first end 32a and the second end 32b. The first end 32a is fixed to the mirror support (not illustrated) and the second end 32b is coupled to frame 17 via the relief link 34. In the examples, the first ends 32a of two leaf springs 32 extending from the same portion of the mirror body 8 in different directions may be connected to each other (e.g., the leaf springs of the left side of the mirror 12 or the leaf springs on the right side of the mirror 12), stiffened only in the vicinity of the scanning axis 13 by a reinforcement structure (not illustrated) such that the two leaf springs 32 can exert torque on the mirror body 8.

In some examples, the shape of the mirror 12 may include concave portions in the region of the scanning axis 13, wherein portions of the leaf springs 32 extend into the concave portions of the mirror 12. In some examples, leaf springs 32 and mirror 12 may be formed in a same layer of material and may be connected to each other adjacent the scanning axis 13.

In some examples, the leaf springs 32 may be implemented in a single crystal silicon layer having a direction of lower material stiffness, where the leaf springs have their longitudinal direction aligned with the direction of lower material stiffness. In some examples, the leaf springs 32 may be implemented in a silicon layer having a <100> axis and the leaf springs have their longitudinal direction aligned with the <100> direction which in this case has the lower material stiffness.

Torsional stiffness about the scanning axis 13 may be set using the leaf spring assemblies 30. The pair of support beams 18 supports the mirror body 8 vertically, i.e., perpendicular to a main surface of the frame 17, at the scanning axis 13. However, the support beams 18 may have a negligible effect on the torsional stiffness, so that the natural frequency of the mirror body may be substantially determined by the leaf spring assemblies 30. The natural frequency may be substantially independent of the support beams 18. The natural frequency as defined herein is the undamped frequency of the eigenmode of the mirror body 8 (i.e., the mirror 12) about its scanning axis 13 at small angles. The support beams 18 may define the out-of-plane rocking and vertical translational mode stiffness for the corresponding rigid body modes as well as the corresponding eigenfrequencies. The torsional stiffness can be decoupled from the out-of-plane rocking and vertical translational mode stiffness so that the out-of-plane rocking and vertical translational mode frequencies can be set to desired values, such as higher values, without influencing the torsional mode stiffness and resonance frequency.

As defined herein, the X axis is along the scanning axis 13, the Y axis is perpendicular to the X axis on the mirror plane when the mirror 12 is at rest, and the Z axis is perpendicular to and out of the mirror plane when the mirror 12 is at rest. The X, Y, and Z axis are axes of a three-dimensional Cartesian coordinate system.

In the example shown in FIG. 1B, one end of the at least one leaf spring 32 is connected to the mirror body 8 at a location close to the scanning axis 13. The other end 32b is connected to the associated relief link 34 at a location further away from the scanning axis 13. The leaf spring assemblies 30 may provide torsional stiffness to the mirror body 8 about the scanning axis 13. The relief links 34 may provide a compliant or flexible coupling from the leaf springs 32 to the frame 17. The relief links 34 may have a relatively low stiffness longitudinal to the leaf springs 32, i.e., in Y direction in FIG. 1B, which allows one end of the leaf springs 32 to move in their longitudinal direction when the mirror body 8 rotates around the scanning axis 13. The relief links 34 may have a relatively high stiffness in the transverse direction, i.e., in Z direction and in X direction in FIG. 1B.

The resonance frequency for rotation of the mirror 12 around the scanning axis 13 may be defined mainly by the inertia of the mirror body 8 and the stiffness of the leaf spring assemblies 30, which may be defined by the bending stiffness of the leaf springs 32 and by the torsional and translational stiffness of the relief links 34. The bending stiffness of the leaf springs 32 may be defined by the length, width, and, in particular, the thickness of the leaf springs 32. The combined stiffness in Y direction of the support beams 18 and the relief links 34 may prevent movement of the mirror body 8 perpendicular to the scanning axis 13 (in the X direction) during operation. More detail on the relief links is provided below.

The support beams 18 are connected between the frame 17 and the mirror body 8 along the scanning axis 13 to support the mirror body 8 in the frame 17. In one example, the support beams 18 have narrow rectangular cross-sections perpendicular to the scanning axis 13, with the long axis of the rectangle perpendicular to the face of the mirror 12 and the mirror body 8, and the short axis of the rectangle parallel to the face of the mirror 12. The torsional stiffness corresponding to a rotation of the mirror body 8 around scanning axis 13 may be provided by the leaf spring assemblies 30. The support beams 18 may serve only for support of the mirror body 8 and may have a negligible effect on the torsional stiff-ness. The support beams 18 may be sized so that the stiffness against vertical translational displacement (in Z direction) of the mirror body 8 and against its in-plane translation perpendicular to the scanning axis 13 (i.e., along the Y axis) may be as high as possible.

The mirror device may also include at least one actuator to provide torque to drive the mirror body 8 about the scanning axis 13. In one example, the actuator may be a comb-drive that includes mirror combs attached to the mirror body 8 interleaved with frame combs attached to the frame 17. Applying a difference in electrical potential between interleaved mirror combs and frame combs creates a driving force between the mirror combs and the frame combs, which creates a torque on the mirror body 8 about the scanning axis 13. An oscillating electrical potential can be applied to resonantly excite the mirror device close to its natural frequency. In this example, four comb-drives 40TL (top left), 40BL (bottom left), 40TR (top right), and 40BR (bottom right) are provided. The left side is arranged to the left of the scanning axis 13, whereas the right side is arranged to the right of the scanning axis 13. Each comb-drive comprises a stator comb-drive electrode fixed to the frame 17 and a rotor comb-drive electrode that is movable with the mirror body 8 as it rotates about the scanning axis 13.

In other examples, actuation methods may include electromagnetic actuation and piezoelectric actuators. In electromagnetic actuation, the micro mirror may be "immersed" in a magnetic field and an alternating electric current through conductive paths on the mirror body may create the oscillating torque around the scanning axis 13. Piezoelectric actuators may be integrated in the leaf springs or the leaf springs may be made of piezoelectric material to produce alternating beam bending forces in response to an electrical signal and generate the oscillating torque.

The desired rotational mode Rx of the MEMS mirror 12 about the scanning axis 13 is shown in FIG. 1B. The bidirectional arrow corresponding to the rotational mode Rx indicates that the MEMS mirror 12 is configured to oscillate about the scanning axis 13 to perform a scanning operation. Unwanted parasitic modes are also shown. For example, an in-plane translational mode Ty is shown that represents translational movement of the mirror body 8 in the Y direction. In particular, there is a resonant coupling from the desired rotational mode Rx to a translational mode in Y direction, Ty. The coupling of the mode Rx to the translational mode Ty is predominantly caused by the reinforcement structures. In addition, a nonlinear coupling can occur from the desired rotational mode Rx to an unwanted spurious yaw mode Rz. Thus, the spurious yaw mode Rz results in the mirror body 8 moving about the Z axis. Furthermore, the mode Rx can couple to the translational mode in Z direction, Tz. This coupling of Rx to Tz is predominantly caused by the reinforcement structures. The coupling of Rx to Ty and Tz, respectively, originates from inertial forces, which are caused by a rotational unbalance since the center of mass is displaced with respect to the rotation axis along the Z axis due to the mass of the reinforcement structures.

Figure 1C:
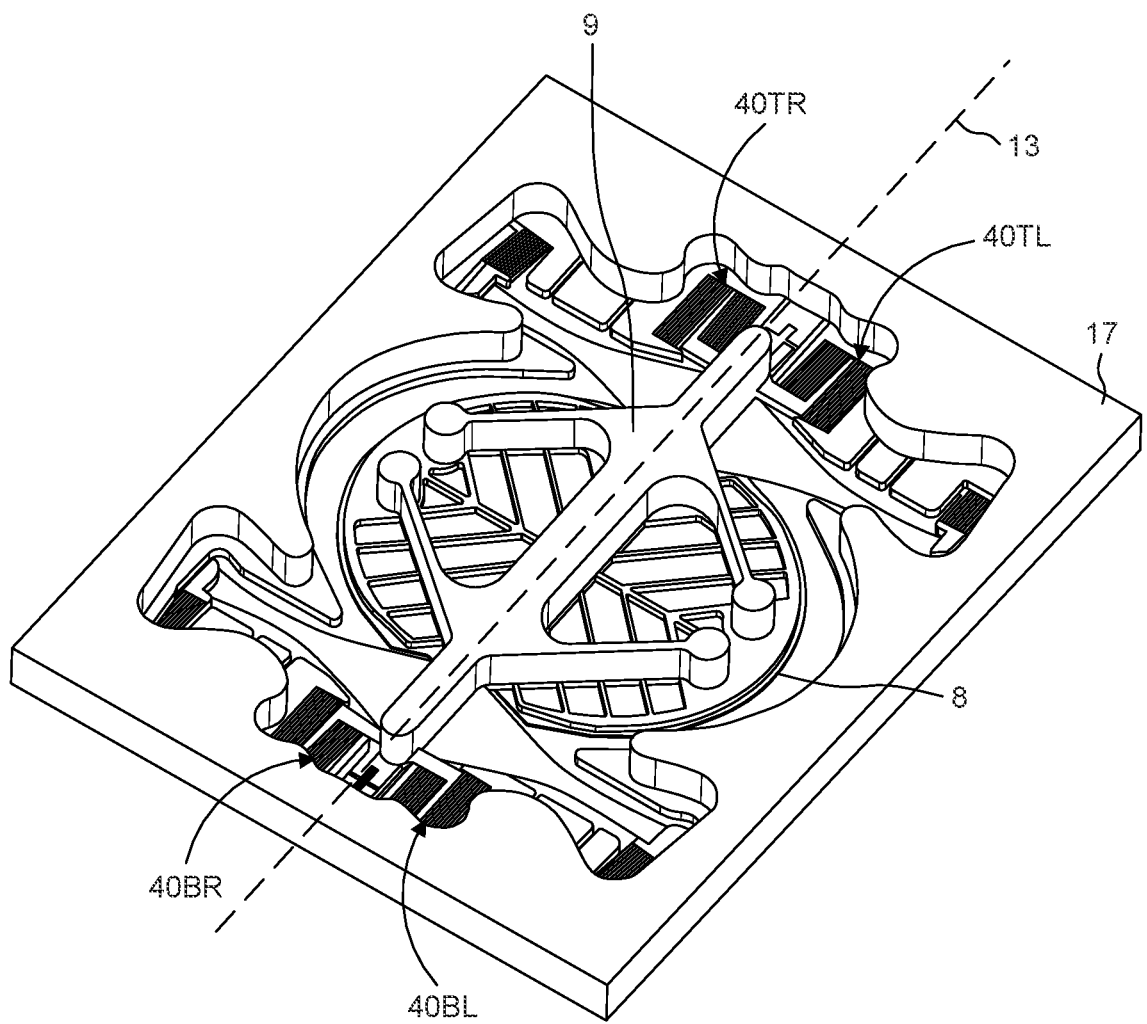
FIG. 1C shows a schematic bottom view of an example of the mirror device shown in FIG. 1B in accordance with one or more embodiments.

FIG. 1C shows a schematic bottom view of an example of the mirror device shown in FIG. 1B in accordance with one or more embodiments. In particular, an underside of the mirror body 8 and the frame 17 are shown. The four comb-drives 40TL, 40BL, 40TR, and 40BR are also visible. Here, the reinforcement structure 9 that supports the mirror body 8 can be seen.

Figure 1D:
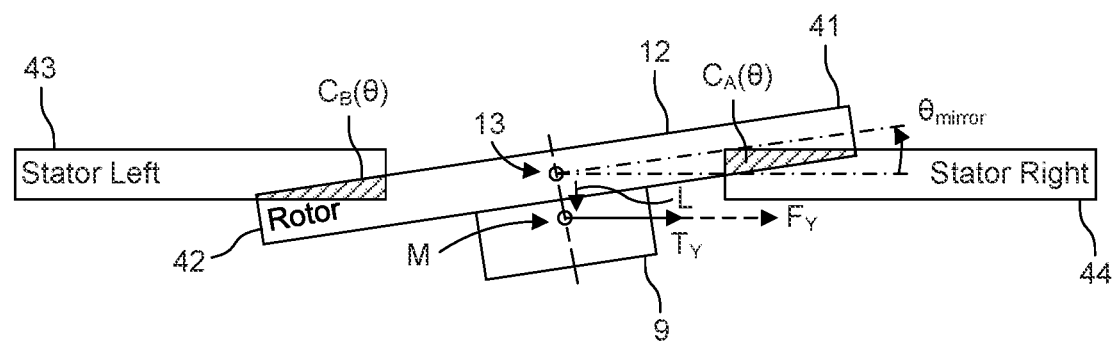
FIG. 1D illustrates a cross-sectional view of a MEMS mirror and driver electrodes in accordance with one or more embodiments.

FIG. 1D illustrates a cross-sectional view of a MEMS mirror and driver electrodes in accordance with one or more embodiments. In particular, MEMS mirror 12 is shown rotating around a rotation axis 13 that extends orthogonal to the page. The MEMS mirror 12 includes mirror comb electrodes 41 and 42, to which a drive voltage $v_{drive}$ is applied. As described above, the MEMS mirror 12 is supported by a mirror frame 17 (not illustrated). The mirror frame 17 includes static comb electrodes 43 and 44. The mirror comb electrodes 41 and 42, coupled to opposing ends of the mirror body 8, move along with the oscillation of the MEMS mirror 12. The drive voltage $v_{drive}$ induces a driving force between interdigitated mirror comb electrodes 41, 42 and the static comb electrodes 43, 44. In particular, the MEMS mirror 12 is driven in parametric resonance by a square wave voltage with 50% (or different) duty cycle.

A first drive capacitor $C_A$ (also referred to as $C_A(\theta)$) is formed by an overlap of electrodes 41 and 44. The overlap of the two electrodes 41 and 44 varies with the rotation angle $\theta_{mirror}$ of the MEMS mirror 12 about the rotation axis 13. As the overlap increases, so does the capacitance of the first drive capacitor $C_A$. Conversely, the capacitance of the first drive capacitor $C_A$ decreases as the overlap decreases.

Similarly, a second drive capacitor $C_B$ (also referred to as $C_B(\theta)$) is formed by an overlap of electrodes 42 and 43. The overlap of the two electrodes 42 and 43 varies with the rotation angle $\theta_{mirror}$ of the MEMS mirror 12 about the rotation axis 13. As the overlap increases, so does the capacitance of the second drive capacitor $C_B$. Conversely, the capacitance of the second drive capacitor $C_B$ decreases as the overlap decreases.

Thus, the first drive capacitor $C_A$ is a function of the rotation angle $\theta$ that stores a first charge based on the rotation angle $\theta_{mirror}$ of the MEMS mirror 12 resulting in a first displacement current that is also dependent on the rotation angle $\theta$ of the MEMS mirror 12. Similarly, the second drive capacitor $C_B$ is also a function of the rotation angle $\theta_{mirror}$ that stores a second charge based on the rotation angle of the MEMS mirror 12 resulting in a second displacement current that is also dependent on the rotation angle of the MEMS mirror 12.

For the QS MEMS, the actuation is unipolar, this means for positive deflection angle the one capacitor increases (immersed combs) and the other capacitance is around zero (not immersed combs). For negative deflection it is vice versa. For resonant MEMS, the two drive capacitors each have a symmetric capacitance characteristic according to the deflection direction (e.g., the tilt direction) of the MEMS mirror 12. However, bipolar actuation may also be used, where a third capacitor is formed with the middle electrode (like resonant electrode).

More specifically, this means that with perfectly aligned combs $C_A(-\theta_{mirror})=C_A(\theta_{mirror})$ and $C_B(-\theta_{mirror})=C_B(\theta_{mirror})$, i.e. both capacitances are even functions with symmetric capacitance dependence, which do not change their value if the angle of the mirror is reversed. Because of design symmetry, $C_A(\theta_{mirror})=C_B(\theta_{mirror})$ also holds true. It is also to be noted that while two drive capacitors $C_A$ and $C_B$ are shown in the cross-sectional view, four drive capacitors are present, as shown in FIGS. 1B and 1C. Thus, four displacement currents are generated based on the rotation angle $\theta_{mirror}$. Because of the symmetry of the capacitances for $\theta \rightarrow -\theta$, the scanning direction (e.g., clockwise or counter-clockwise) could not be detected for an ideal and pure Rx rotational motion.

FIG. 1D further shows the mode coupling between the Rx mode and the Ty mode caused by a displacement L between the center of mass M from the rotational axis (scanning axis 13), due to the reinforcement structure 9. The coupling force originates from the Euler force according to Equation 1:

$$f_Y(t)=mL\ddot{\theta}_m(t) \qquad \text{Eq. 1,}$$

with the mirror mass m and the rotational acceleration $\ddot{\theta}_{mirror}(t)$. Thus, the Ty mode is excited by the inertial force $f_y(t)$ having the same frequency content as the Rx trajectory θ(t) by virtue of the dependence on the rotational acceleration, which is the second derivative of the trajectory. Additionally, the Rx and Ty eigenmodes are not perfectly pure rotational and translation modes, respectively, meaning that a non-zero amplitude of the Ty mode also has a small rotational admixture, i.e., a rotation about the X axis.

One or more embodiments use the change in the sensing signal (e.g., a current signal) of a subset of the comb-drive electrodes, caused by an excited parasitic mode to detect the scanning direction (e.g., clockwise or counter-clockwise) as well as the movement amplitude and phase of parasitic modes, i.e., Ty, Tz, and Rz. A subset of comb-drive electrodes may include any combination of left/right, top/bottom, frontside/backside electrodes.

The Euler force caused by the finite displacement L between center of mass M and rotational axis 13 leads to a small excitation of Ty superimposed onto the Rx motion. This superimposed motion removes the symmetry of the displacement currents for θ and −θ such that the sign of the angle, i.e., the scanning direction, can be detected.

The subset of the comb-drive electrodes can be a subset of stator or rotor electrodes or in the 2D MEMS mirror case a subset of rotor, inner frame, and/or outer frame (i.e., actual stator). As an example, different cases are shown where two current signals are subtracted (e.g., a left current signal from a right current signal) to get the highest efficiency. However, it could be also possible to detect the modes by only one side currents or even only the current of one comb-drive, but with lower efficiency. Also, the sensing does not have to be based on the current. It can be any method that provides a sensing signal, which is related to a capacitance or capacitance change of one or more of the drive capacitors (e.g., charge sensing, current sensing, or frequency modulation-based sensing).

After detection, the parasitic modes Ty, Tz, Ry, and Rz can be actively damped. In particular, a system controller 23 can apply counteracting force/torque by suitable selection of comb electrodes in any combination (either combs for common usage of actuation/sensing/damping or even individual combs for damping only). A suitable selection of comb electrodes means that the selection will have a force/torque corresponding to the identified parasitic mode and can counteract the mirror motion in this identified parasitic mode. Thus, the selection of comb electrodes to which a counteractive force (e.g., a damping voltage) is to be applied is based on the parasitic mode Ty, Tz, Ry, Rz, etc. that is targeted by the system controller 23 for damping based on its detection by the system controller. A switching network may be used by the system controller 23 to apply the counteractive force to selected comb electrodes corresponding to the targeted parasitic mode at a timing that is effective for damping the targeted parasitic mode. This parasitic mode detection, identification, and targeting damping will be described in detail below.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry for processing data, as well as control circuitry, such as a microcontroller, that is configured to generate control signals. The LIDAR scanning system 200 may also include a temperature sensor 26.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the APD diodes of the photodetector array 15 and transmit the electrical signals as raw analog data or raw digital data to the system controller 23. In order to transmit the raw data as digital data, the receiver circuit 24 may include an ADC and a field programmable gate array (FPGA). The receiver circuit 24 may also receive trigger control signals from the system controller 23 that triggers an activation of one or more APD diodes. The receiver circuit 24 may also receive gain setting control signals for controlling the gain of one or more APD diodes.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes (e.g., APD diodes) are activated to sense, and thus measure, a reflected light signal. Thus, a higher accuracy in position sensing of the MEMS mirror results in a more accurate and precise control of other components of the LIDAR system.

The MEMS driver 25 may also measure and record mirror frequency and currents using a change in capacitance in a comb-drive rotor and stator of an actuator structure used to drive the MEMS mirror 12. The MEMS mirror 12 further includes the suspension structure discussed above. Thus, the MEMS driver 25 may further include a measurement circuit configured to measure one or more characteristics of the MEMS mirror 12 described herein. The MEMS driver 25 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

Additionally, or alternatively, the system controller 23 may receive measurement information from the measurement circuit of the MEMS driver 25 and perform processing thereon. Thus, system controller 23 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

For the QS MEMS the rotation position is measured (and controlled) continuously using the sensing circuit (at the rotor).

For a resonant MEMS: By sensing the rotation position of the MEMS mirror 12 about its rotation axis (scanning axis), the MEMS driver 25 can sense zero-crossing events of the MEMS mirror 12. A zero-crossing event is an instance when the MEMS mirror 12 has a rotation angle of 0° about its rotation axis (scanning axis). Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clock-wise and counter-clockwise), a zero-crossing event occurs twice during a scanning period—once as the mirror oscillates in the first rotation direction and once as the mirror oscillates in the second rotation direction. It will also be appreciated that angle-crossing events at another predefined angle may also be used instead of a zero-crossing event.

In some embodiments, an event time may correspond to a non-zero-crossing event. For example, the sensed rotation angle may be some angle other than 0°. However, for the purpose of explanation, examples herein will be described in the context of sensing zero-crossing events.

The MEMS driver 25 is configured to detect each zero-crossing event and record a timing for each event. This timing information (i.e., measured zero-crossing time) can then be transmitted to the system controller 23 as position information. Specifically, the MEMS driver 25 triggers a change in the output of a position signal (position_L) at each zero-crossing event or angle-crossing event.

Figure 3:
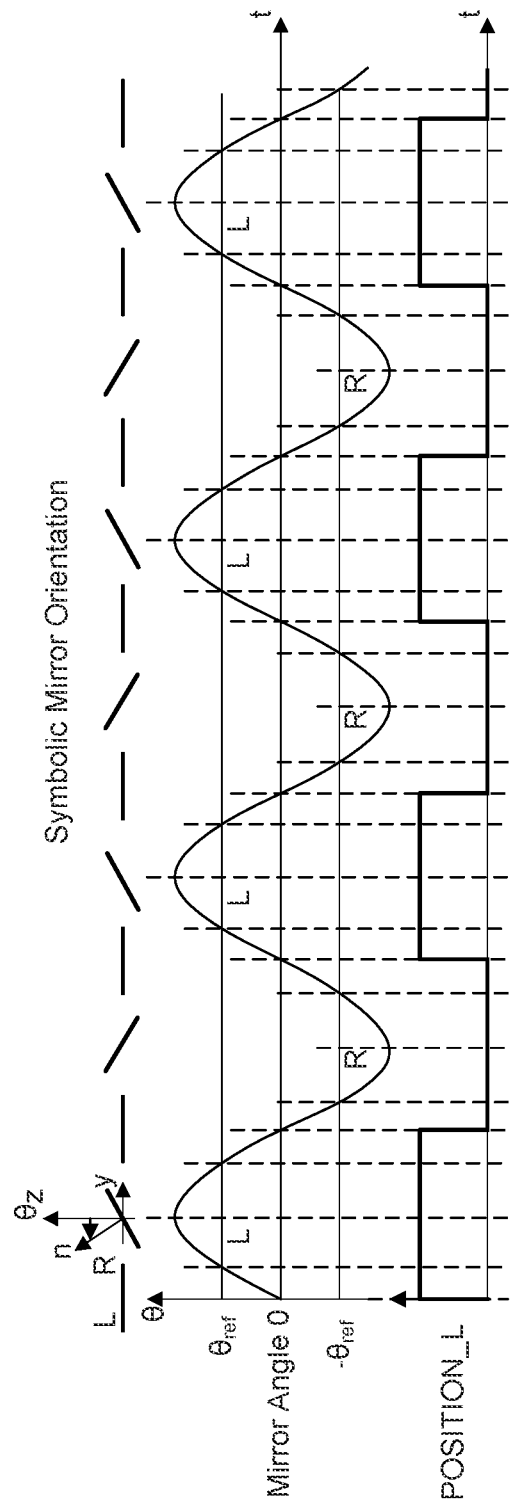
FIG. 3 illustrates a signal diagram of various signals generated by a MEMS driver based on a mirror angle $\theta$ and/or position according to one or more embodiments.

FIG. 3 illustrates a signal diagram of various signals generated by a MEMS driver 25 based on the mirror angle θ and/or position, including a position signal (position_L). For example, the position signal (position_L) may be a pulsed signal during which a first pulse transition (e.g., falling-edge transition) is triggered at a zero-crossing as the mirror oscillates in a first rotation direction (e.g., from left to right) and a second pulse transition (e.g., rising-edge transition) is triggered at a zero-crossing as the mirror oscillates in a second rotation direction (e.g., from right to left). Furthermore, the signal is "high" when the mirror points in one direction (e.g., points left) and the signal is "low" when the mirror points in a second direction (e.g., points right). Thus, the position signal not only indicates a zero-crossing event by triggering a pulse transition, but also indicates absolute phase information by indicating the directional tilt of the mirror. When the interval between zero-crossing events increases, then the frequency of the position signal decreases. Based on this position signal both a phase and/or a frequency of two or more position signals can be compared.

Alternatively, a short pulse may be generated by the MEMS driver 25 at each zero-crossing event such that a pulsed position signal (position_L) is output to the system controller 23. That is, the signal remains low (or high) between zero-crossing pulses. In this case, the absolute phase information indicating which direction the mirror is moving would be absent because the low-level (high-level) of the position signal (position_L) does not indicate whether the mirror is pointing left or right. Based on this position signal a phase and/or a frequency of two or more position signals can be compared.

The MEMS driver 25 may send the position information to the system controller 23 so that the system controller 23 can use the position information to control the triggering of the laser pulses of the illumination unit 10 and the activation of the photodiodes of the photodetector array 15. The position information may also be used by the system controller as feedback information such that the system controller 23 can maintain a stable operation of the MEMS mirror 12 via control signals provided to the MEMS driver 25 and also maintain synchronization with other MEMS mirrors.

The MEMS mirror 12 includes an actuator structure used to drive the mirror. The actuator structure includes interdigitated finger electrodes made of interdigitated mirror combs and frame combs to which a drive voltage $v_{drive}$ (i.e., an actuation or driving signal) is applied by the MEMS driver 25. The drive voltage may be referred to as a high-voltage (HV). The frame comb fingers and the mirror comb fingers form the electrodes of a capacitor. The drive voltage across the finger structure creates a driving force between interdigitated mirror comb electrodes and the frame comb electrodes, which creates a torque on the mirror body 8 about the rotation axis. The drive voltage can be switched or toggled on and off resulting in an oscillating driving force. The driving waveform of the drive voltage can be any waveform, including sinusoidal, triangular, rectangular, etc. The oscillating driving force causes the mirror to oscillate back and forth around its rotation axis between two extrema. Depending on the configuration, this actuation can be regulated or adjusted by adjusting the drive voltage off time, a voltage level of the drive voltage, or a duty cycle.

In other embodiments, an electromagnetic actuator may be used to drive the MEMS mirror 12. For an electromagnetic actuator, a driving current (i.e., an actuation or driving signal) may be used to generate the oscillating driving force. Thus, it will be appreciated that drive/driving voltage and drive/driving current may be used interchangeably herein to indicate an actuation signal or a driving signal, and both may generally be referred to as a driving force.

As the mirror oscillates, the capacitance or charge between the finger electrodes changes according to the mirror's rotation position. The MEMS driver 25 is configured to measure the capacitance or charge between the interdigitated finger electrodes via, for example, the four quadrant comb-drive displacement currents, and determine a rotation position or angle position of the MEMS mirror 12 therefrom. More specifically, the displacement currents are the time derivatives of the respective capacitances multiplied by the voltage, i.e. derivative quantities are measured instead of the capacitance or charge. By monitoring the displacement currents, the MEMS driver 25 can detect the zero-crossing events and other non-zero angle events and timings thereof, and can determine the deflection or the tilt angle of the MEMS mirror 12 at any given moment. The MEMS driver 25 can also use the measured displacement currents to determine a mirror frequency, and record the information in a memory at the MEMS driver 25 or at the system controller 23.

The sensing of the position of the MEMS mirror 12 is performed based on a detector that is configured to measure the capacitance by the displacement current or displacement charge (i.e. integrated current). The capacitance or charge sensing can be performed indirectly by measuring derived quantities, such as the displacement currents. For example, as the MEMS mirror moves, the geometry of the finger structure changes, resulting in a change in the geometry of the capacitor. As the geometry of the capacitor changes, the capacitance of the capacitor changes. Thus, a specific capacitance corresponds directly to a specific deflection position (e.g., tilt angle) of the MEMS mirror. By sensing the capacitance of the finger structure, the MEMS driver 25 can monitor and track the oscillations of the mirror, and determine a specific position of the MEMS mirror, including the zero-crossing.

One way to measure the capacitance is to measure a current flowing through the finger electrode structure, convert the measured current into a voltage, and then further correlate the voltage to a capacitance and/or a rotation angle θ. However, any method to measure the capacitance may be used.

The sign of the currents (i.e., positive or negative capacitance change over time) only indicate if the MEMS mirror is moving towards the rest position (positive currents→capacitor charging) or is moving away from the rest position (negative currents→capacitor discharging). If the MEMS mirror is moving towards the rest position (approaching zero) this can be both in a clockwise swing or in a counter-clockwise swing. There is no way to distinguish the rotation direction from the sign of the currents for comb-drives with symmetric capacitance dependence, $C_A(-\theta_{mirror})=C_A(\theta_{mirror})$ and $C_B(-\theta_{mirror})=C_B(\theta_{mirror})$.

Since the mirror is driven at an oscillation frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

As noted above, one or more embodiments uses the change in a sensing signal (e.g., a current signal) of a subset of the comb-drive electrodes, caused by an excited parasitic mode to detect the scanning direction (e.g., clockwise or counter-clockwise) as well as the movement amplitude and phase of parasitic modes, i.e., Ty, Tz, and Rz. Here, the difference in the capacitance of each comb-drive, the difference in each of the four quadrant comb-drive displacement currents, or the difference of the displacement currents of specific combinations of the quadrants may be used. After detection, any of the parasitic modes Ty, Rz, Ry, and/or Tz can be avoided or actively damped.

Figure 4A:
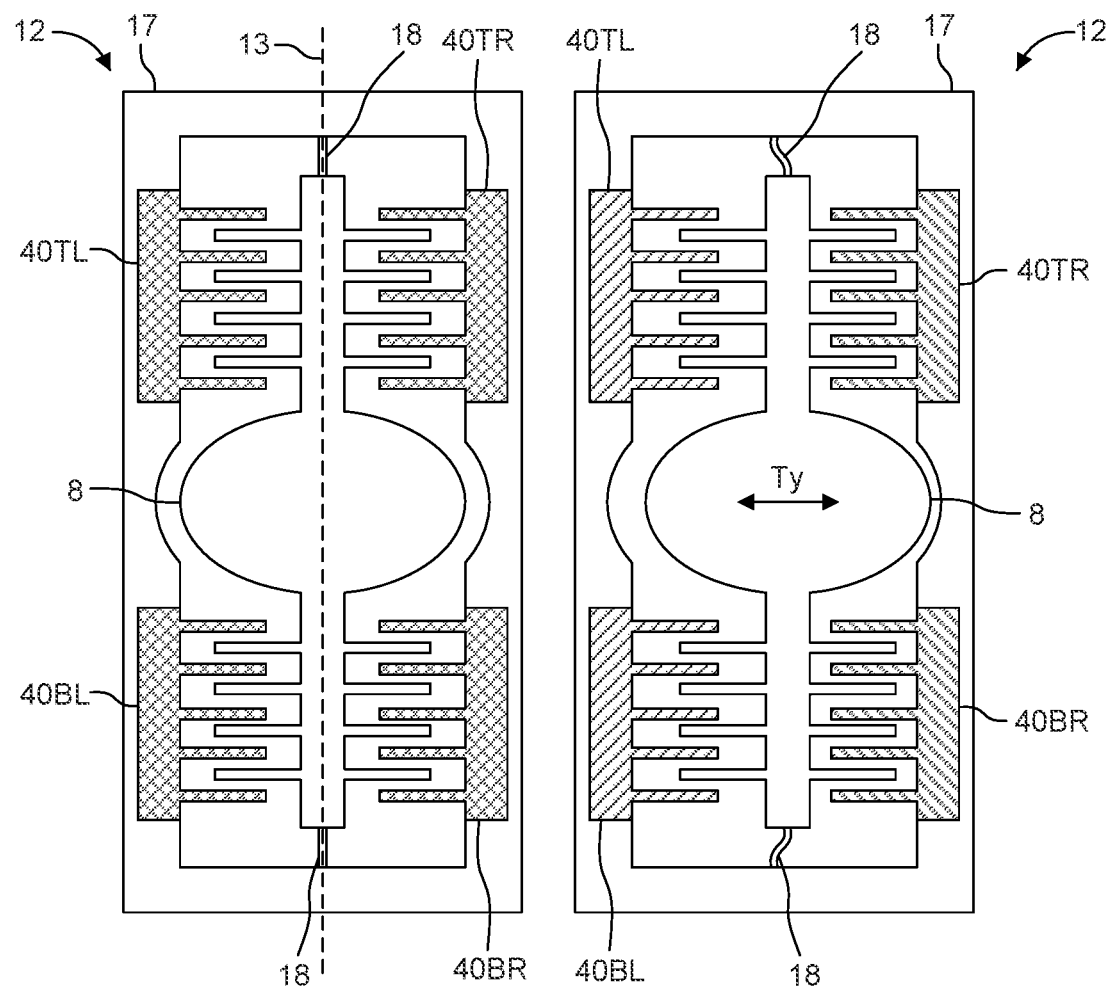
FIG. 4A illustrates a top view of a MEMS mirror arranged in a nominal centered position (left) and a translational shifted position (right) according to one or more embodiments.

FIG. 4A illustrates a top view of a MEMS mirror arranged in a nominal centered position (left) and a translational shifted position (right) according to one or more embodiments. On the left, MEMS mirror 12 (mirror body 8) operates in a pure rotational mode Rx about the scanning axis 13 and the torsion bars 18 are not bending. The four comb-drives 40TL, 40BL, 40TR, and 40BR are symmetrically situated within the frame 17. In contrast, on the right, the MEMS mirror 12 (mirror body 8) is shifted to the right in the translational Y direction and oscillates back and forth in the Y direction because of mode coupling of the Rx mode to the Ty mode. Here, the torsion bars 18 bend back and forth in the Y direction. A stator electrode of a comb-drive is mechanically coupled to the frame 17, whereas the rotor electrode of a comb-drive is mechanically coupled to the mirror body 8. The stator comb-drive electrodes are separated into left pairs (stators of comb-drives 40TL and 40BL) and right pairs (stators of comb-drives 40TR and 40BR) to detect the Rx-Ty-mode coupling.

Embodiments further include a sensing circuit that is electrically coupled to the stator comb-drive electrodes of each comb-drive 40TL, 40BL, 40TR, and 40BR to receive their respective displacement currents therefrom. The stator comb-drive electrodes are electrically coupled to the sensing circuit in such a way to detect the mode of interest such as the Ty mode, the Rz mode, or the Tz mode. It is also possible to separate the rotor comb-drive electrodes and to sense those electrodes instead of the ones of the stator. Furthermore, it is not necessary to measure the displacement current or to use all comb-drives for the sensing. Any signal which is related to a capacitance or capacitance change may be used.

Figure 4B:
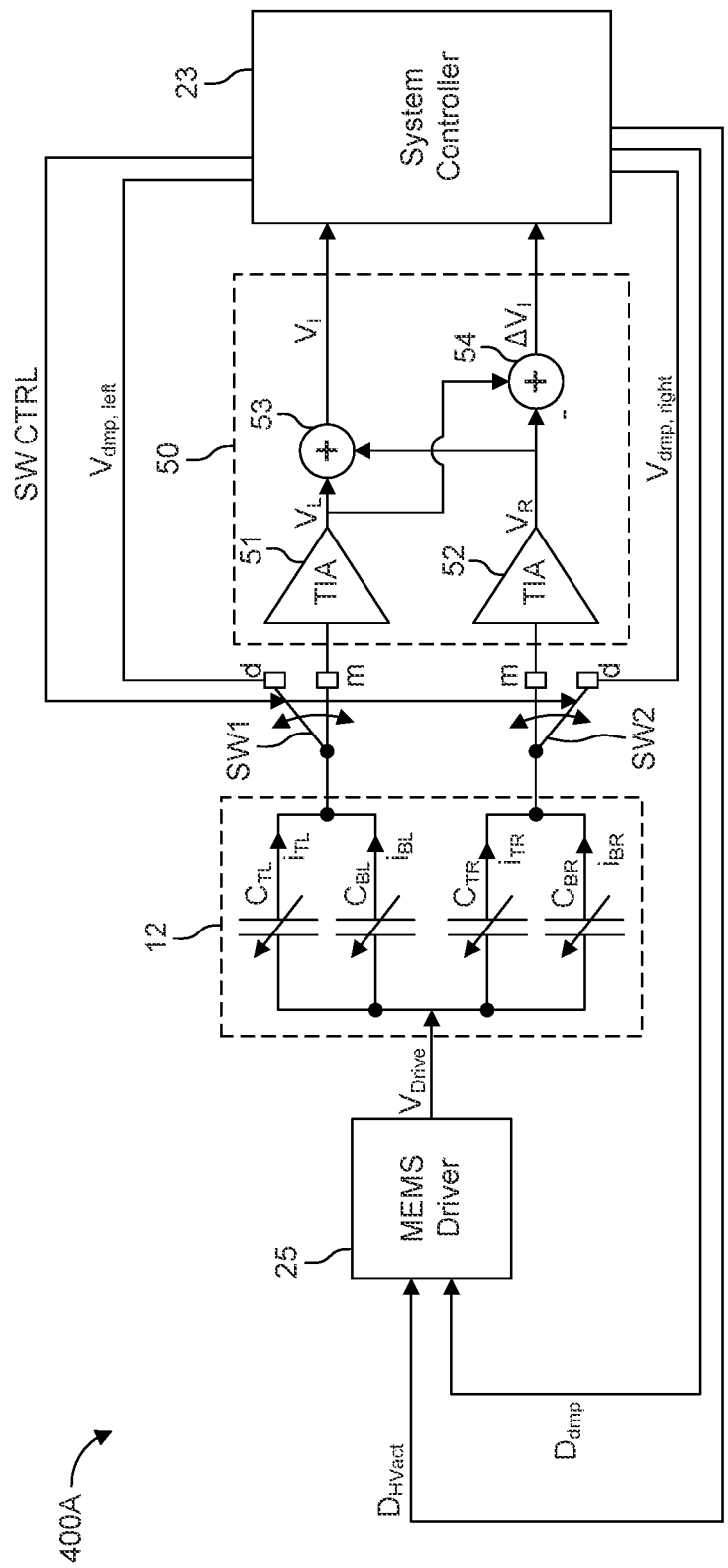
FIG. 4B is a schematic diagram of a translational mode Ty measurement and mode damping system according to one or more embodiments.

FIG. 4B is a schematic diagram of a translational mode Ty measurement and mode damping system 400A according to one or more embodiments. The translational mode Ty measurement system 400A includes the MEMS driver 25, the MEMS mirror 12 with four comb-drives 40TL, 40BL, 40TR, and 40BR, a sensing circuit 50, and the system controller 23.

The MEMS driver 25 receives a digital control signal DHVact and drives the Rx mode of the MEMS mirror 12 (i.e., the rotation about the scanning axis 13) in accordance with the digital control signal $D_{HVact}$. The digital control signal $D_{HVact}$ may be a single bit digital signal (i.e., indicating 0 for off and a 1 for on), or may be a multi-bit digital signal that can be indicated different levels (e.g., different voltage levels). The MEMS driver 25 may include a digital to analog converter (DAC) that generates the drive voltage $v_{drive}$ based on the digital value of the digital control signal DHVact. As explained below, the MEMS driver 25 may also add or superimpose a value of a damping signal Vdmp onto the value of the digital control signal DHVact to generate a drive voltage with a damping voltage, or just a damping voltage (e.g., if the drive voltage is zero). In this way, DHVact is a digital input to a DAC that generates voltages in the range of 0V-200V. The driving voltage Vdrive can then be any waveform.

The MEMS driver 25 generates the drive voltage $v_{drive}$ with the appropriate duty cycle and applies the drive voltage $v_{drive}$ to the mirror comb electrodes of the four comb-drives 40TL, 40BL, 40TR, and 40BR. As a result of the movement of the MEMS mirror 12 about its scanning axis 13, the drive capacitances $C_{TL}$, $C_{BL}$, $C_{TR}$, and $C_{BR}$ of the four comb-drives 40TL, 40BL, 40TR, and 40BR change and displacement currents $i_{TL}$, $i_{BL}$, $i_{TR}$, and $i_{BR}$ are generated by their respective drive capacitances. The sensing circuit 50 is coupled to the stator comb electrodes of the four comb-drives 40TL, 40BL, 40TR, and 40BR and extracts the displacement currents $i_{TL}$, $i_{BL}$, $i_{TR}$, and $i_{BR}$ therefrom.

In order to measure the translational mode Ty, the two left side displacement currents $i_{TL}$ and $i_{BL}$ are provided to an input of a transimpedance amplifier (TIA) 51 of the sensing circuit 50. While a TIA is used in this example, it will be appreciated that other sensing elements used for capacitive sensing may be used. For example, any sensing circuit that performs charge sensing, current sensing, or frequency modulation-based sensing may be used to generate sensing signals. TIA 51 may be coupled to the MEMS mirror 12, and specifically to the stators of assigned comb-drives by a switch SW1. The switch SW1 may be controlled by the system controller 23 (via a switch control signal SW CTRL) to perform mode measurements when the switch SW1 is in position 'm' or to perform a damping operation when the switch SW1 is in position 'd', where 'm' represents a measurement position of the switch for taking measurements of the corresponding comb-drives and 'd' represents a damping position of the switch used for applying a damping voltage Vdmp,left to the corresponding left-side comb-drives. As a result of TIA 51 receiving the displacement currents $i_{TL}$ and $i_{BL}$, the sum of the two left side displacement currents $i_{TL}$ and $i_{BL}$ is converted into a left side voltage $V_L$ by TIA 51.

Similarly, the two right side displacement currents $i_{TR}$ and $i_{BR}$ are provided to an input of a TIA 52 of the sensing circuit 50. Again, while a TIA is used in this example, it will be appreciated that other sensing elements used for capacitive sensing may be used. For example, any sensing circuit that performs charge sensing, current sensing, or frequency modulation-based sensing may be used to generate sensing signals. TIA 52 may be coupled to the MEMS mirror 12, and specifically to the stators of assigned comb-drives by a switch SW2. The switch SW2 may be controlled by the system controller 23 (via a switch control signal SW CTRL) to perform mode measurements when the switch SW2 is in position 'm' or to perform a damping operation when the switch SW1 is in position 'd', where 'm' represents a measurement position of the switch for taking measurements of the corresponding comb-drives and 'd' represents a damping position of the switch used for applying a damping voltage Vdmp,right to the corresponding right-side comb-drives. As a result of TIA 51 receiving the displacement currents $i_{TR}$ and $i_{BR}$, the sum of the two right side displacement currents $i_{TR}$ and $i_{BR}$ is converted into a right side voltage $V_R$ by TIA 52.

Alternatively, each comb-drive electrode may be coupled to a separate TIA and then the individual voltage signals may be added and/or subtracted such that the sensing circuit 50 is able to detect each mode at the same time. In other words, four TIAs may be used, each being individually connected to a respective drive electrode (i.e., capacitances $C_{TL}$, $C_{BL}$, $C_{TR}$, and $C_{BR}$) of the four comb-drives 40TL, 40BL, 40TR, and 40BR.

Figure 4C:
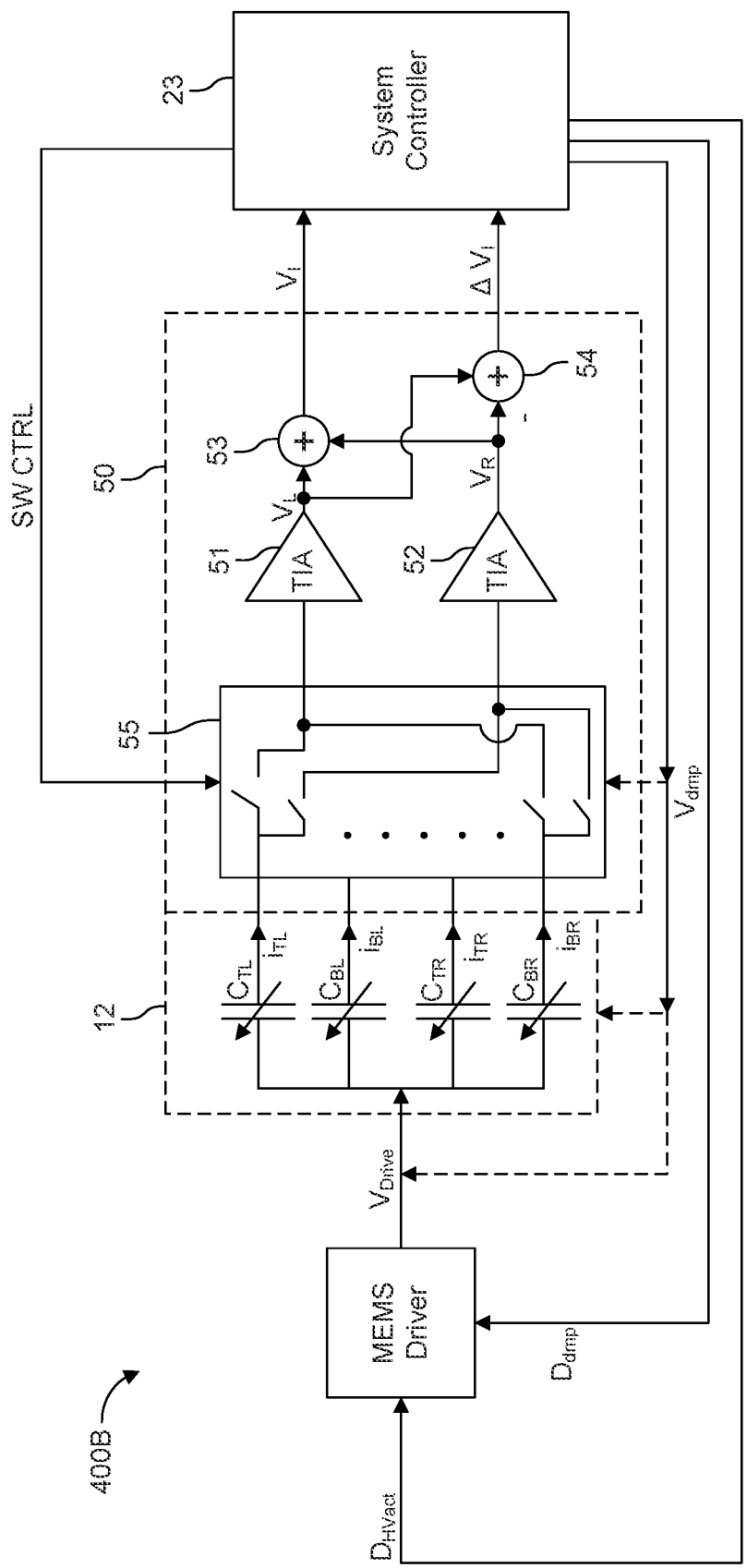
FIG. 4C is a schematic diagram of a parasitic mode measurement and mode damping system according to one or more embodiments.

FIG. 4C is a schematic diagram of a parasitic mode measurement and mode damping system 400B according to one or more embodiments. The parasitic mode measurement system 400B is similar to system 400A, with the exception that the sensing circuit 50 includes a switching network 55 that switchably couples the drive electrode (i.e., capacitances $C_{TL}$, $C_{BL}$, $C_{TR}$, and $C_{BR}$) of the four comb-drives 40TL, 40BL, 40TR, and 40BR to TIAs 51 and 52 in any combination. The switching network 55 may be a network of eight switches—two for each drive electrode—that switchably connect their respective drive electrode to the TIAs 51 and 52. Such a switching network allows the input configuration to the TIAs 51 and 52 to be entirely configurable for receiving displacement currents $i_{TL}$, $i_{BL}$, $i_{TR}$, and $i_{BR}$ in any combination to allow the sensing circuit 50 to measure individual parasitic modes or to detect each mode at the same time (e.g., if individual TIAs are also provided). The switch control signal SW CTRL, representative of one or more control signals, may control the switches of the switching network 55. It is also possible that a network of multiplexers could be used.

As an example, two pairs of switches are shown for two drive electrodes correspond to comb-drives 40TL and 40BR where one switch of each pair is coupled to TIA 51 and the other one switch of each pair is coupled to TIA 52. Other switch pairs are provided, though not illustrated, in a similar manner for the remaining comb-drives so that their respective displacement currents and be switchably provided to either TIA 51 or TIA 52.

Turning back to FIG. 4B, the sensing circuit 50 further includes a summer 53 and a subtractor 54. The summer 53 receives both the left side voltage $V_L$ and the right side voltage $V_R$ and sums them together to generate a summed voltage $V_1$ that represents the sum of all the displacement currents in, $i_{BL}$, $i_{TR}$, and $i_{BR}$. Conversely, the subtractor 54 receives both the left side voltage $V_L$ and the right side voltage $V_R$ and subtracts the right side voltage $V_R$ from the left side voltage $V_L$ to generate a difference voltage $\Delta V_1$ that represents the difference between the left side currents $i_{TL}$, $i_{BL}$ and the right side currents $i_{TR}$, $i_{BR}$. The summed voltage $V_1$ (i.e., the summed current signal or measurement signal) allows precise phase as well as amplitude measurements of the Rx mode that the system controller 23 uses for proper MEMS mirror control. However, the summed voltage $V_1$ does not provide any information about the scanning direction, as the four comb-drives are symmetric. On the other hand, the difference voltage $\Delta V_1$ (i.e., the difference current signal or differential measurement signal) provides scanning direction dependent signals for the Rx mode. It also provides the amplitude of the Ty mode and the phase of the Ty mode, relative to the Rx mode. Thus, the system controller 23 can determine the scanning direction (clockwise or counterclockwise) of the MEMS mirror 12 based on the difference voltage $\Delta V_1$. The system controller 23 may generate the digital control signal $D_{HVact}$ based on the phase, the amplitude ($\theta_0$), and the scanning direction. For example, the sign of the difference voltage $\Delta V_1$ may indicate the scanning direction.

In implementation, an additional memory can be used by the system controller 23 to record the scanning direction even though the difference voltage $\Delta V_1$ is weak at certain operating points. The memory or filter can be used to confirm the direction based on a weak signal or reduce the noise in the measurements, e.g. via averaging.

Another usage of the proposed method is to detect the Ty mode amplitude by evaluating the difference voltage $\Delta V_1$ (i.e., the difference current signal) by the system controller 23. This can be used for safety issues such as material failure or the possibility of electrostatic pull-in.

In case that the Rx trajectory is not a single sine wave, but consists of multiple harmonics, one harmonic may hit the Ty mode resonance frequency. Experiments showed, that for the MEMS mirror 12, the 5th harmonic of the Rx trajectory can lead to a Ty mode resonance when sweeping through the MEMS mirror response curve. However, depending on the design of the MEMS mirror 12, the separation factors between the Rx and Ty modes may be different such that a different harmonic of the Rx trajectory can lead to the Ty mode resonance.

If the coupling Rx-Ty-coupling via the Euler force fulfills such a resonance condition, the Ty mode is excited to much higher amplitudes than in the non-resonant coupling case. The rotational motion of the mirror can be distorted by a strong 5th (or other) harmonic, due to the large movement amplitude of the Ty mode. This is a consequence of the Ty mode not being a pure translational mode. Rather, it contains a small rotational component, which leads to the distortion of the overall rotation, which is the overall effect of the Rx rotation and the small rotational contribution of the Ty mode.

The fifth ($5^{th}$) harmonic content of the overall rotational motion obtained by a sweep through part of the MEMS mirror response curve for different driving voltages shows that the Ty response curve has an upper branch (top response curve) with a high Ty mode amplitude as well as a lower branch (bottom response curve) with low Ty mode amplitude.

The system controller 23 can be configured to monitor the difference voltage $\Delta V_1$ at different operating points (e.g., at the Ty mode resonance peak and at off-resonance). Based on the signal shape of the difference voltage $\Delta V_1$, both operation points can be clearly distinguished. Hence, the system controller 23 is able to determine whether the current operation point of the MEMS mirror is on the upper branch or on the lower branch of the 5th harmonic of the response curve of the overall rotation, without the need of a trajectory measurement. Based on this information, the system controller 23 can adjust the digital control signal $D_{HVact}$ in order to force a jump from the upper branch to the lower branch of the 5th harmonic. This can be achieved by an increase in the driving frequency of the digital control signal $D_{HVact}$ beyond the fall-back frequency of the upper response curve of the Ty mode resonance such that the Ty mode excitation collapses. Also, the proposed mode damping can be also applied via damping signal Vdmp to force a jump to the lower branch.

In other words, the system controller 23 can determine the Ty mode amplitude from the difference voltage $\Delta V_1$ and determine whether the MEMS mirror 12 is on the upper branch or on the lower branch of the 5th harmonic based on the determined Ty mode amplitude. If the Ty mode amplitude exceeds a predetermined amplitude threshold, the system controller 23 determines that the MEMS mirror 12 is on the upper branch of the 5th harmonic of the Rx mode and takes countermeasure by adjusting the digital control signal $D_{HVact}$.

After an unwanted parasitic oscillation has been detected (e.g., mode Ty, mode Rz, mode Ry, or mode Tz), it can be actively damped. Because a small Ty-mode amplitude is typically present during normal operation, a threshold should be defined for a stronger unwanted excitation of the Ty mode caused by resonant coupling. That is, active damping is applied when a non-zero threshold is exceeded with the threshold being set to allow for some small Ty-mode amplitude that occurs normally. The threshold can be determined for a specific design by experiments and numerical simulations that off-resonance amplitudes of the Ty mode of up to 1-3 µm can occur. On-resonance coupling via a harmonic of the Rx trajectory or by direct excitation of the comb-drive can lead to higher amplitudes. Hence, a threshold can be chosen based on a dynamic model of the coupling determining that amplitudes of larger than 3 µm of the Ty amplitude are considered to be caused by on-resonance coupling. This threshold for the mechanical amplitude of the Ty mode can be converted into a corresponding threshold for the magnitude of the difference voltage $\Delta V_1$.

Alternatively, the frequency content of the difference voltage $\Delta V_1$ can be monitored by the system controller 23. Off-resonance coupling will lead to a Ty-movement at the same frequency as Rx. In contrast, on-resonance coupling, e.g. via the fifth harmonic content of the mirror trajectory for a specific design, will lead to a sharp increase of the fifth harmonic content in the difference voltage $\Delta V_1$. It can be determined that if the spectral component of the difference voltage $\Delta V_1$ corresponding to the fifth harmonic increases by a pre-determined factor, e.g. by a factor of 5, this is considered a detection of on-resonance coupling. This can be done during normal operation of the MEMS mirror 12 via the system controller 23.

During an observation phase, while the driving voltage $v_{drive}$ is on (e.g. corresponding to an on-time during which $D_{HVact}=1$ and $v_{drive}$ is set to a value between 0-200V), the type of parasitic oscillation, its frequency, and its phase are determined by the system controller 23 from the corresponding difference voltage $\Delta V_1$. Thus, the system controller 23 evaluates the difference voltage $\Delta V_1$ and detects the translational Ty mode based on pre-determined thresholds of the magnitude of the difference voltage $\Delta V_1$ and of the relative strength of the harmonic contents of the difference voltage $\Delta V_1$.

During the off-phase of the driving voltage $v_{drive}$ (e.g., corresponding to an off-time during which $D_{HVact}=0$ and $v_{drive}$ is 0V) the TIAs 51 and 52 are disconnected from the stator electrodes (e.g., via an opened switches SW1 and SW2), and a damping voltage Vdmp is applied to the stator electrodes to counteract parasitic translational movement Ty.

Figure 4D:
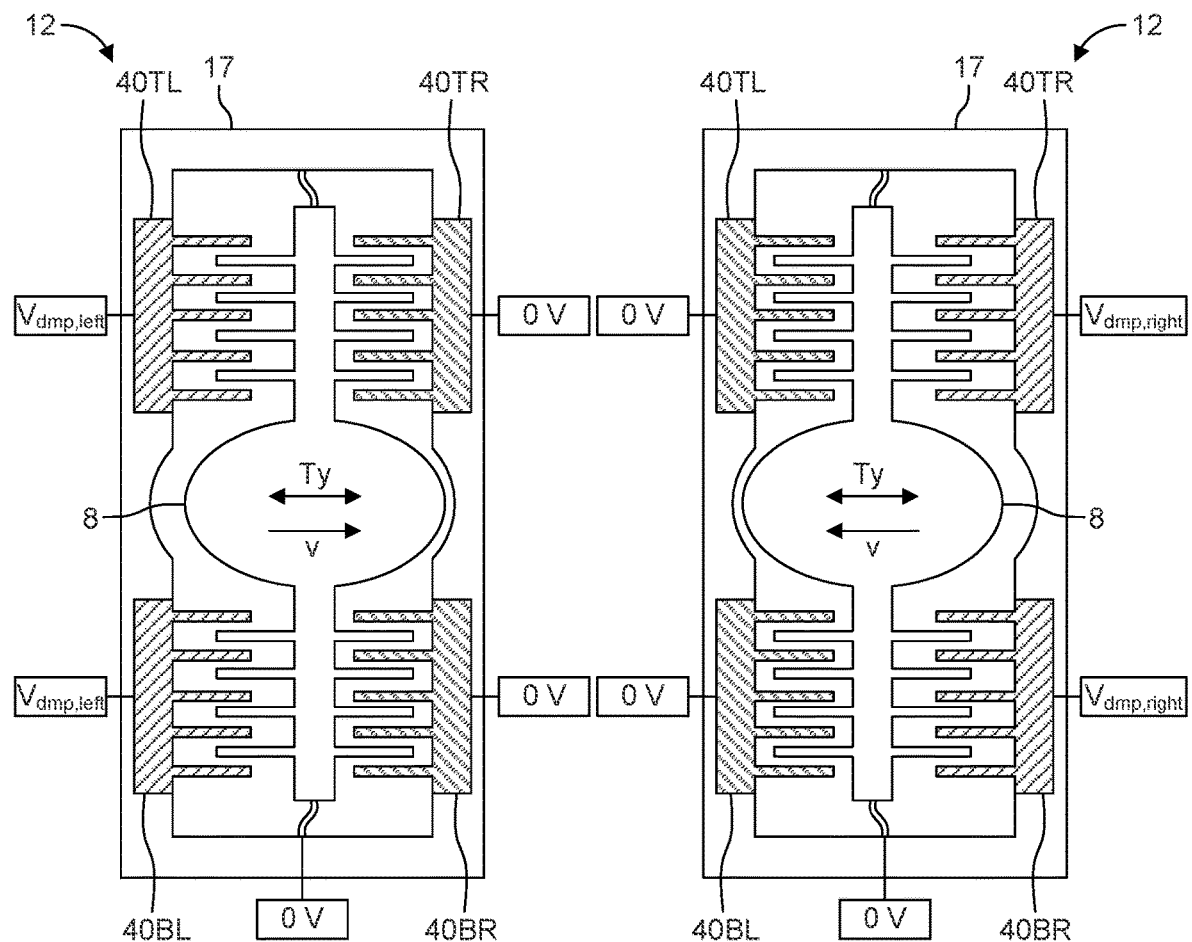
FIG. 4D illustrates a top view of a MEMS mirror being compensated with a damping voltage in response to detecting a translational movement Ty according to one or more embodiments.

In particular, FIG. 4D illustrates a top view of a MEMS mirror being compensated in a first damping method (method 1) with a damping voltage in response to detecting a translational movement Ty according to one or more embodiments. In order to damp and reduce the translational movement Ty, the damping voltage Vdmp is applied to the two stator electrodes located on the same side of the mirror body 8 (i.e., on the same lateral side of the scanning axis 13). Thus, the damping voltage Vdmp can be applied to either both stator electrodes of comb-drives 40TL and 40BL or to both stator electrodes of comb-drives 40TR and 40BR. The other pair of stator electrodes on the opposite side of the mirror body 8 (i.e., on the opposite lateral side of the scanning axis 13) are grounded to 0V. As a result, the detected Ty mode is damped by applying damping voltage Vdmp to counteract against the translational movement.

Alternatively, in a second damping method (method 2), the TIAs 51 and 52 may remain connected to the stator electrodes (e.g., switches SW1 and SW2 are closed or are not present) during damping, and the damping voltage Vdmp is superimposed onto the drive voltage Vdrive. Thus, the dotted lines of the damping voltage Vdmp illustrate both options how to apply the damping voltage Vdmp depending on which damping method is used. In the alternative to applying the damping voltage Vdmp directly to the signal line of drive voltage Vdrive, the system controller 23 may transmit a damping control signal Ddmp to the MEMS driver 25, and the MEMS driver 25 may generate the damping voltage Vdmp with it being superimposed on the drive voltage Vdrive.

In principal, both damping methods work for any mode and it depends on the specific capacitance dependence of the overall capacitance of all four stator quadrants on the respective degree of freedom (DOF). Due to symmetry, the overall capacitance will always form a local extremum for any degree of freedom. For the Rx and Tz modes, the local extremum is a maximum while for Rz the local extremum is a minimum.

For the Ty mode, the situation is more complicated. In a pure translation, the overall capacitance as a function of the DOF Ty is essentially constant because the capacitance increase on one side is exactly balanced by the capacitance decrease on the other side. This is a consequence of the fact that the finger of rotor and stator are already engaged in the rest position (for a true in-plane drive as in a gyro one would design the tips of both rotor and stator to end at the same position, then the situation is different). If the rotational component of the Ty mode is added, the capacitance for the Ty mode has a local maximum as well, but the dependence is still rather weak.

The force (for translational motions Ty and Tz) and the moment (for rotational motions Rz) than can be exerted by the drive with respect to a specific DOF depends on the strength of the capacitance dependence of the capacitor configuration that is used to force that DOF. More specifically, the force or torque at position q, where q is the considered DOF, can be expressed by $F(q)$ or $\tau(q)=\frac{1}{2}\partial c/\partial q V^2$. Here, C includes stator combs, which are used for the damping operation. In the first damping method, C includes the stators, to which Vdmp is applied. Since C(q) is essentially linear for the Ty case in the first damping method, the derivative is essentially constant, leading to a constant factor multiplying the applied damping voltage squared. In the second damping method, C includes all four stator quadrants, which results in a parabolic dependence of C around q=0. Consequently, the force or torque has a linear dependence on q by virtue of the derivative, where the slope of the linear dependence is proportional to the curvature of the local extremum, which the capacitance forms at q=0. Driving or damping with the second damping method is in perfect analogy to the parametric excitation of the Rx mode in normal operation.

Because the curvature of the local maximum for Ty is very low, method 1 may be preferred for Ty because it leads to a much higher force using the linear capacitance dependence of only the left or only the right pair of stators in an alternating fashion.

For the other DOFs, e.g. Tz, Rz, Ry, method 2 can be chosen because each quadrant alone already forms an essentially parabolic capacitance dependence. Method 2 thus doubles the driving force/torque. It also does not require switches and different biasing, but the damping voltage can be just superimposed onto the regular driving signal Vdrive.

Figure 4E:
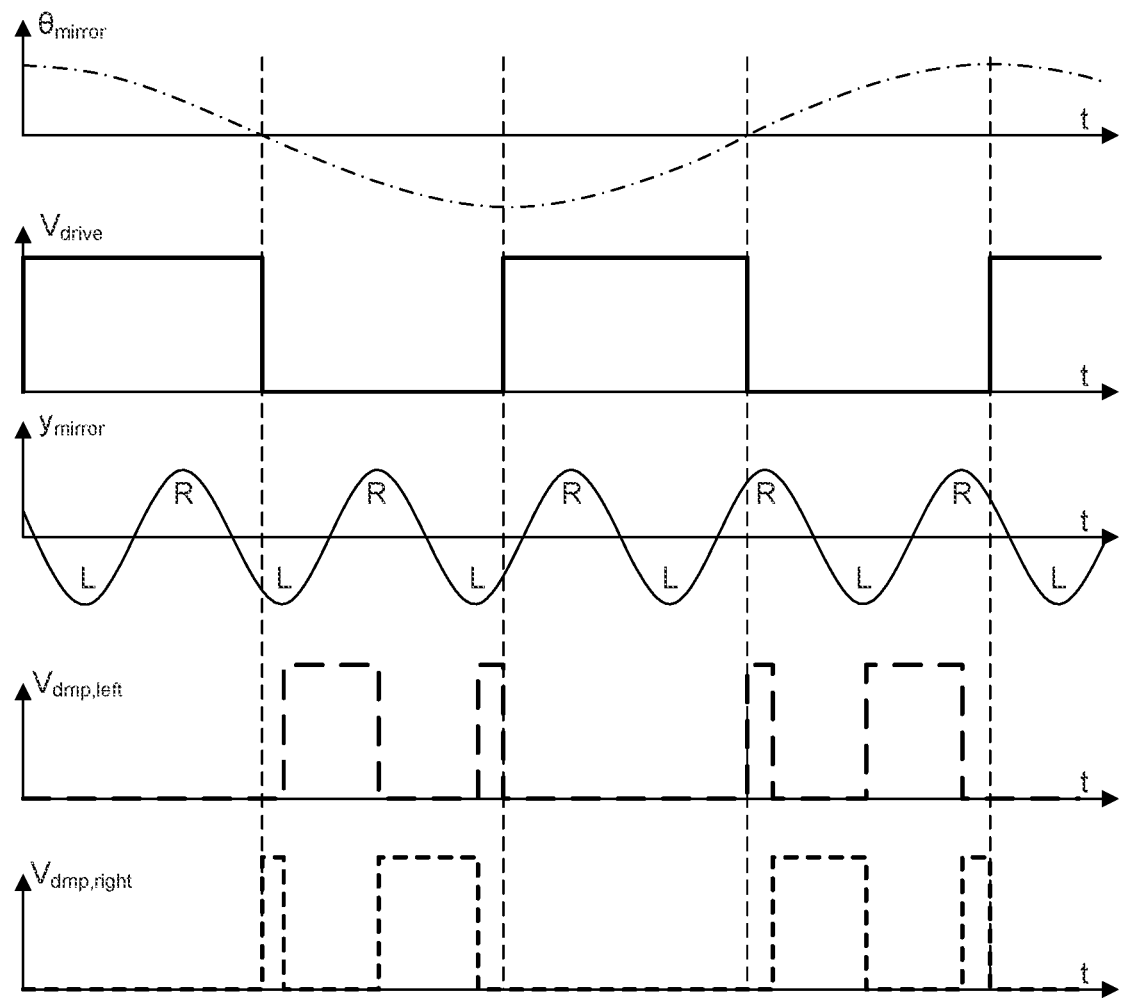
FIG. 4E shows a timing diagram for implementing the first damping method (method 1) to damp parasitic mode with Ty according to one or more embodiments.

Furthermore, method 2 may be preferred in general since the damping signal for the parasitic motion can be continuously applied during on-times and off-times of the drive voltage (and not only during the off-times). Hence, the damping signal only contains higher harmonics of the drive signal and does not influence the Rx motion averaged over one Rx period. In contrast, if the damping signal is only applied during off-times of the drive signal, it does in fact decelerate the Rx motion by virtue of the capacitance dependence on angle $\theta$, $dC/d\theta$, of the stator pair employed for the damping operation, where $\theta$ is the mirror angle and $dC/d\theta$ is the capacitance derivative regarding the mirror angle. For this reason, damping method 1 has an impact on the Rx mode amplitude. FIG. 4E shows a timing diagram for implementing the first damping method (method 1) to damp parasitic mode Ty according to one or more embodiments. Here, the translational movement of the MEMS mirror 12 for the Ty mode is shown as Ymirror, whereas $\theta$mirror is the mirror angle about the scanning axis 13 (i.e., the Rx mode). Two damping signals (voltages) Vdmp,left and Vdmp,right are applied to left stator electrodes or to right stator electrodes, respectively, to apply the damping during off times of the drive voltage Vdrive to damp the Ty oscillation.

Figure 4F:
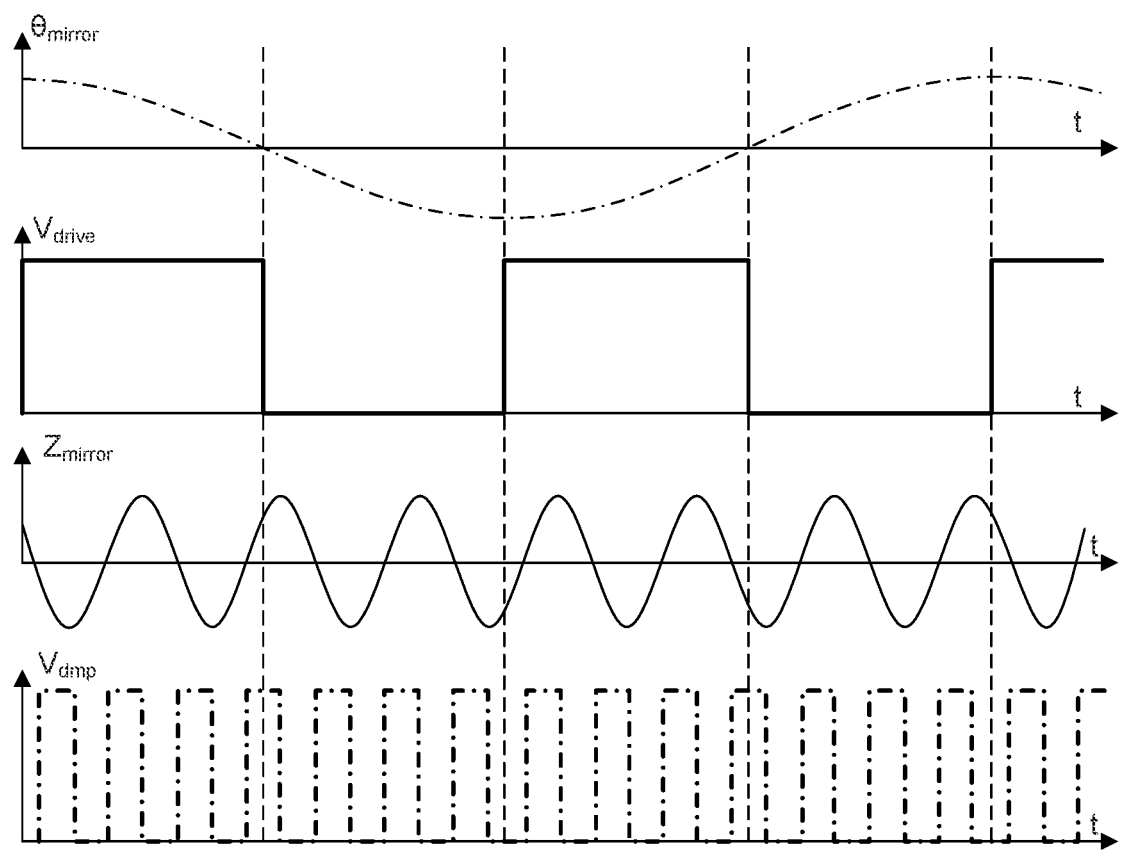
FIG. 4F shows a timing diagram for implementing the second damping method (method 2) to damp parasitic mode Tz according to one or more embodiments.

FIG. 4F shows a timing diagram for implementing the second damping method (method 2) to damp parasitic mode Tz according to one or more embodiments. Here, the translational movement of the MEMS mirror 12 for the Tz mode is shown as Zmirror, whereas $\theta$mirror is the mirror angle about the scanning axis 13 (i.e., the Rx mode). A damping signal (voltage) Vdmp is superimposed onto the drive voltage Vdrive during both on times and off times based on the detection of the Tz mode to damp the Tz oscillation. Considering nonlinear actuation force or torque, Vdmp can be adjusted locally during on time and off time of Vdrive, e.g. a lower amplitude of Vdmp during the on time of Vdrive.

During the observation phase, the system controller 23 determines from the sign of the difference voltage $\Delta V_1$ the phase relation of the Ty-mode motion relative to the observation phase, which is the actuation phase of the Rx-mode. This means it determines in which time intervals of the observation phase the mirror body 8 is moving from left to right and in which time intervals it is moving from right to left in the translational Y direction. Because in the on-resonance coupling case, the frequency of the Ty-mode motion is generally at an integer multiple of the Rx-mode motion (e.g., the Ty-mode could be resonantly excited by the fifth harmonic content of the Rx trajectory) the observation phase can encompass both phases where the mirror body 8 is moving from left to right and phases where the mirror body 8 is moving from right to left.

During the off-phase, the damping voltage Vdmp (Vdmp,left and Vdmp,right) must be alternatingly applied to either the pair formed by the two left stator electrodes of 40TL and 40BL or to the pair formed by the two right stator electrodes 40TR and 40BR, while the respective other pair may be set to 0V or some other smaller absolute value than the other comb drive side. This alternating signal must be constructed with a timing or phase relation that the damping voltage Vdmp is applied to the left pair in time periods when the Ty movement is from left to right and to the right pair in time periods when the Ty movement is from right to left. For this signal construction, the system controller 23 uses the phase information about the Ty-mode derived during the observation phase.

A further aspect of mode coupling for a comb-drive actuated MEMS mirrors is the coupling of the rotational mode Rx to the yaw mode Rz. In particular, a coupling can occur from the desired rotational mode Rx to an unwanted yaw mode Rz. The yaw mode Rz is vulnerable to direct parametric excitation by the comb-drives. Direct parametric excitation is possible because of the very strong capacitance dependence for this degree of freedom when higher harmonics of the rectangular drive signal Vdrive for the Rx mode fulfill the criterion for parametric resonance of the Rz mode. More specifically, if an odd integer multiple of the drive frequency equals two times the eigenfrequency of the Rz mode, parametric excitation of the Rz mode can occur. However, parametric resonance needs a threshold excitation strength to occur. For this reason, parametric resonance of the Rz mode does not occur if the odd integer, i.e. the order of the higher harmonic that fulfills the resonance condition, is too high. The exact threshold depends on the curvature of the capacitance dependence for the Rz mode and the applied voltage. As soon as the yaw mode Rz is excited, i.e. when there is initial Rz motion, inertial coupling terms according to Euler's rotation equation lead to a coupling of the Rz and Rx mode. The yaw mode Rz can be detected and measured by subtracting diagonal displacement current signals.

Figure 5A:
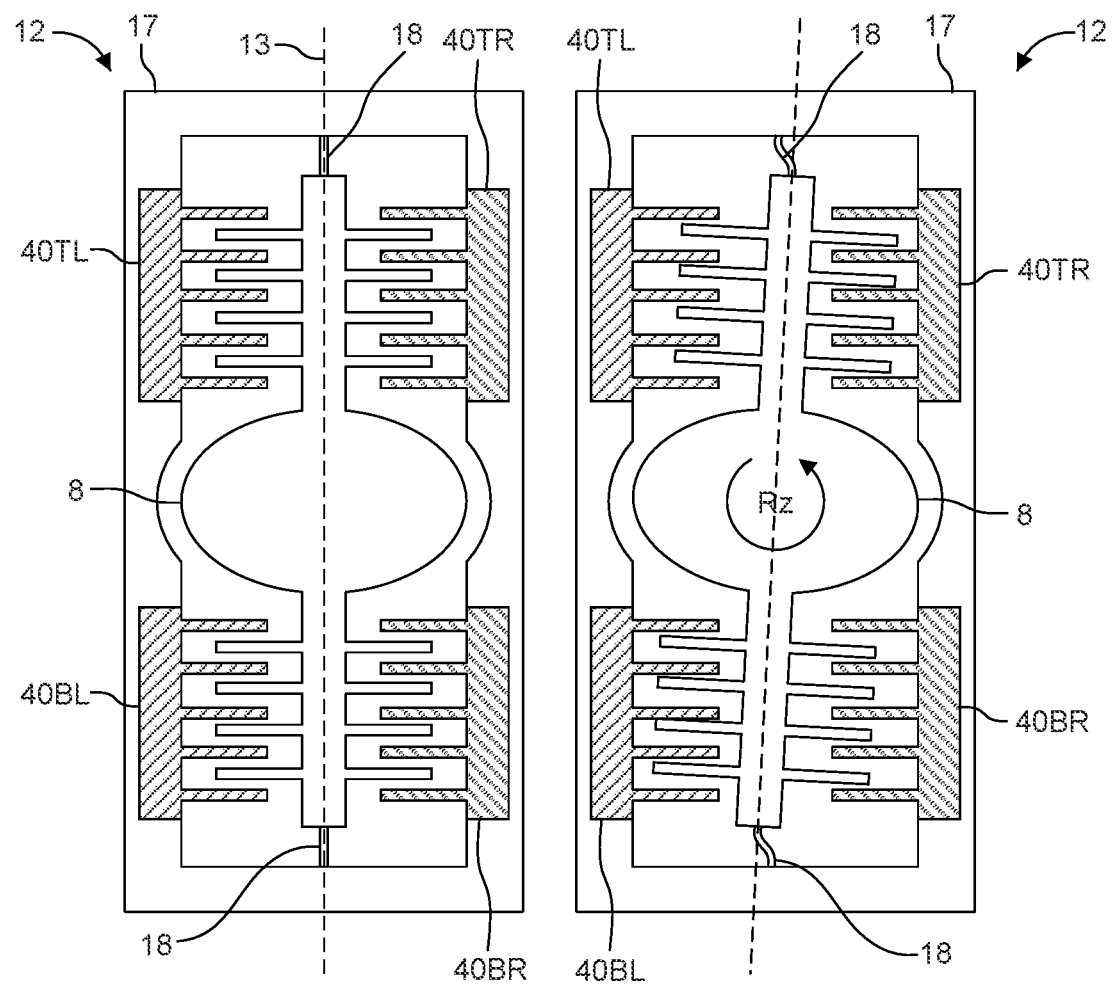
FIG. 5A illustrates a top view of a MEMS mirror arranged in a nominal centered position (left) and a yaw shifted position (right) according to one or more embodiments.

FIG. 5A illustrates a top view of a MEMS mirror arranged in a nominal centered position (left) and a yaw shifted position (right) according to one or more embodiments. On the left, MEMS mirror 12 (mirror body 8) operates in a pure rotational mode Rx about the scanning axis 13 and the torsion bars 18 are not bending. The four comb-drives 40TL, 40BL, 40TR, and 40BR are symmetrically situated within the frame 17. In contrast, on the right, the MEMS mirror 12 (mirror body 8) is shifted about the Z direction (i.e., rotated about a Z axis) and oscillates back and forth about the Z axis via mode coupling to the Rz mode. Here, the torsion bars 18 bend back and forth in the Y direction. The stator comb-drive electrodes are separated into diagonal pairs of a first diagonal across the MEMS chip (stators of comb-drives 40TL and 40BR) and into diagonal pairs of a second diagonal across the MEMS chip (stators of comb-drives 40BL and 40TR) to detect the RxRz-mode coupling.

Embodiments further include a sensing circuit that is coupled to the stator comb-drive electrodes of each comb-drive 40TL, 40BL, 40TR, and 40BR to receive their respective displacement currents therefrom. The stator comb-drive electrodes are coupled to the sensing circuit in such a way to detect the mode of interest such as the Ty mode or the Rz mode.

Figure 5B:
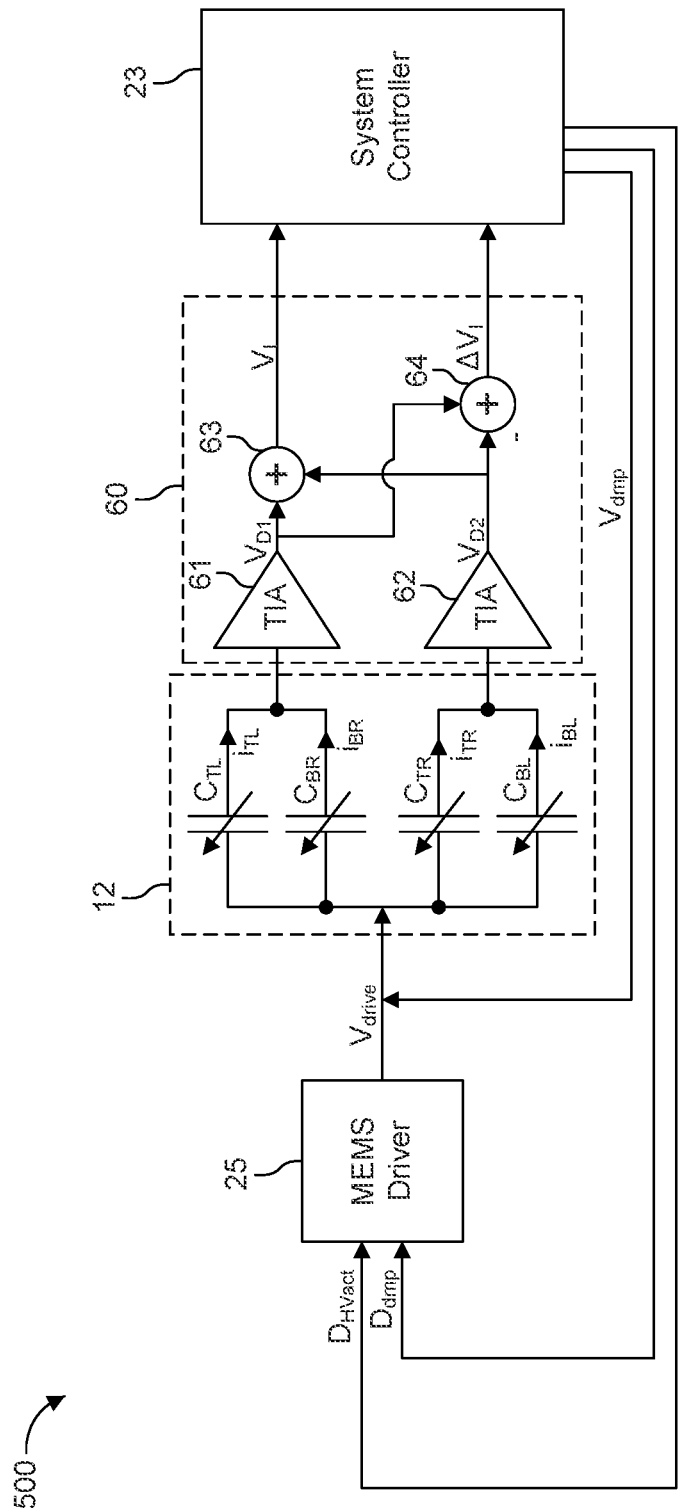
FIG. 5B is a schematic diagram of a yaw mode Rz measurement and compensation system according to one or more embodiments.

FIG. 5B is a schematic diagram of a yaw mode Rz measurement and compensation system 500 according to one or more embodiments. The yaw mode Rz measurement and compensation system 500 includes the MEMS driver 25, the MEMS mirror 12 with four comb-drives 40TL, 40BL, 40TR, and 40BR, a sensing circuit 60, and the system controller 23. It will be further appreciated that the sensing circuits 50 and 60 can be combined to sense both the Ty mode and the Rz mode.

The MEMS driver 25 receives a digital control signal $D_{HVact}$ and drives the MEMS mirror 12 in accordance with the digital control signal $D_{HVact}$. The MEMS driver 25 generates the drive voltage $v_{drive}$ with the appropriate duty cycle and applies the drive voltage $v_{drive}$ to the mirror comb electrodes of the four comb-drives 40TL, 40BL, 40TR, and 40BR. As a result of the movement of the MEMS mirror 12 about its scanning axis 13, the drive capacitances $C_{TL}$, $C_{BL}$, $C_{TR}$, and $C_{BR}$ of the four comb-drives 40TL, 40BL, 40TR, and 40BR change and displacement currents $i_{TL}$, $i_{BL}$, $i_{TR}$, and $i_{BR}$ are generated by their respective drive capacitances. The sensing circuit 60 is coupled to the stator comb electrodes of the four comb-drives 40TL, 40BL, 40TR, and 40BR and extracts the displacement currents $i_{TL}$, $i_{BL}$, $i_{TR}$, and $i_{BR}$ therefrom.

In order to measure the yaw mode Rz, the two diagonal or catty-corner displacement currents $i_{TL}$ and $i_{BR}$ are provided to an input of a TIA 61 of the sensing circuit 60. While a TIA is used in this example, it will be appreciated that other sensing elements used for capacitive sensing may be used. For example, any sensing circuit that performs charge sensing, current sensing, or frequency modulation-based sensing may be used to generate sensing signals. TIA 61 may be coupled to the MEMS mirror 12, and specifically to the stators of assigned comb-drives. The diagonal displacement currents $i_{TL}$ and $i_{BR}$ are extracted from stator comb electrodes of the comb-drives 40TL and 40BR that are diagonally arranged across the mirror body 8 from each other. As a result, the sum of the two diagonal displacement currents $i_{TL}$ and $i_{BR}$ is converted into a first diagonal voltage $V_{D1}$ by TIA 61.

Similarly, the two other diagonal or catty-corner displacement currents $i_{TR}$ and $i_{BL}$ are provided to an input of a TIA 62 of the sensing circuit 60. Again, while a TIA is used in this example, it will be appreciated that other sensing elements used for capacitive sensing may be used. For example, any sensing circuit that performs charge sensing, current sensing, or frequency modulation-based sensing may be used to generate sensing signals. TIA 62 may be coupled to the MEMS mirror 12, and specifically to the stators of assigned comb-drives. The diagonal displacement currents $i_{TL}$ and $i_{BL}$ are extracted from stator comb electrodes of the comb-drives 40TR and 40BL that are diagonally arranged across the mirror body 8 from each other. As a result, the sum of the two other diagonal displacement currents $i_{TL}$ and $i_{BL}$ is converted into a second diagonal voltage $V_{D2}$ by TIA 62.

The sensing circuit 60 further includes a summer 63 and a subtractor 64. The summer 63 receives both the first diagonal voltage $V_{D1}$ and the second diagonal voltage $V_{D2}$ and sums them together to generate a summed voltage $V_1$ that represents the sum of all the displacement currents $i_{TL}$, $i_{BL}$, $i_{TR}$, and $i_{BR}$. Conversely, the subtractor 64 receives both first diagonal voltage $V_{D1}$ and the second diagonal voltage $V_{D2}$ and subtracts the second diagonal voltage $V_{D2}$ from the first diagonal voltage $V_{D1}$ to generate a difference voltage $\Delta V_1$ that represents the difference between the first pair of diagonal currents in, $i_{BR}$ (i.e., a sum thereof) and the second pair of diagonal currents $i_{TR}$, $i_{BL}$ (i.e., a sum thereof). The summed voltage $V_1$ (i.e., the summed current signal) allows precise phase as well as amplitude measurements of the Rx mode that the system controller 23 uses for proper MEMS mirror control. However, the summed voltage $V_1$ does not provide any information about the scanning direction, as the four comb-drives are symmetric. On the other hand, the difference voltage $\Delta V_1$ (i.e., the difference current signal) provides information corresponding to the amplitude of the yaw mode Rz and the phase of the yaw mode Rz, relative to the Rx mode. For example, the difference voltage $\Delta V_1$ may oscillate between positive and negative values as the MEMS mirror 12 oscillates about the Z axis. The system controller 23 may generate the digital control signal $D_{HVact}$ based on the phase and the amplitude of the Rx mode (rotation angle $\theta_{mirror}$).

Additionally, after an unwanted parasitic oscillation has been detected (e.g., mode Ty, mode Rz, mode Ry, or mode Tz), it can be actively damped using method 2 described above, which superimposes a damping signal Vdmp onto the drive signal Vdrive.

A threshold in the difference voltage $\Delta V_1$ can be defined to determine that the yaw mode Rz is excited. The threshold of the difference voltage $\Delta V_1$ can be determined such that it is equivalent to an Rz rotation angle, which is considered critical. Since in the Rz mode, the comb fingers of the rotor and stators approach each other due to a considerable transversal displacement component, which can lead to the potentially destructive effect of electrostatic pull-in, the threshold angle for critical Rz motion is usually chosen very low. In some embodiments, it can be chosen to be in the range of 0.015° to 0.15°. A suitable threshold angle can be determined for a specific design by experiments and numerical simulations and converted into a corresponding threshold for the magnitude of the difference voltage $\Delta V_1$ considering the readout electronics. Additionally, the spectral components of the difference voltage $\Delta V_1$ can be analyzed to determine if an enhanced component at the expected frequency of the yaw mode Rz is present. The threshold criterion described above can be applied to only the spectral component at the expected frequency of the yaw mode Rz in order to make the detection more robust by excluding other spectral components, which can indicate small acceptable non-resonant motion in the yaw mode Rz, e.g. caused by asymmetries due to fabrication. These procedures can be applied during normal operation of the MEMS mirror 12 via the system controller 23.

During an initial observation phase, while the driving voltage $v_{drive}$ is on (e.g. corresponding to an on-time during which $D_{HVact}=1$ and $v_{drive}$ is set to a predetermined voltage, e.g., 0-200V), the type of parasitic oscillation, its amplitude, its frequency, and its phase relative to the operational mode Rx are determined by the system controller 23 from the corresponding difference voltage $\Delta V_1$. Thus, the system controller 23 evaluates the difference voltage $\Delta V_1$ and detects the rotational yaw mode Rz based on pre-determined thresholds of the magnitude of the difference voltage $\Delta V_1$ or of the magnitude of the spectral component of the difference voltage $\Delta V_1$ at the expected frequency of the yaw mode Rz.

After an initial observation phase, a damping voltage Vdmp is superimposed onto the drive voltage $v_{drive}$. This means it is applied to the rotor electrodes, while the stator electrodes remain grounded. The damping voltage Vdmp is at twice the frequency of the parasitic yaw mode and its phase relative to $v_{drive}$ is chosen based on the determination of the phase of the yaw mode Rz relative to the operational mode Rx such that the Rz mode motion is decelerated. For instance, both the driving voltage $v_{drive}$ and the damping voltage Vdmp can be unipolar square waves and the frequency of the damping voltage Vdmp is at an integer multiple of the frequency of the driving voltage $v_{drive}$ in the case of a resonant parasitic excitation. In contrast to the method 1 described for the damping of the parasitic Ty mode, the damping voltage for the Rz mode is not only applied during the off-phase of the driving voltage, but also during the on-phase. This is possible since it can be performed with the same biasing of rotor and stators, respectively, as the application of the drive voltage $v_{drive}$. Furthermore, no switches are required.

Figure 5C:
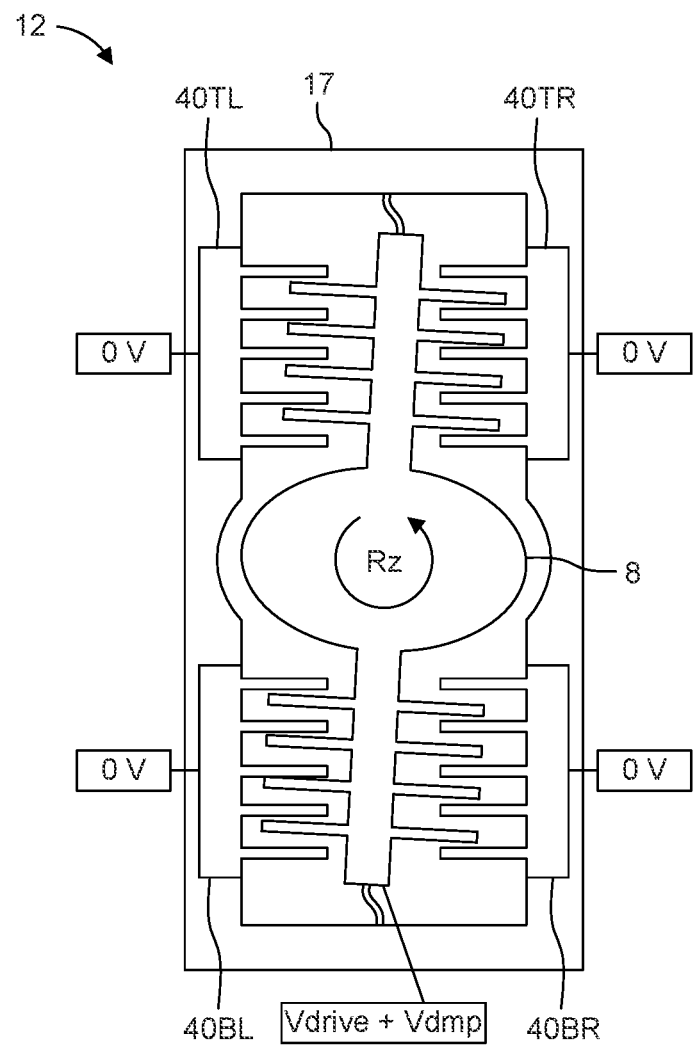
FIG. 5C illustrates a top view of a MEMS mirror being compensated with a damping voltage in response to detecting a yaw movement Rz according to one or more embodiments.

In particular, FIG. 5C illustrates a top view of a MEMS mirror being compensated with a damping voltage in response to detecting a yaw movement Rz according to one or more embodiments. Here, a damping voltage Vdmp is superimposed onto the drive voltage $v_{drive}$ that is applied to the rotor. The stator electrodes of 40TL, 40TR, 40BL, and 40BR are grounded. Vdmp can be locally adjusted during on time and off time of Vdrive considering nonlinear actuation force or torque.

In order to damp and reduce the yaw movement Rz, the damping voltage Vdmp is applied to the rotor electrode by superimposition onto the driving voltage $v_{drive}$ while the stator electrodes remain grounded to 0V for monitoring the displacement currents. As a result, the detected Rz mode is damped by applying damping voltage Vdmp by superimposition onto driving voltage $v_{drive}$ in order to counteract against the unwanted rotational movement.

In subsequent observation phases, the amplitude and the phase of the yaw mode Rz can be continuously monitored and the damping voltage Vdmp can be adjusted in amplitude and phase to the updated information about the amplitude and the phase of the Rz mode.

During the observation phase, the system controller 23 determines from the difference voltage $\Delta V_1$ the phase of the Rz motion. More specifically, it determines whether the mirror body 8 is approaching the rest position or moving away from the rest position related to the Rz degree of freedom. If the mirror is approaching the Rz-related rest position, it reduces the Rz-related capacitance, leading to discharging currents. If the mirror is moving away from the Rz-related rest position, it increases the Rz-related capacitance, leading to charging currents. The charging and discharging currents lead to respective difference voltages with opposite signs. By this procedure, the phase of the Rz-motion can be determined relative to the drive signal. In response to this phase detection of the movement about the Z axis, the damping voltage Vdmp can subsequently be applied by superimposition onto the driving signal $v_{drive}$ during the phases when the mirror is approaching the Rz-related rest (middle) position, while no additional voltage is superimposed during the phases when the mirror is moving away from the Rz-related rest position. The Rz-related capacitance has a minimum at the Rz-related rest position. For this reason, application of a voltage Vdmp between rotor and stators pulls the mirror away from the Rz-related rest position. If voltage is applied during the phases, in which the mirror approaches the Rz-related rest position, the Rz-movement is therefore decelerated, i.e. damped. The Rz-motion is continuously monitored and the application of the damping voltage Vdmp is adjusted based on updated phase and amplitude information about the motion of the yaw mode Rz.

Furthermore, if the stator comb-drive electrodes of each of the four comb-drives 40TL, 40BL, 40TR, and 40BR are separated into two layers of equal thickness, a translational mode Tz in the Z direction (i.e., out-of-plane upward and downward translational movement) can be detected by the difference of front-side and back-side layer currents, where "front-side" relates to the layer, which is at a larger (i.e. more positive) z-coordinate with respect to the coordinate system of FIG. 1B Conversely, "back-side" denotes the layer, which is at a lower (i.e. more negative) z-coordinate with respect to the coordinate system of FIG. 1B.

Figure 6A:
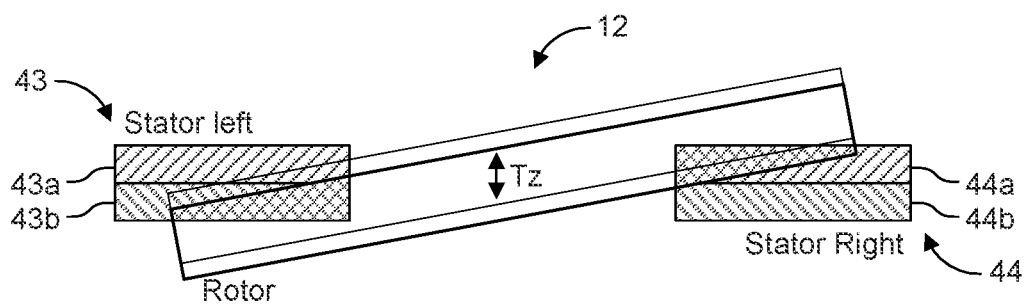
FIGS. 6A and 6B illustrate cross-sectional views of a MEMS mirror and driver electrodes in accordance with one or more embodiments.
Figure 6B:
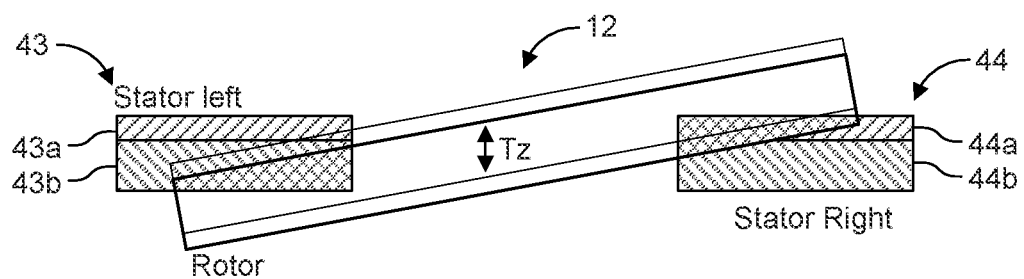

FIGS. 6A and 6B illustrate cross-sectional views of a MEMS mirror and driver electrodes in accordance with one or more embodiments. In particular, in FIG. 6A, the left stator comb-drive electrode 43 includes two layers, a front-side layer 43a and a back-side layer 43b, of equal thickness. Similarly, the right stator comb-drive electrode 44 includes two layers, a front-side layer 44a and a back-side layer 44b, of equal thickness. In contrast, in FIG. 6B, the respective front-side and back-side layers have different thicknesses.

A mode coupling between the Rx mode and the Tz mode can be caused by a displacement L between the center of mass M from the rotational axis (scanning axis 13), due to the reinforcement structure 9. This inertial coupling originates from the sum of a Euler force component and a centrifugal component according to Equation 2:

$$f_Z(t) = -m\, L\theta_m(t)\ddot{\theta}_m(t) - mL(\dot{\theta}_m(t))$$ Eq. 2, with the mirror mass m, the mirror angle $\theta_m(t)$, the mirror angular velocity $\dot{\theta}_m(t)$ and the mirror rotational acceleration $\ddot{\theta}_m(t)$. Thus, the Tz mode is excited by the inertial force $f_Z(t)$ having a frequency content at twice the harmonic frequencies of the Rx trajectory $\theta(t)$ by virtue of the dependence on the mirror angle and its time derivatives. If $f_Z(t)$ features a frequency content at the resonance frequency of the Tz mode, resonant excitation of the Tz mode can occur. A different coupling mechanism between the Rx mode and the Tz mode is direct parametric excitation of the Tz-mode by higher harmonic content of the driving voltage $v_{drive}$ of the Rx-mode.

The subtraction of all back-side layer displacement currents from all displacement currents of the front-side layer allows the detection of the Tz movement via a difference signal. The detection of the Tz movement is also possible for not equally thick layers, but the obtained difference current needs further processing by the system controller 23 because the desired Rx mode also causes a nonzero signal. Thus, non-equal thicknesses causes a difference in front-side and back-side currents for both the Rx and the Tz modes.

Figure 6C:
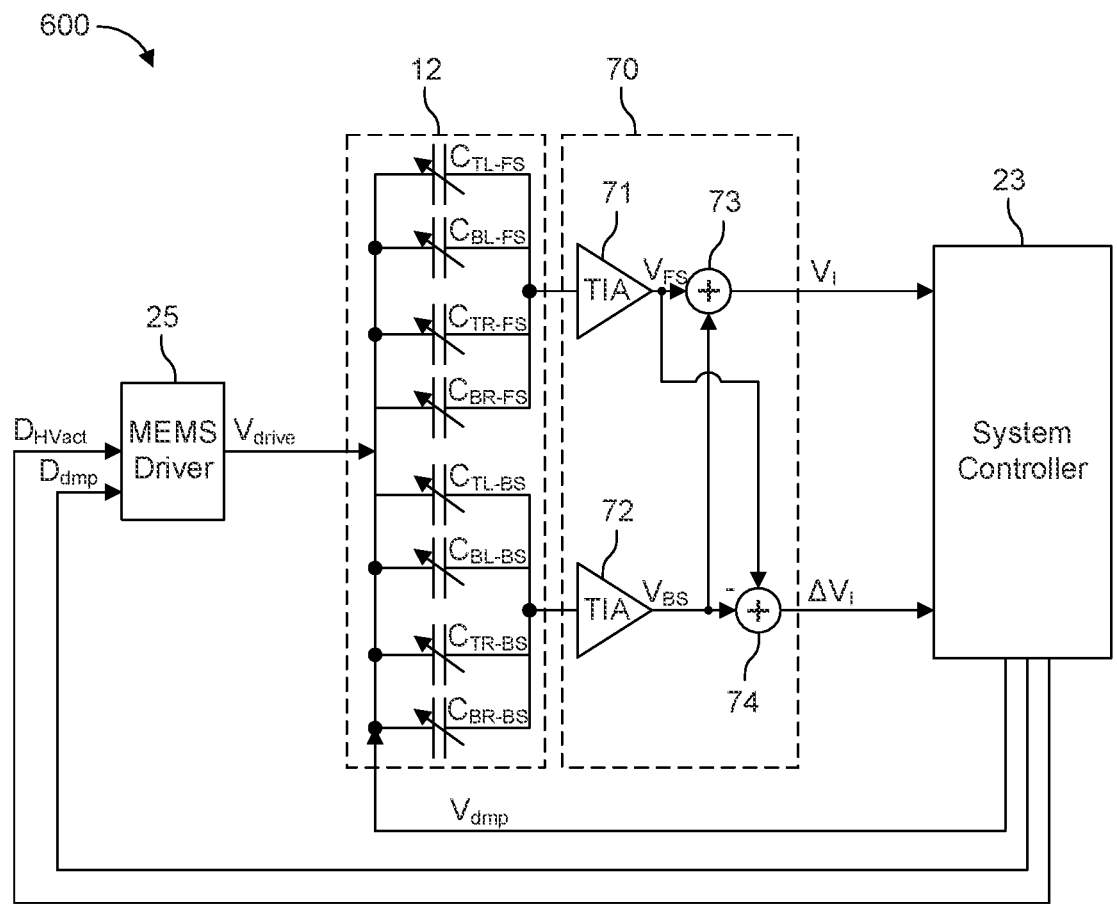
FIG. 6C is a schematic diagram of a Tz mode measurement and compensation system according to one or more embodiments.

FIG. 6C is a schematic diagram of a Tz mode measurement and compensation system 600 according to one or more embodiments. The Tz mode measurement and compensation system 600 includes the MEMS driver 25, the MEMS mirror 12 with four comb-drives 40TL, 40BL, 40TR, and 40BR, each consisting of a fronts-side layer and a back-side layer, a sensing circuit 70, and the system controller 23. It will be further appreciated that the sensing circuits 50, 60 and 70 can be combined to sense both the Ty mode, the Rz mode and the Tz mode.

The MEMS driver 25 receives a digital control signal $D_{HVact}$ and drives the MEMS mirror 12 in accordance with the digital control signal $D_{HVact}$. The MEMS driver 25 generates the drive voltage vane with the appropriate duty cycle and applies the drive voltage vane to both layers of the mirror comb electrodes of the four comb-drives 40TL, 40BL, 40TR, and 40BR. As a result of the movement of the MEMS mirror 12 about its scanning axis 13, the drive capacitances $C_{TL-FS}$, $C_{BL-FS}$, $C_{TR-FS}$, $C_{BR-FS}$, $C_{TL-BS}$, $C_{BL-BS}$, $C_{TR-BS}$ and $C_{BR-BS}$ of the four comb-drives 40TL, 40BL, 40TR, and 40BR change and displacement currents $i_{TL-FS}$, $i_{BL\_FS}$, $i_{TR\_FS}$, $i_{BR-FS}$, $i_{TL-BS}$, $i_{BL\_BS}$, $i_{TR\_BS}$ and $i_{BR-BS}$ are generated by their respective drive capacitances. The sensing circuit 70 is coupled to the stator comb electrodes of the four comb-drives 40TL, 40BL, 40TR, and 40BR and extracts the displacement currents $i_{TL-FS}$, $i_{BL\_FS}$, $i_{TR\_FS}$, $i_{BR-FS}$, $i_{TL-BS}$, $i_{BL\_BS}$, $i_{TR\_BS}$ and $i_{BR-BS}$ therefrom.

In order to measure the Tz mode, all front-side displacement currents $i_{TL-FS}$, $i_{BL\_FS}$, $i_{TR\_FS}$ and $i_{BR-FS}$ are provided to an input of a TIA 71 of the sensing circuit 70. TIA 71 may be coupled to the MEMS mirror 12, and specifically to the front-side layers of the stators of all comb-drives. The front-side displacement currents $i_{TL-FS}$, $i_{BL\_FS}$, $i_{TR\_FS}$ and $i_{BR-FS}$ are extracted from the front-side layers of the stator comb electrodes of the comb-drives 40TL, 40BL, 40TR, and 40BR. As a result, the sum of all front-side displacement currents $i_{TL-FS}$, $i_{BL\_FS}$, $i_{TR\_FS}$ and $i_{BR-FS}$ is converted into a first voltage $V_{FS}$ by TIA 71.

Similarly, all back-side displacement currents $i_{TL-BS}$, $i_{BL\_BS}$, $i_{TR\_BS}$ and $i_{BR-BS}$ are provided to an input of a TIA 72 of the sensing circuit 70. TIA 72 may be coupled to the MEMS mirror 12, and specifically to the back-side layers of the stators of all comb-drives. The back-side displacement currents $i_{TL-BS}$, $i_{BL\_BS}$, $i_{TR\_BS}$ and $i_{BR-BS}$ are extracted from the back-side layers of the stator comb electrodes of the comb-drives 40TL, 40BL, 40TR, and 40BR. As a result, the sum of all back-side displacement currents $i_{TL-BS}$, $i_{BL\_BS}$, $i_{TR\_BS}$ and $i_{BR-BS}$ is converted into a second voltage $V_{BS}$ by TIA 72.

The sensing circuit 70 further includes a summer 73 and a subtractor 74. The summer 73 receives both the first voltage $V_{FS}$ and the second voltage $V_{BS}$ and sums them together to generate a summed voltage $V_1$ that represents the sum of all the displacement currents $i_{TL-FS}$, $i_{BL\_FS}$, $i_{TR\_FS}$, $i_{BR-FS}$, $i_{TL-BS}$, $i_{BL\_BS}$, $i_{TR\_BS}$ and $i_{BR-BS}$. Conversely, the subtractor 74 receives both first voltage $V_{FS}$ and the second voltage $V_{BS}$ and subtracts the second voltage $V_{BS}$ from the first voltage $V_{FS}$ to generate a difference voltage $\Delta V_1$ that represents the difference between all front-side currents $i_{TL-FS}$, $i_{BL}$ FS, $i_{TR\_FS}$ and $i_{BR-FS}$ and all back-side currents $i_{TL-BS}$, $i_{BL\_BS}$, $i_{TR\_BS}$ and $i_{BR-BS}$. The summed voltage $V_1$ (i.e., the summed current signal) allows precise phase as well as amplitude measurements of the Rx mode that the system controller 23 uses for proper MEMS mirror control. The difference voltage $\Delta V_1$ (i.e., the difference current signal) provides information corresponding to the amplitude of the Tz mode and the phase of the Tz mode relative to the Rx mode. For example, the difference voltage $\Delta V_1$ may oscillate between positive and negative values as the MEMS mirror 12 oscillates along the Z direction. The system controller 23 may generate the digital control signal $D_{HVact}$ based on the phase and the amplitude of the Rx mode (rotation angle $\theta_{mirror}$).

Additionally, after an unwanted parasitic oscillation of the Tz mode has been detected, it can be actively damped. A threshold in the difference voltage $\Delta V_1$ can be defined to determine that the Tz mode is excited. The threshold of the difference voltage can be determined such that it is equivalent to a Tz displacement, which is considered critical. Since in the Tz mode, additional mechanical stress is exerted onto the mirror suspensions, particularly the torsion bars, the threshold displacement for critical Tz motion is usually chosen to be low. In embodiments, it can be chosen to be in the range of 1.5-10 μm. A suitable threshold displacement can be determined for a specific design by experiments and numerical simulations and converted into a corresponding threshold for the magnitude of the difference voltage $\Delta V_1$ considering the readout electronics. Additionally, the spectral components of the difference voltage $\Delta V_1$ can be analyzed to determine if an enhanced component at the expected frequency of the Tz mode exists. The threshold criterion described above can be applied to only the spectral component at the expected frequency of the Tz mode in order to make the detection more robust by excluding other spectral components, which can indicate small acceptable non-resonant motion in the Tz mode, e.g. caused by asymmetries due to fabrication. These procedures can be applied during normal operation of the MEMS mirror 12 via the system controller 23.

During an initial observation phase, while the driving voltage $v_{drive}$ is on (e.g. corresponding to an on-time during which $D_{HVact}=1$ and $v_{drive}$ is set to a predetermined voltage, e.g., 0-200V), the type of parasitic oscillation, its frequency, and its phase relative to the operational mode Rx are determined by the system controller 23 from the corresponding difference voltage $\Delta V_1$. Thus, the system controller 23 evaluates the difference voltage $\Delta V_1$ and detects the translational Tz mode based on pre-determined thresholds of the magnitude of the difference voltage $\Delta V_1$ or of the magnitude of the spectral component of the difference voltage $\Delta V_1$ at the expected frequency of the translational Tz mode.

After an initial observation phase, a damping voltage Vdmp is superimposed onto the drive voltage $v_{drive}$. This means it is applied to the rotor, while the stator electrodes remain grounded. The damping voltage Vdmp is at twice the frequency of the parasitic translational Tz mode and its phase relative to $v_{drive}$ is chosen based on the determination of the phase of the translational Tz mode relative to the operational mode Rx such that the Tz mode motion is decelerated. For instance, both the driving voltage $v_{drive}$ and the damping voltage Vdmp can be unipolar square waves and the frequency of the damping voltage Vdmp is at an integer multiple of the frequency of the driving voltage $v_{drive}$ in the case of a resonant parasitic excitation. In difference to the method described for the damping of the parasitic Ty mode, the damping voltage for the Tz mode is not only applied during the off-phase of the driving voltage $v_{drive}$, but also during the on-phase. This is possible since it can be performed with the same biasing of rotor and stators, respectively, as the application of the drive voltage $v_{drive}$. Furthermore, no switches are required.

Figure 6D:
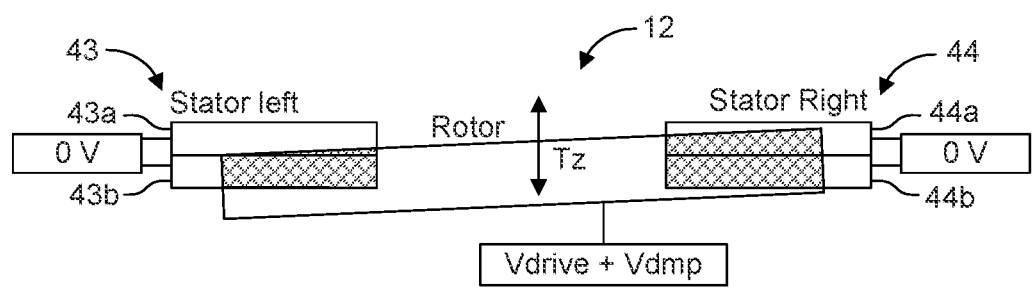
FIG. 6D illustrates a cross-sectional view of a MEMS mirror being compensated with a damping voltage in response to detecting a Tz movement according to one or more embodiments.

In particular, FIG. 6D illustrates a cross-sectional view of a MEMS mirror being compensated with a damping voltage in response to detecting a Tz movement according to one or more embodiments. In order to damp and reduce the Tz movement, the damping voltage Vdmp is applied to the rotor electrode by superimposition onto the driving voltage $v_{drive}$ while the stator electrodes remain grounded to 0V for monitoring the displacement currents. As a result, the detected Tz mode is damped by applying damping voltage Vdmp by superimposition onto driving voltage $v_{drive}$ in order to counteract against the unwanted translational movement.

In subsequent observation phases, the amplitude and the phase of the Tz mode can be continuously monitored and the damping voltage Vdmp can be adjusted in amplitude and phase according to the updated information about the amplitude and the phase of the Tz mode.

During the observation phase, the system controller 23 determines from the difference voltage $\Delta V_1$ the phase of the Tz motion. More specifically, it determines whether the mirror body 8 is approaching the rest position or moving away from the rest position related to the Tz degree of freedom. If the mirror is approaching the Tz-related rest position, it increases the Tz-related capacitance, leading to currents charging the comb capacitors. If it is approaching from negative Z-side, mainly the capacitors related to the front-side layers are charged, leading to nonzero currents $i_{TL-FS}$, $i_{BL-FS}$, $i_{TR-FS}$ and $i_{BR-FS}$. If it is approaching from positive Z-side, mainly the capacitors related to the back-side layers are charged, leading to nonzero currents $i_{TL-BS}$, $i_{BL-BS}$, $i_{TR-BS}$ and $i_{BR-BS}$ If the mirror is moving away from the Tz-related rest position, it decreases the Tz-related capacitance, leading to currents discharging the comb capacitors. If it is distancing on the negative Z-side, mainly the capacitors related to the front-side layers are discharged, leading to nonzero currents $i_{TL-FS}$, $i_{BL-FS}$, $i_{TR-FS}$ and $i_{BR-FS}$ with the opposite sign compared to the approaching case. If it is distancing on the positive Z-side, mainly the capacitors related to the back-side layers are discharged, leading to nonzero currents $i_{TL-BS}$, $i_{BL-BS}$, $i_{TR-Bs}$ and $i_{BR-BS}$ with the opposite sign compared to the approaching case. These signals lead to associated difference voltages. The loading and unloading of back- or frontside currents also depends on the current rotation angle.

By a suitable analysis of the difference voltage, the phase of the Tz-motion can be established relative to the driving signal. In response to this phase detection of the movement along the Z axis, the damping voltage Vdmp can subsequently be applied by superimposition onto the driving signal $v_{drive}$ during the phases when the mirror is moving away from the Tz-related rest (middle) position, while no additional voltage is superimposed during the phases when the mirror is approaching the Tz-related rest position. The Tz-related capacitance has a maximum at the Tz-related rest position. For this reason, application of a voltage Vdmp between rotor and stators pulls the mirror towards the Tz-related rest position. If voltage is applied during the phases, in which the mirror is moving away from the Tz-related rest position, the Tz-movement is therefore decelerated, i.e. damped. The Tz-motion is continuously monitored and the application of the damping voltage Vdmp is adjusted based on updated phase and amplitude information about the motion of the translational Tz mode.

The Tz mode coupling can be detected by monitoring the difference signal of the front-side layer of the stators and the back-side layers of the stator. The frequency location of the mode coupling to the Tz mode can be recorded and saved in the memory to avoid the future excitation of the Tz mode, for example in a new start-up of the mirror when the frequency of the driving voltage is swept in open loop to start the Rx oscillations for acquisition of initial signals. A large change of the mirror position in the translational Z direction can be used by the system controller 23 for the detection of a malfunction of the mirror 12. For example, if the difference signal exceeds a predetermined amplitude threshold.

Figure 6E:
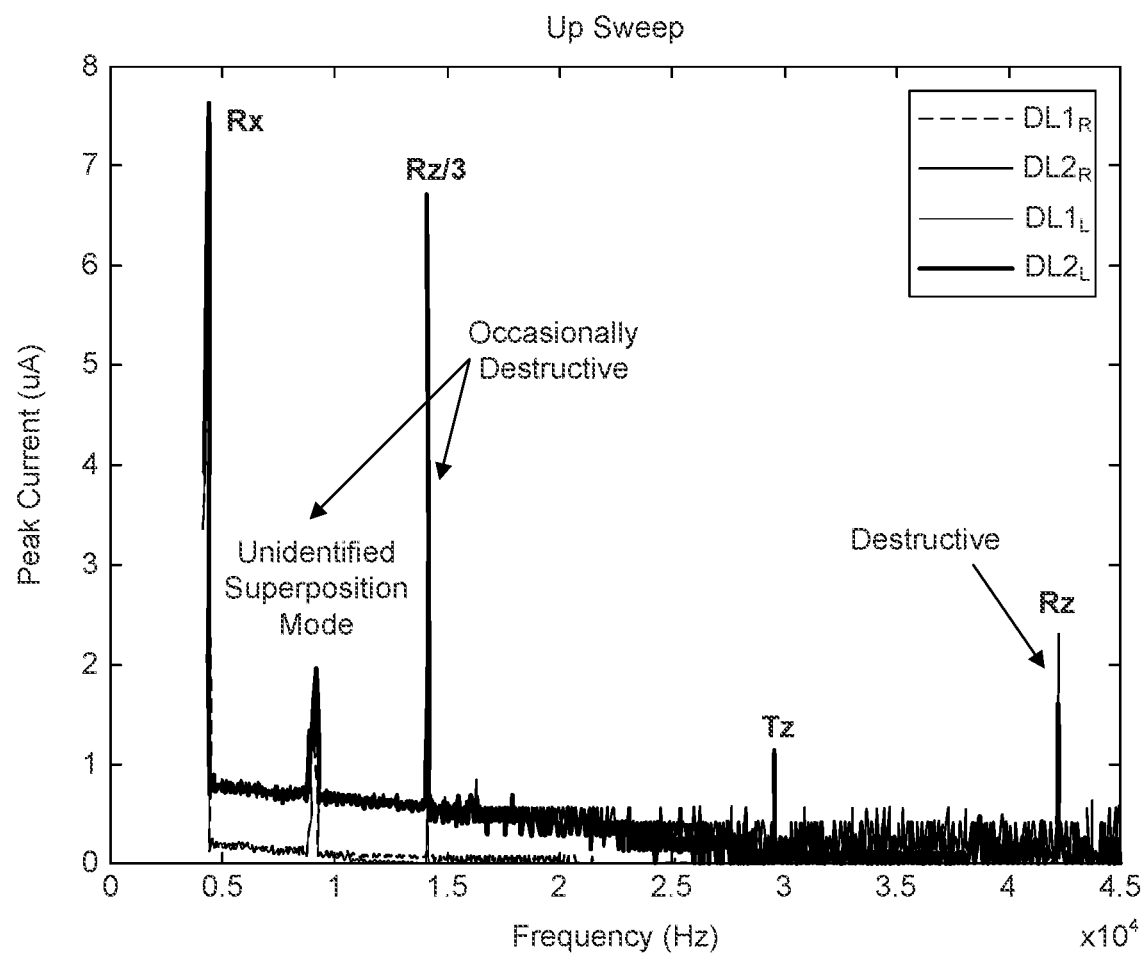
FIG. 6E depicts four capacitor currents DL1R, DL2R, DL1L, and DL2L in an excitation frequency sweep over a wide range from 4 kHz to 45 kHz for a MEMS mirror according one or more embodiments.

FIG. 6E depicts four capacitor currents DL1R, DL2R, DL1L, and DL2L in an excitation frequency sweep over a wide range from 4 kHz to 45 kHz for a MEMS mirror according one or more embodiments. The capacitor currents DL1R, DL2R, DL1L, and DL2L are related to FIGS. 6B and 6C. DL1R means for example the sum of front-side layer (DL1 . . . Device Layer 1=front side layer) currents of the right side. DL2L means the sum of backside layer currents of the left side, etc. The capacitor currents DL1R, DL2R, DL1L, and DL2L can be generalized as displacement currents ixL-FS=DL1L, ixR-FS=DL1R, ixL-BS=DL2L, ixR-BS=DL2R where "bottom" and "top" layer currents are not discriminated here (summed by jointly contacting) such that "x" can apply to a bottom or top layer current. Direct excitations of the operational mode Rx and of the parasitic modes Tz and Rz at twice their respective resonance frequency are observed. This means they are excited in first order parametric resonance. However, mode Rz is also excited at a third of its parametric resonance frequency. This can be explained by the square wave driving via $v_{drive}$ which has higher, odd numbered harmonics at 3, 5, 7, . . . times the fundamental frequency. Thus, the third harmonic content of the square wave driving fulfills the resonance criterion for first order parametric resonance of yaw mode Rz. By the excitation frequency sweep, this behavior is provoked. However, such unwanted excitations can also occur in normal operation, i.e. when the driving frequency is at twice the Rx frequency, if a parasitic mode fulfills the criterion Rx·(2n+1)=Rp, where Rp is the frequency of the parasitic mode and n=0, 1, 2, . . . . Such parasitic excitations can be detected and identified by the methods described before.

After an unwanted parasitic oscillation has been detected (e.g., mode Ty, mode Rz, mode Ry, or mode Tz), it can be actively damped. This can be done during normal operation of the MEMS mirror 12 via the system controller 23.

During an observation phase, while the driving voltage $v_{drive}$ is on (e.g. while $D_{HVact}$=1 and $v_{drive}$ is set to a value between 0-200V), the type of parasitic oscillation, its frequency, and its phase are determined by the system controller 23 from the corresponding difference voltage $\Delta V_1$.

In particular, the Tz mode can be actively damped in response to its detection. When the rotor moves from the center upwards or downwards, a voltage Vdamp is applied between rotor and stator electrodes. When the rotor moves back towards the center, no voltage (0V) is applied.

Figure 7A:
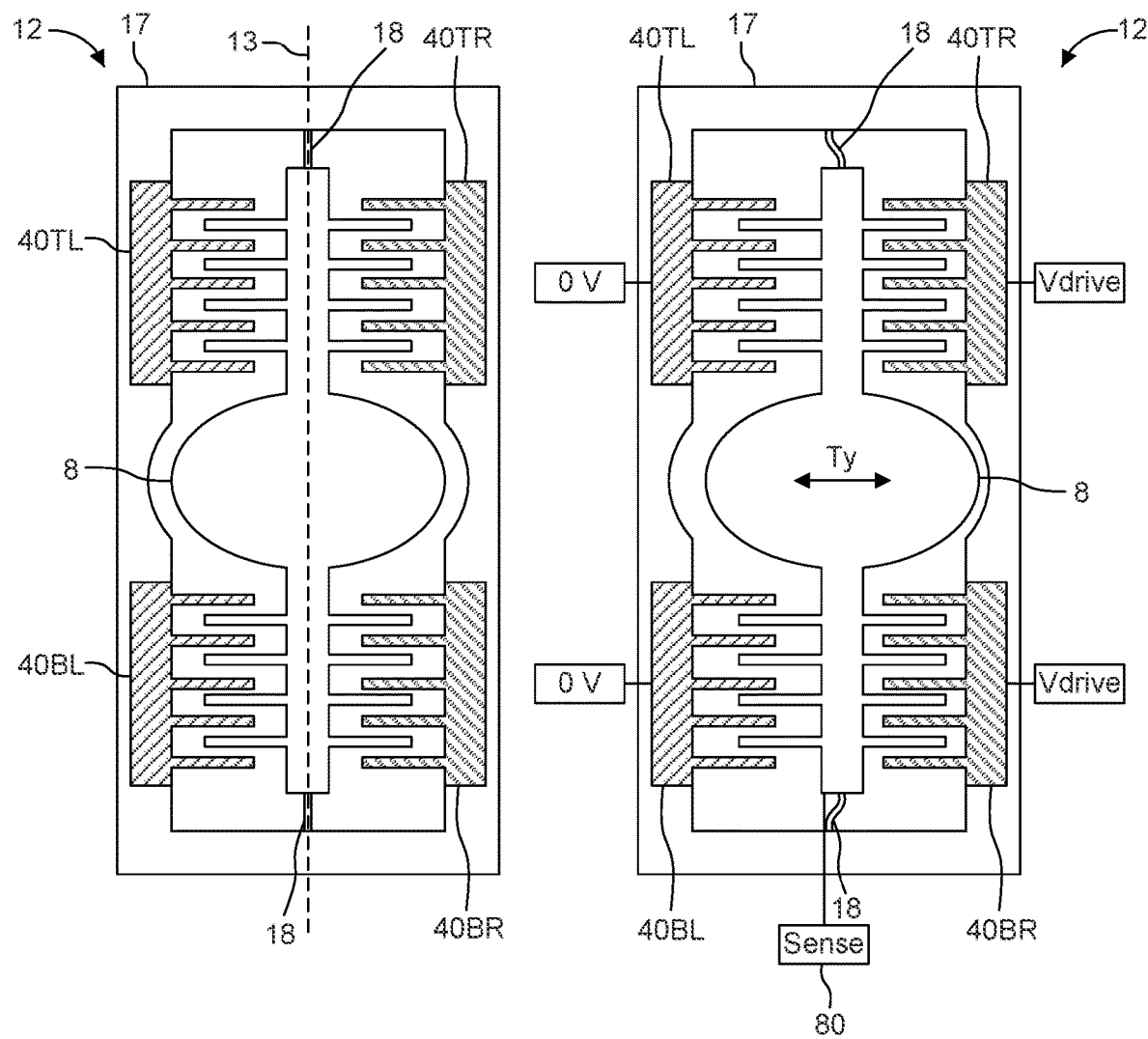
FIG. 7A illustrates a top view of a quasi-static (QS) MEMS mirror arranged in a nominal centered position (left) and a translational shifted position (right) according to one or more embodiments.

FIG. 7A illustrates a top view of a quasi-static (QS) MEMS mirror arranged in a nominal centered position (left) and a translational shifted position (right) according to one or more embodiments. For the QS MEMS mirror 12 the stator combs are used for driving the MEMS mirror 12 about the rotation axis 13 and the rotor is used for sensing via a sensing circuit. For QS mirrors the stator comb electrodes (typically either the left or the right, where the other is set to zero voltage) are applied with two individual drive voltages, while the rotor comb electrodes are assigned to ground.

Figure 7B:
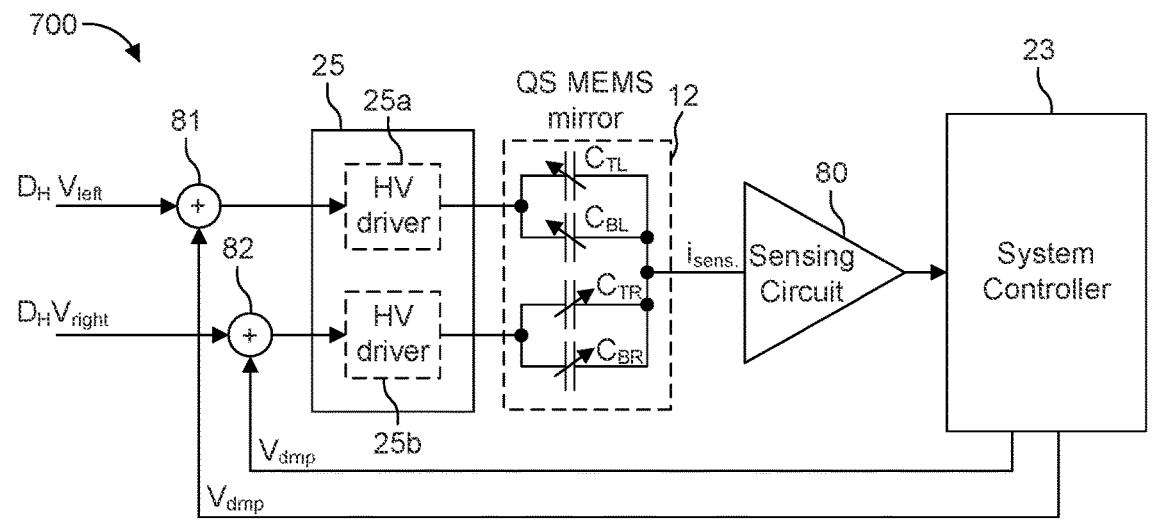
FIG. 7B is a schematic diagram of a Ty mode measurement and compensation system for a QS MEMS mirror according to one or more embodiments.

FIG. 7B is a schematic diagram of a Ty mode measurement and damping system 700 for a QS MEMS mirror according to one or more embodiments. The Ty mode measurement system 700 includes a MEMS driver 25 that includes two high voltage (HV) drivers 25a and 25b that each apply an individual drive voltage to a respective set of stator comb electrodes. In particular, HV driver 25a applies a drive voltage to the stator comb electrodes of comb-drives 40TL and 40BL (i.e., the left side) and HV driver 25b applies a driving voltage to the stator comb electrodes of comb-drives 40TR and 40BR (i.e., the right side). For QS mirrors the two individual drive voltages are applied such, that the QS MEMS mirror 12 tilts either in positive or negative direction. Applying both drive voltages at the same time is usually avoided to not excite the Tz mode. Each HV driver 25a and 25b receives a respective digital control signal $D_{HVleft}$ or digital control signal $D_{HVright}$ and drives the MEMS mirror 12 in accordance with its respective digital control signal in a similar manner described above when using digital control signal $D_{HVact}$.

For QS mirror sensing of the Rx nominal mode and the Ty parasitic mode, a sensing circuit 80 (e.g., a TIA) is connected to the rotor combs to measure the capacitance by the displacement charge or the displacement current isens received from the rotor (i.e., the rotor comb electrodes).

For QS mirror sensing, a high frequency modulation voltage can be added to the nominal driving voltage to allow a mirror position sensing (Rx) and parasitic mode sensing (Ty) independent from the applied driving voltage.

For QS mirror sensing, the Ty parasitic mode is distinguished from the Rx nominal mode by its frequency component by the system controller 23. Once the system controller 23 detects the Ty mode and determines its value is above certain predetermined threshold, the system controller 23 can actively damp the Ty mode by adding a counter voltage Vdmp to the driving comb electrodes on one side or the other, or in alternative fashion as the driving voltages are applied, respectively. That is, a counter voltage Vdmp is superimposed onto a driving voltage as the driving voltage is being applied to the right side stator comb electrodes to the left side stator comb electrodes. Summers 81 and 82 may be used to add or combine the counter voltage (damping voltage) Vdmp onto the digital control signals $D_{HVleft}$ and $D_{HVright}$, so that the counter voltage Vdmp is superimposed onto the driving voltage Vdrive by the respective HV driver 25a, 25b. The stator comb electrodes of the opposite side are grounded when not being driven/damped. Vdmp can be scaled by Vdrive considering nonlinear actuation force and torque.

Figure 7C:
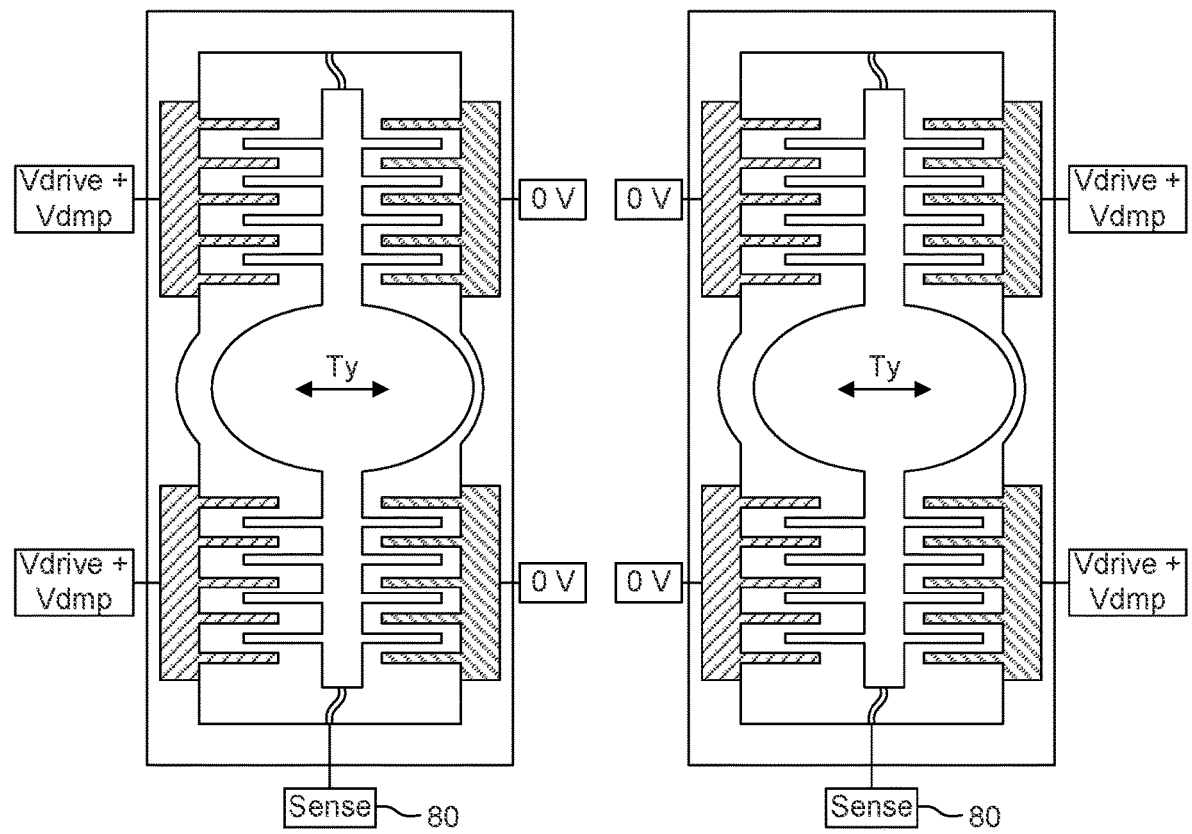
FIG. 7C illustrates a top view of a QS MEMS mirror being compensated with a damping voltage in response to detecting a translational movement Ty according to one or more embodiments.

FIG. 7C illustrates a top view of a QS MEMS mirror being compensated with a damping voltage in response to detecting a translational movement Ty according to one or more embodiments. The damping voltage being applied to counter the Ty mode is applied to the left side stator comb electrodes and the right side stator comb electrodes in an alternating manner to be superimposed onto the driving voltage Vdrive as it is alternatively applied according to the digital control signals $D_{HVleft}$ and $D_{HVright}$. Ground alternates with Vdrive/Vdmp as shown.

Figure 7D:
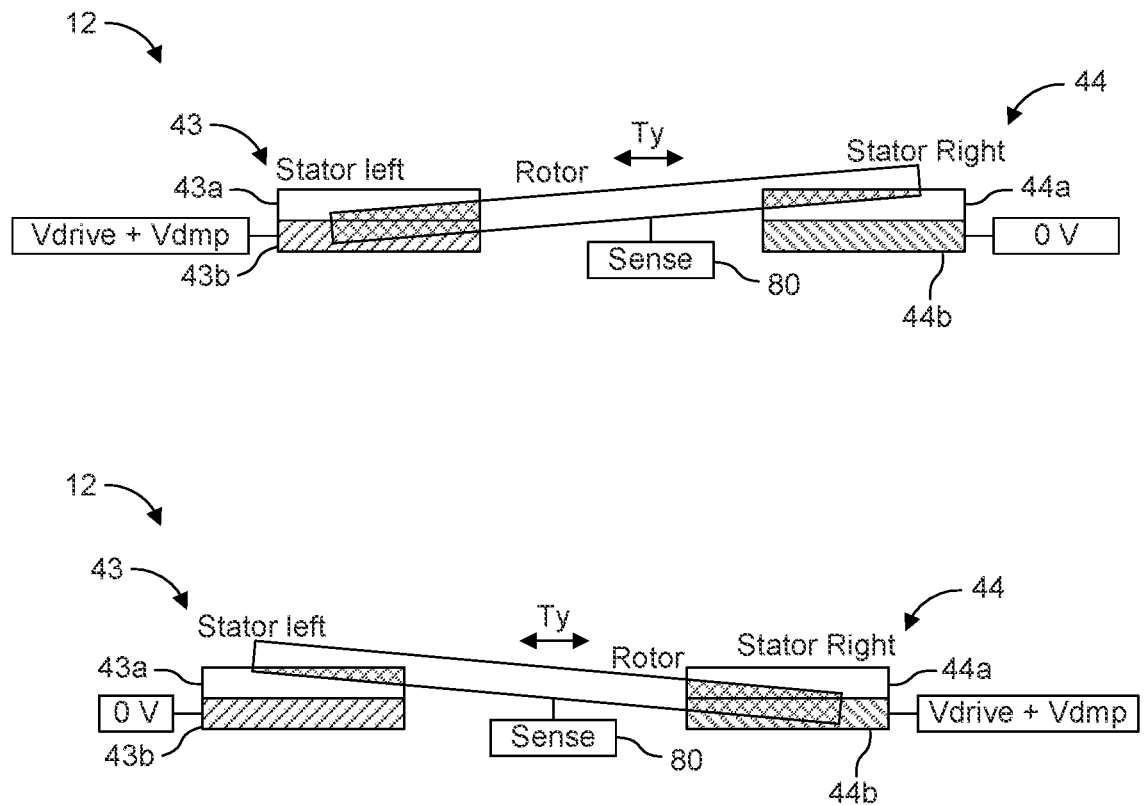
FIG. 7D illustrates a cross-sectional view of a QS MEMS mirror being compensated with a damping voltage in response to detecting a translational movement Ty according to one or more embodiments.

FIG. 7D illustrates a cross-sectional view of a QS MEMS mirror being compensated with a damping voltage in response to detecting a translational movement Ty according to one or more embodiments. Here, when the stator comb-drive electrodes 43 and 44 have two layers (front-side top layer 43a, 44a and bottom back-side layer 43b, 44b), the driving voltage Vdrive and the damping voltage Vdmp can be applied, alternating with ground, side-to-side. Here, the stator electrode (44a in FIG. 7D top and 43a FIG. 7D bottom) may be applied with the damping voltage Vdmp, such that nominal Rx drive and Ty compensation are applied separated from each other.

Figure 7E:
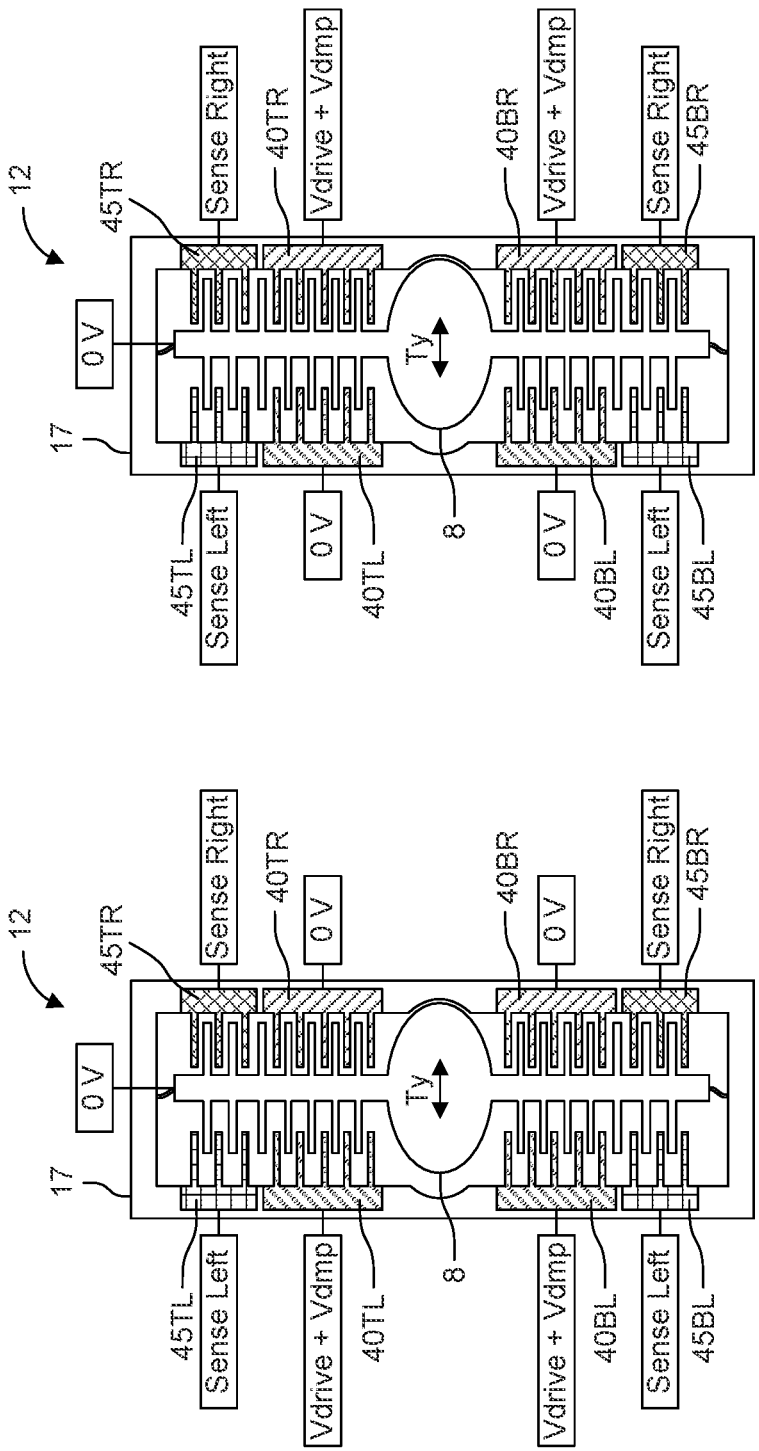
FIG. 7E illustrates a top view of a QS MEMS mirror being compensated with an alternative method using dedicated sensing combs to detect a translational movement Ty according to one or more embodiments.

FIG. 7E illustrates a top view of a QS MEMS mirror being compensated with an alternative method using dedicated sensing combs to detect a translational movement Ty according to one or more embodiments. It will be appreciated that a resonant MEMS mirror may also use dedicated sensing combs. Thus, dedicated sensing combs are not limited to QS MEMS mirrors, but can be applied to any MEMS mirror, including those described herein.

Here, the QS MEMS mirror 12 includes four dedicated sensing combs 45TL, 45BL, 45TR, and 45BR, each with a stator comb electrode fixed to the mirror frame 17 and used for measuring the capacitance by the displacement charge or the displacement current received from the stator comb electrodes, as similarly described above with respect to, for example, FIGS. 4B and 4C. The dedicated sensing combs 45TL, 45BL, 45TR, and 45BR also have a respective rotor comb electrode that is grounded.

Once the system controller 23 detects the Ty mode and determines its value is above certain predetermined threshold, the system controller 23 can actively damp the Ty mode by adding a counter voltage Vdmp to the driving stator comb electrodes when a corresponding driving voltage Vdrive is applied to that electrode. The application of Vdrive/Vdmp alternates side-to-side based on the digital control signals $D_{HVleft}$ and $D_{HVright}$.

It is also noted that the sensing combs 45TL, 45BL, 45TR, and 45BR can be electrically coupled to a sensing circuit (e.g., TIAs, adders and subtractors) in a similar manner shown in 4B, 4C, 5B, 6C, and 7B (e.g., as done for drive-cobs 40TL, 405BL, 40TR, and 40BR), not only for detecting and identifying one or more parasitic modes, but also for determining the phase, amplitude, and scanning direction of the rotational Rx mode. Additionally, the type of parasitic oscillation (i.e., whether it is a Ty, Rz, Ry, or Tz mode), its frequency, and its phase can be determined in a similar manner described above, for example, by analyzing a differential measurement signal. Thus, the sensing combs are used for sensing and generating measurement signals, and the drive-combs are used for driving the MEMS mirror 12 and for damping identified parasitic modes.

After detection, not only can any of the parasitic modes Ty, Rz, Ry, and/or Tz can be actively damped, but they can be preemptively avoided. Parasitic modes of Ty and Tz each have a high Q factor of its parasitic dynamics of Rx mode. The high Q factor causes large coupling to the Rx mode, which can lead to inaccuracy of the scan angle by scan trajectories distortion, and malfunction of the mirror control system. In worst case, a parasitic mode can destroy the MEMS mirror by large displacement of the comb-drives and fatigues in a weak structure of the MEMS mirror. However due to the innate high Q factor, large coupling occurs at a very small frequency region and also varies by the operational condition, such as peak input voltage, duty cycle, and excitation waveform shape. A parasitic mode can show hysteric behavior if it contains nonlinear spring constant, e.g. stiffening or softening. Those large parasitic mode couplings should not be used as operational points for the LIDAR operation or should be avoided during the start-up operation of the MEMS mirror 12 to avoid potential damage or fatigue.

Figure 8:
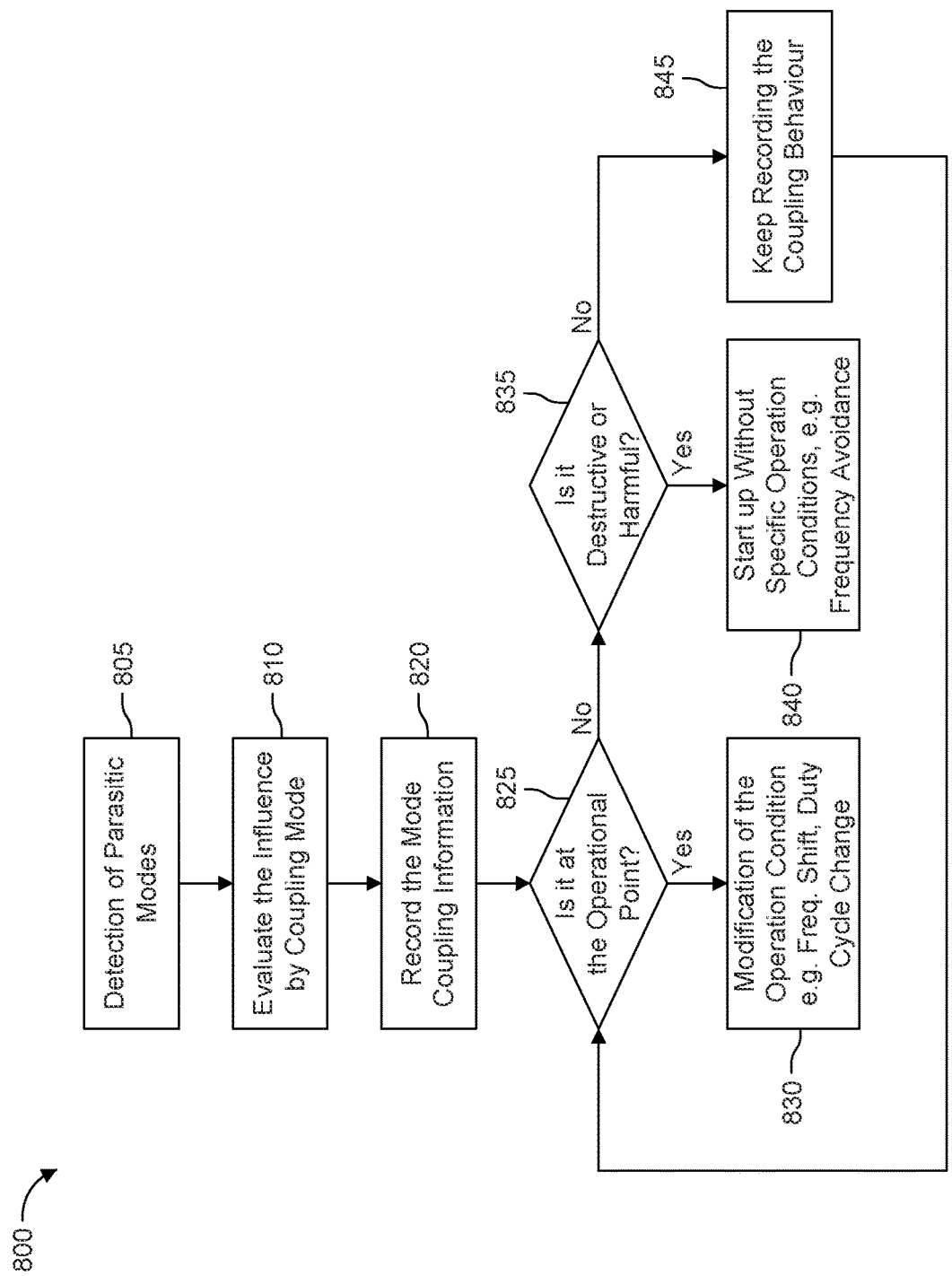
FIG. 8 illustrates a flow diagram of a parasitic mode coupling avoidance method according to one or more embodiments.

FIG. 8 illustrates a flow diagram of a parasitic mode coupling avoidance method according to one or more embodiments. When a parasitic coupling mode is detected during the operation of the MEMS mirror 12 (operation 805), the mode coupling influence is evaluated (operation 810), e.g. the conditions and frequency region of the parasitic mode, how intense the mode coupling is, and if it is the catastrophic point, which are detected as critically influencing or can be destructive to the MEMS mirror. In particular, the frequency location of the Rx mode coupling to the parasitic mode can be determined, along with the amplitude of the parasitic mode, and the amplitude and frequency location (region) of the parasitic mode coupling is recorded in memory (operation 820). If the amplitude and frequency location (region) of the parasitic mode coupling are determined in operation 825 to be at an operational point of the Rx mode and are determined to be critically influencing or destructive to the MEMS mirror, then the system controller 23 blocks or avoids that operational point in operation 830 by modifying the operation condition of the MEMS mirror 12 via applying a frequency shift or duty cycle change for driving the Rx mode. That is, if the harmonic numbers of the parasitic mode coupling is critical according to its frequency location relative to the operational point of the Rx mode and/or according to the amplitude of the parasitic mode coupling, that operational point of driving the Rx mode is avoided so as to not excite the corresponding parasitic mode.

If the system controller 23 determines that the harmonics (frequency location) of the parasitic mode are not located at the operational point of the Rx mode, but only located at some of the start-up points of the MEMS mirror and potentially cause a damage to the MEMS mirror 12 based on, for example, their amplitude exceeding a predetermined threshold (operation 835), then the system controller 23 can modify the startup of the MEMS mirror 12 in operation 840 to avoid such peak coupling frequencies or its near frequencies. The system controller 23 can be also modify operation conditions during startup, e.g., peak input voltages, duty cycles, and input waveform of the driving voltage Vdrive in operation 840.

When it is at the operational point for a desired operating frequency and amplitude of mode Rx, the operational frequency and amplitude of the driving voltage Vdrive can be shifted to the other value in operation 830, e.g., shifting to a slightly higher operating frequency that has lower parasitic couplings. The amplitude can be adjusted for the target operating condition of Rx by the system controller 23 by adjusting either the duty cycle or voltage scale of the driving voltage Vdrive.

If the system controller 23 does not determine a parasitic mode to be at the operational point of the Rx mode in operation 825 or to be destructive for the MEMS mirror in operation 835, the system controller 23 continues to record the parasitic coupling behavior to the Rx mode in operation 845 and returns to operation 825 for continuous monitoring until entire frequencies for a region of a parasitic mode are fully analyzed.

In case of duffing oscillation of the coupling mode, its hysteric behavior can be used, e.g. a slight increase of the frequency for the fallback of the coupling mode and slight down sweep to operation at the same operation condition, which can reduce coupling effect significantly by the hysteric behavior while keeping the operation condition as desired. For example, the system controller 23 may evaluate the difference in the Rx trajectory when the Ty mode is excited at high amplitude and at low amplitude. This is due to the hysteretic (duffing) behavior of the Ty mode. For example, the 5th harmonic content of the Rx trajectory of the MEMS mirror 12 caused by a high Ty mode amplitude may be evaluated. When sweeping the driving signal from low frequencies to high frequencies (starting the MEMS mirror up at run up to the desired operation point) an upper branch of the response curve of the MEMS mirror 12 is followed until a fallback point at high Ty amplitude to the lower branch of the response curve happens. If the high Ty mode amplitude is detected (i.e. by capacitive readout), a jump from the upper branch to the lower brunch can be initiated by the system controller 23 to avoid large parasitic Ty mode coupling. A similar evaluation can be applied to the other parasitic modes.

Additional embodiments are provided below:

1. A scanning system, comprising:
a microelectromechanical system (MEMS) scanning structure configured to rotate about an axis with a desired rotational mode of movement based on at least one driving signal;
a plurality of comb-drives configured to drive the MEMS scanning structure about the axis according to the desired rotational mode of movement based on the at least one driving signal, wherein each comb-drive comprises a rotor comb electrode and a stator comb electrode that form a capacitive element that has a capacitance that depends on the deflection angle of the MEMS scanning structure;
a driver configured to generate the at least one driving signal;
a sensing circuit selectively coupled to at least a subset of the plurality of comb-drives for receiving sensing signals therefrom, wherein each sensing signal is representative of the capacitance of a corresponding comb-drive; and
a processing circuit configured to determine a scanning direction of the MEMS scanning structure in the desired rotational mode of movement based on the sensing signals.

2. The scanning system of embodiment 1, wherein:
the plurality of comb-drives includes a first subset of comb-drives and a second subset of comb-drives,
the sensing circuit is configured to subtract at least one sensing signal provided by the second subset of comb-drives from at least one sensing signal provided by the first subset of comb-drives to generate a differential measurement signal, and
the processing circuit is configured to determine the scanning direction of the MEMS scanning structure in the desired rotational mode of movement based on the differential measurement signal.

3. The scanning system of embodiment 2, wherein the sign of the differential measurement signal indicates the scanning direction.

4. The scanning system of embodiment 2, further comprising:
a system controller configured to modify the at least one driving signal based on the determined scanning direction.

5. The scanning system of embodiment 2, wherein:
the sensing circuit is configured to add the at least one sensing signal provided by the first subset of comb-drives and the at least one sensing signal provided by the second subset of comb-drives to generate a summed measurement signal, and
the processing circuit is configured to determine at least one of a phase or an amplitude of the desired rotational mode of movement based on the summed measurement signal.

6. The scanning system of embodiment 5, further comprising:
a system controller configured to modify the at least one driving signal based on at least one of the determined phase of the desired rotational mode of movement or the determined amplitude of the desired rotational mode of movement.

7. The scanning system of embodiment 1, wherein the processing circuit is configured to detect and identify a parasitic mode of movement of the MEMS scanning structure based on the sensing signals.

8. The scanning system of embodiment 7, wherein:
the plurality of comb-drives includes a first subset of comb-drives and a second subset of comb-drives,
the sensing circuit is configured to subtract at least one sensing signal provided by the second subset of comb-drives from at least one sensing signal provided by the first subset of comb-drives to generate a differential measurement signal, and
the processing circuit is configured to identify the parasitic mode of movement, determine an amplitude of the parasitic mode of movement, and determine a phase of the parasitic mode of movement relative to the at least one driving signal based on the differential measurement signal.

9. The scanning system of embodiment 8, further comprising:
a system controller configured to dampen the identified parasitic mode of movement by applying at least one damping signal, wherein the system controller adjusts an amplitude and a phase of the at least one damping signal based on the amplitude and the phase of the parasitic mode of movement.

10. The scanning system of embodiment 1, further comprising:
a system controller,
wherein the processing circuit is configured to determine an amplitude and a phase of a parasitic mode of movement of the MEMS scanning structure relative to the at least one driving signal based on the sensing signals, and
the system controller is configured to dampen the identified parasitic mode of movement by applying at least one damping signal, wherein the system controller adjusts an amplitude and a phase of the at least one damping signal based on the amplitude and the phase of the parasitic mode of movement.

11. The scanning system of embodiment 7, further comprising:
a system controller configured to dampen the identified parasitic mode of movement based on the identified parasitic mode of movement by applying at least one damping signal directly to at least a subset of stator comb electrodes of the plurality of comb-drives or directly to each rotor comb electrode of the plurality of comb-drives.

12. The scanning system of embodiment 7, further comprising:
a system controller configured to dampen the identified parasitic mode of movement based on the identified parasitic mode of movement by superimposing the at least one damping signal onto the at least one driving signal.

13. The scanning system of embodiment 1, wherein:
the plurality of comb-drives includes a first subset of comb-drives and a second subset of comb-drives,
the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
the processing circuit is configured to determine the scanning direction of the MEMS scanning structure in the desired rotational mode of movement based on the differential measurement signal.

14. The scanning system of embodiment 1, wherein:
the plurality of comb-drives includes a first subset of comb-drives arranged laterally from the axis in a first direction and a second subset of comb-drives arranged laterally from the axis in a second direction opposite to the first direction,
the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
the processing circuit is configured to determine the scanning direction of the MEMS scanning structure in the desired rotational mode of movement based on the differential measurement signal.

15. The scanning system of embodiment 1, wherein:
the plurality of comb-drives includes a first subset of comb-drives arranged diagonally from each other across the axis on a first diagonal and a second subset of comb-drives arranged diagonally from each other across the axis on a second diagonal that intersects with the first diagonal,
the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
the processing circuit is configured to determine the scanning direction of the MEMS scanning structure in the desired rotational mode of movement based on the differential measurement signal.

16. A scanning system, comprising:
a microelectromechanical system (MEMS) scanning structure configured to rotate about an axis with a desired rotational mode of movement based on at least one driving signal;
a plurality of comb-drives configured to drive the MEMS scanning structure about the axis according to the desired rotational mode of movement based on the at least one driving signal, wherein each comb-drive comprises a rotor comb electrode and a stator comb electrode that form a capacitive element that has a capacitance that depends on the deflection angle of the MEMS scanning structure;
a driver configured to generate the at least one driving signal;
a sensing circuit selectively coupled to at least a subset of the plurality of comb-drives for receiving sensing signals therefrom, wherein each sensing signal is representative of the capacitance of a corresponding comb-drive; and
a processing circuit configured to detect and identify a parasitic mode of movement of the MEMS scanning structure based on the sensing signals.

17. The scanning system of embodiment 16, further comprising:
a system controller configured to dampen the identified parasitic mode of movement based on the identified parasitic mode of movement by applying at least one damping signal to at least a subset of stator comb electrodes of the plurality of comb-drives or to each rotor comb electrode of the plurality of comb-drives.

18. The scanning system of embodiment 17, wherein the system controller selectively determines the subset of stator comb electrodes to which the at least one damping signal is applied based on the identified parasitic mode.

19. The scanning system of embodiment 17, wherein the system controller is configured to superimpose the at least one damping signal onto the at least one driving signal.

20. The scanning system of embodiment 16, further comprising:
a system controller configured selectively couple the sensing circuit to at least the subset of the plurality of comb-drives for the sensing circuit to receive sensing signals therefrom based on a type of the parasitic mode of movement being evaluated.

21. The scanning system of embodiment 16, wherein:
the plurality of comb-drives includes a first subset of comb-drives and a second subset of comb-drives,
the sensing circuit is configured to subtract at least one sensing signal provided by the second subset of comb-drives from at least one sensing signal provided by the first subset of comb-drives to generate a differential measurement signal, and the processing circuit is configured to identify a parasitic mode of movement of the MEMS scanning structure, determine an amplitude of the parasitic mode of movement, and determine a phase of the parasitic mode of movement relative to the at least one driving signal based on the differential measurement signal.

22. The scanning system of embodiment 21, further comprising:

a system controller configured to dampen the identified parasitic mode of movement by applying at least one damping signal, wherein the system controller adjusts an amplitude and a phase of the at least one damping signal based on the amplitude and the phase of the parasitic mode of movement.

23. The scanning system of embodiment 16, further comprising:

a system controller configured to dampen the identified parasitic mode of movement by biasing a pair of stator comb electrodes during a drive voltage off-time of the driving signal to decelerate the identified parasitic mode of movement in accordance to the identified parasitic mode of movement, wherein the MEMS scanning structure is a resonant MEMS scanning structure.

24. The scanning system of embodiment 16, further comprising:

a system controller configured to dampen the identified parasitic mode of movement by superimposing a damping voltage onto the at least one driving signal that is applied to each of the rotor comb electrodes to decelerate the identified parasitic mode of movement, wherein the MEMS scanning structure is a resonant MEMS scanning structure.

25. The scanning system of embodiment 16, further comprising:

a system controller configured to dampen the identified parasitic mode of movement by superimposing a damping voltage onto the at least one driving signal that is applied to a pair of stator comb electrodes to decelerate the identified parasitic mode of movement, wherein the MEMS scanning structure is a quasistatic MEMS scanning structure.

26. A scanning system, comprising:

a microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive comprises a rotor drive-comb electrode and a stator drive-comb electrode;

a driver configured to generate the at least one driving signal;

a plurality of sensing combs, wherein each sensing comb comprises a rotor sense-comb electrode and a stator sense-comb electrode that form a capacitive element that has a capacitance that depends on the deflection angle of the MEMS scanning structure;

a sensing circuit selectively coupled to at least a subset of the plurality of sensing combs for receiving sensing signals therefrom, wherein each sensing signal is representative of the capacitance of a corresponding sensing combs; and a processing circuit configured to detect and identify a parasitic mode of movement of the MEMS scanning structure based on the sensing signals.

27. The scanning system of embodiment 26, further comprising:

a system controller configured to dampen the identified parasitic mode of movement according to the identified parasitic mode of movement by applying at least one damping signal to at least a subset of stator drive-comb electrodes of the plurality of comb-drives or to each rotor drive-comb electrode of the plurality of comb-drives.

28. The scanning system of embodiment 27, wherein the system controller selectively determines the subset of stator drive-comb electrodes to which the at least one damping signal is applied based on the identified parasitic mode.

29. The scanning system of embodiment 27, wherein the system controller is configured to superimpose the at least one damping signal onto the at least one driving signal.

30. The scanning system of embodiment 26, wherein the processing circuit is configured to determine a scanning direction of the MEMS scanning structure in the desired rotational mode of movement based on the sensing signals.

31. The scanning system of embodiment 30, wherein:

the plurality of sensing combs includes a first subset of sensing combs and a second subset of sensing combs, the sensing circuit is configured to subtract at least one sensing signal provided by the second subset of sensing combs from at least one sensing signal provided by the first subset of sensing combs to generate a differential measurement signal, and the processing circuit is configured to determine the scanning direction of the MEMS scanning structure in the desired rotational mode of movement based on the differential measurement signal 32. The scanning system of embodiment 31, wherein:

the sensing circuit is configured to add the sensing signals from the first subset of sensing combs and the second subset of sensing combs to generate a summed measurement signal, and the processing circuit is configured to determine at least one of a phase or an amplitude of the desired rotational mode of movement based on the summed measurement signal.

33. The scanning system of embodiment 26, wherein:

the plurality of sensing combs includes a first subset of sensing combs and a second subset of sensing combs, the sensing circuit is configured to subtract at least one sensing signal provided by the second subset of sensing combs from at least one sensing signal provided by the first subset of sensing combs to generate a differential measurement signal, and the processing circuit is configured to identify the parasitic mode of movement, determine an amplitude of the parasitic mode of movement, and determine a phase of the parasitic mode of movement relative to the at least one driving signal based on the differential measurement signal.

34. The scanning system of embodiment 33, further comprising:

a system controller configured to dampen the identified parasitic mode of movement by applying at least one damping signal, wherein the system controller adjusts an amplitude and a phase of the at least one damping signal based on the amplitude and the phase of the parasitic mode of movement.

35. The scanning system of embodiment 26, further comprising:

a system controller configured to dampen the identified parasitic mode of movement by superimposing a damping voltage onto the at least one driving signal that is applied to a pair of stator drive-comb electrodes to decelerate the identified parasitic mode of movement.

36. A scanning system, comprising:

a microelectromechanical system (MEMS) scanning structure configured to rotate about an axis with a desired rotational mode of movement based on at least one driving signal;

a plurality of combs-drives configured to drive the MEMS scanning structure about the axis according to the desired rotational mode of movement based on the at least one driving signal, wherein each comb-drive comprises a rotor comb electrode and a stator comb electrode that form a capacitive element that has a capacitance that depends on the deflection angle of the MEMS scanning structure;

a driver configured to generate the at least one driving signal;

a system controller configured to shift a driving frequency of the at least one driving signal to provoke a parasitic mode coupling between the desired rotational mode of movement and a parasitic mode of movement of the MEMS scanning structure;

a sensing circuit selectively coupled to at least a subset of the plurality of comb-drives for receiving sensing signals therefrom, wherein each sensing signal is representative of the capacitance of a corresponding comb-drive; and a processing circuit configured to determine a frequency range of the driving frequency at which the parasitic mode coupling occurs, wherein the system controller controls the at least one driving signal to avoid the parasitic mode.

37. The scanning system of embodiment 36, wherein the system controller controls at least one of the driving frequency, a peak input voltage, a duty cycle, or a waveform of the at least one driving signal such that the parasitic mode is avoided.

38. A scanning system, comprising:

a microelectromechanical system (MEMS) scanning structure configured to rotate about an axis with a desired rotational mode of movement based on at least one driving signal;

a plurality of comb-drives configured to drive the MEMS scanning structure about the axis according to the desired rotational mode of movement based on the at least one driving signal, wherein each comb-drive comprises a rotor drive-comb electrode and a stator drive-comb electrode;

a driver configured to generate the at least one driving signal;

a plurality of sensing combs, wherein each sensing comb comprises a rotor sense-comb electrode and a stator sense-comb electrode that form a capacitive element that has a capacitance that depends on the deflection angle of the MEMS scanning structure;

a system controller configured to shift a driving frequency of the at least one driving signal to provoke a parasitic mode coupling between the desired rotational mode of movement and a parasitic mode of movement of the MEMS scanning structure;

a sensing circuit selectively coupled to at least a subset of the plurality of sensing combs for receiving sensing signals therefrom, wherein each sensing signal is representative of the capacitance of a corresponding sensing comb; and a processing circuit configured to determine a frequency range of the driving frequency at which the parasitic mode coupling occurs, wherein the system controller controls the at least one driving signal to avoid the parasitic mode.

39. The scanning system of embodiment 38, wherein the system controller controls at least one of the driving frequency, a peak input voltage, a duty cycle, or a waveform of the at least one driving signal such that the parasitic mode is avoided.

Although embodiments described herein relate to a MEMS device with a mirror, it is to be understood that other implementations may include optical devices other than MEMS mirror devices, including other oscillating structures, including those not related to LIDAR. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A scanning system, comprising:
a microelectromechanical system (MEMS) scanning structure configured to rotate about an axis with a desired rotational mode of movement based on at least one driving signal;
a plurality of comb-drives configured to drive the MEMS scanning structure about the axis according to the desired rotational mode of movement based on the at least one driving signal, wherein each comb-drive comprises a rotor comb electrode and a stator comb electrode that form a capacitive element that has a capacitance that depends on a deflection angle of the MEMS scanning structure;
a driver configured to generate the at least one driving signal;
a sensing circuit selectively coupled to at least a subset of the plurality of comb-drives for receiving sensing signals therefrom, wherein each sensing signal is representative of the capacitance of a corresponding comb-drive;
a processing circuit configured to:
determine a parasitic mode of movement and a scanning direction of the MEMS scanning structure in the desired rotational mode of movement based on the sensing signals; and
a system controller configured to:
cause a counteractive force to be applied to one or more of a rotor comb electrode corresponding to the parasitic mode of movement or a stator comb electrode corresponding to the parasitic mode of movement at a timing that is effective for damping the parasitic mode of movement.

2. The scanning system of claim 1, wherein:
the plurality of comb-drives includes a first subset of comb-drives and a second subset of comb-drives,
the sensing circuit is configured to subtract at least one sensing signal provided by the second subset of comb-drives from at least one sensing signal provided by the first subset of comb-drives to generate a differential measurement signal, and
the processing circuit is configured to determine the scanning direction of the MEMS scanning structure in the desired rotational mode of movement based on the differential measurement signal.

3. The scanning system of claim 2, wherein a sign of the differential measurement signal indicates the scanning direction.

4. The scanning system of claim 2, wherein the system controller is further configured to:
modify the at least one driving signal based on the determined scanning direction.

5. The scanning system of claim 2, wherein:
the sensing circuit is configured to add the at least one sensing signal provided by the first subset of comb-drives and the at least one sensing signal provided by the second subset of comb-drives to generate a summed measurement signal, and
the processing circuit is configured to determine, based on the summed measurement signal, at least one of a phase of the desired rotational mode of movement or an amplitude of the desired rotational mode of movement.

6. The scanning system of claim 5, wherein the system controller is further configured to:
modify the at least one driving signal based on the at least one of the phase of the desired rotational mode of movement or the amplitude of the desired rotational mode of movement.

7. The scanning system of claim 1, wherein:
the plurality of comb-drives includes a first subset of comb-drives and a second subset of comb-drives,
the sensing circuit is configured to subtract at least one sensing signal provided by the second subset of comb-drives from at least one sensing signal provided by the first subset of comb-drives to generate a differential measurement signal, and
the processing circuit is configured to determine the parasitic mode of movement, determine an amplitude of the parasitic mode of movement, and determine a phase of the parasitic mode of movement relative to the at least one driving signal based on the differential measurement signal.

8. The scanning system of claim 7, wherein the system controller is further configured to:

dampen the parasitic mode of movement by applying at least one damping signal corresponding to the counteractive force, wherein the system controller adjusts an amplitude and a phase of the at least one damping signal based on the amplitude of the parasitic mode of movement and the phase of the parasitic mode of movement.

9. The scanning system of claim 1, wherein the processing circuit is further configured to:
   determine an amplitude and a phase of the parasitic mode of movement of the MEMS scanning structure relative to the at least one driving signal based on the sensing signals, and
   wherein the system controller is further configured to:
      dampen the parasitic mode of movement by applying at least one damping signal, wherein the system controller adjusts an amplitude and a phase of the at least one damping signal based on the amplitude and the phase of the parasitic mode of movement.

10. The scanning system of claim 1, wherein the system controller is further configured to:
    dampen the parasitic mode of movement by applying at least one damping signal directly to at least a subset of stator comb electrodes of the plurality of comb-drives or directly to each rotor comb electrode of the plurality of comb-drives.

11. The scanning system of claim 1, wherein the system controller is further configured to:
    dampen the parasitic mode of movement by superimposing at least one damping signal onto the at least one driving signal.

12. The scanning system of claim 1, wherein:
    the plurality of comb-drives includes a first subset of comb-drives and a second subset of comb-drives,
    the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
    the processing circuit is configured to determine the scanning direction of the MEMS scanning structure in the desired rotational mode of movement based on the differential measurement signal.

13. The scanning system of claim 1, wherein:
    the plurality of comb-drives includes a first subset of comb-drives arranged laterally from the axis in a first direction and a second subset of comb-drives arranged laterally from the axis in a second direction opposite to the first direction,
    the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
    the processing circuit is configured to determine the scanning direction of the MEMS scanning structure in the desired rotational mode of movement based on the differential measurement signal.

14. The scanning system of claim 1, wherein:
    the plurality of comb-drives includes a first subset of comb-drives arranged diagonally from each other across the axis on a first diagonal and a second subset of comb-drives arranged diagonally from each other across the axis on a second diagonal that intersects with the first diagonal,
    the sensing circuit is configured to add the sensing signals from the first subset of comb-drives to generate a first summed sensing signal, add the sensing signals from the second subset of comb-drives to generate a second summed sensing signal, and subtract the second summed sensing signal from the first summed sensing signal to generate a differential measurement signal, and
    the processing circuit is configured to determine the scanning direction of the MEMS scanning structure in the desired rotational mode of movement based on the differential measurement signal.

15. A scanning system, comprising:
    a microelectromechanical system (MEMS) scanning structure configured to rotate about an axis with a desired rotational mode of movement based on at least one driving signal;
    a plurality of comb-drives configured to drive the MEMS scanning structure about the axis according to the desired rotational mode of movement based on the at least one driving signal, wherein each comb-drive comprises a rotor comb electrode and a stator comb electrode that form a capacitive element that has a capacitance that depends on a deflection angle of the MEMS scanning structure;
    a driver configured to generate the at least one driving signal;
    a sensing circuit selectively coupled to at least a subset of the plurality of comb-drives for receiving sensing signals therefrom, wherein each sensing signal is representative of the capacitance of a corresponding comb-drive;
    a processing circuit configured to detect and identify a parasitic mode of movement of the MEMS scanning structure based on the sensing signals; and
    a system controller configured to cause a counteractive force to be applied to one or more of a rotor comb electrode corresponding to the parasitic mode of movement or a stator comb electrode corresponding to the parasitic mode of movement at a timing that is effective for damping the parasitic mode of movement.

16. The scanning system of claim 15, wherein the system controller configured to dampen the parasitic mode of movement based on the parasitic mode of movement by applying at least one damping signal to at least a subset of stator comb electrodes of the plurality of comb-drives or to each rotor comb electrode of the plurality of comb-drives.

17. The scanning system of claim 16, wherein the system controller selectively determines the subset of stator comb electrodes to which the at least one damping signal is applied based on the parasitic mode.

18. The scanning system of claim 16, wherein the system controller is configured to superimpose the at least one damping signal onto the at least one driving signal.

19. The scanning system of claim 15, wherein the system controller is configured further to:
    selectively couple the sensing circuit to at least the subset of the plurality of comb-drives for the sensing circuit to receive sensing signals therefrom based on a type of the parasitic mode of movement being evaluated.

20. The scanning system of claim 15, wherein:
    the plurality of comb-drives includes a first subset of comb-drives and a second subset of comb-drives, the sensing circuit is configured to subtract at least one sensing signal provided by the second subset of comb-drives from at least one sensing signal provided by the first subset of comb-drives to generate a differential measurement signal, and the processing circuit is configured to:
   determine an amplitude of the parasitic mode of movement relative to the at least one driving signal based on the differential measurement signal, and
   determine a phase of the parasitic mode of movement relative to the at least one driving signal based on the differential measurement signal.

21. The scanning system of claim 20, wherein the system controller is further configured to:
   dampen the parasitic mode of movement by applying at least one damping signal, wherein the system controller adjusts an amplitude and a phase of the at least one damping signal based on the amplitude and the phase of the parasitic mode of movement.

22. The scanning system of claim 20, wherein a sign of the differential measurement signal indicates the scanning direction.

23. The scanning system of claim 15, wherein the system controller is further configured to:
   dampen the parasitic mode of movement by biasing a pair of stator comb electrodes during a drive voltage off-time of the driving signal to decelerate the parasitic mode of movement in accordance with the parasitic mode of movement,
   wherein the MEMS scanning structure is a resonant MEMS scanning structure.

24. The scanning system of claim 15, wherein the system controller is further configured to:
   dampen the parasitic mode of movement by superimposing a damping voltage onto the at least one driving signal that is applied to each of the rotor comb electrodes to decelerate the parasitic mode of movement,
   wherein the MEMS scanning structure is a resonant MEMS scanning structure.

25. The scanning system of claim 15, wherein the system controller is further configured to:
   dampen the parasitic mode of movement by superimposing a damping voltage onto the at least one driving signal that is applied to a pair of stator comb electrodes to decelerate the parasitic mode of movement,
   wherein the MEMS scanning structure is a quasistatic MEMS scanning structure.

* * * * *